United States Patent
Kitaya et al.

(10) Patent No.: US 7,269,257 B2
(45) Date of Patent: *Sep. 11, 2007

(54) SYSTEM AND METHOD FOR PROCESSING INFORMATION USING ENCRYPTION KEY BLOCK

(75) Inventors: Yoshimichi Kitaya, Kanagawa (JP); Ryuji Ishiguro, Tokyo (JP); Yoshitomo Osawa, Kanagawa (JP); Tomoyuki Asano, Kanagawa (JP)

(73) Assignee: Sony Corporation (JP)

( * ) Notice: Subject to any disclaimer, the term of this patent is extended or adjusted under 35 U.S.C. 154(b) by 926 days.

This patent is subject to a terminal disclaimer.

(21) Appl. No.: 10/048,658

(22) PCT Filed: Jun. 15, 2001

(86) PCT No.: PCT/JP01/05146

§ 371 (c)(1),
(2), (4) Date: May 13, 2002

(87) PCT Pub. No.: WO01/99331

PCT Pub. Date: Dec. 27, 2001

(65) Prior Publication Data

US 2002/0150250 A1  Oct. 17, 2002

(30) Foreign Application Priority Data

Jun. 15, 2000   (JP) ............................. 2000-179693

(51) Int. Cl.
H04L 9/00  (2006.01)

(52) U.S. Cl. ..................... 380/45; 380/277; 380/278; 380/279

(58) Field of Classification Search ................ 380/45, 380/278, 279, 277
See application file for complete search history.

(56) References Cited

U.S. PATENT DOCUMENTS

| 6,049,878 A | * | 4/2000 | Caronni et al. | 726/3 |
| 6,240,188 B1 | * | 5/2001 | Dondeti et al. | 380/284 |
| 6,609,116 B1 | * | 8/2003 | Lotspiech | 705/57 |

FOREIGN PATENT DOCUMENTS

JP  11-187013 A  7/1999

OTHER PUBLICATIONS

JP 11-187013 Machine-Assisted Translation (MAT), Jul. 9, 1999, English Translation, Thomson Feb. 3, 2006.*

(Continued)

*Primary Examiner*—Kambiz Zand
*Assistant Examiner*—Tongoc Tran
(74) *Attorney, Agent, or Firm*—Lerner, David, Littenberg, Krumholz & Mentlik, LLP

(57) ABSTRACT

An information processing system and method using an encryption key block sets sub-trees classified based on data processing ability of the devices (capability) in a key tree in which respective keys are corresponded to a root, nodes and leaves of a tree in which a plurality of devices are constituted as the leaves, generates a sub-enabling key block which is effective for an entity in a managing subject of each sub-tree (entity), and generates an enabling key block decodable only by the entities having common capability. Also, an information processing system and method using an encryption key block manages a partial tree of a key tree (sub-tree), generates a sub-enabling key block based only on a key set corresponding to nodes or leaves included in the sub-tree, and generates an enabling key block decodable only by selected entities by using the sub-enabling key block. Thus, it is possible to generate and distribute an enabling key block corresponding to data processing ability of a device and to manage devices by dividing a hierarchical key tree structure.

40 Claims, 44 Drawing Sheets

OTHER PUBLICATIONS

Copending U.S. Appl. No. 10/204,775.*

Dondeti, L. R., et al., "A Duel Encryption Protocol For Scalable Secure Multicasting", In: Proceedings of IEEE international Symposium On Computers And Communications, (1999), pp. 2 to 8, Anatomy of the dual encryption protocol.

Moyer, et al., "A Survey Of Security Issues In Multicast Communications", IEEE Network, Nov./Dec. 1999, vol. 13, No. 6, pp. 12 to 23 especially, Tree-Based key Management.

Waldvogel, M., et al., The VersaKey Framework: Versatile Group Key Management:, IEEE Journal on Selected Areas In Communications, Sep. 1999, vol. 17, No. 9, pp. 1614 to 1631, especially pp. 1616 to 1621.

Wong, C. k. ,et al., "Secure Group Communications Using Key Graphs", In: Proceedings of ACM SIGCOMM'98, (1998), pp. 68 to 79, especially 3.4, Leaving a tree key graph (http://www.acm.org/sigcom/sigcom98/tp/technical.html).

Waldvogel, M., et al., The VersaKey Framework: Versatile Group Key Management:, IEEE Journal on Selected Areas In Communications, Sep. 1999, vol. 17, No. 9, pp. 1614 to 1631, especially pp. 1616 to 1621.

Wong, C. k., et al., "Secure Group Communications Using Key Graphs", In: Proceedings of ACM SIGCOMM'98, (1998), pp. 68 to 79, especially 3.4, Leaving a tree key graph (http://www.acm.org/sigcom/sigcom98/tp/technical.html).

Wallner et al., "Key Management for Multicast: Issues and Architectures", Network Working Group.

* cited by examiner

| VERSION : t | |
|---|---|
| INDEX | ENCRYPTED KEY |
| 0 | Enc(K(t)0, K(t)R) |
| 00 | Enc(K(t)00, K(t)0) |
| 000 | Enc(K000, K(t)00) |
| 001 | Enc(K(t)001, K(t)00) |
| 0010 | Enc(K0010, K(t)001) |

FIG.4A

| VERSION : t | |
|---|---|
| INDEX | ENCRYPTED KEY |
| 000 | Enc(K000, K(t)00) |
| 001 | Enc(K(t)001, K(t)00) |
| 0010 | Enc(K0010, K(t)001) |

FIG.4B

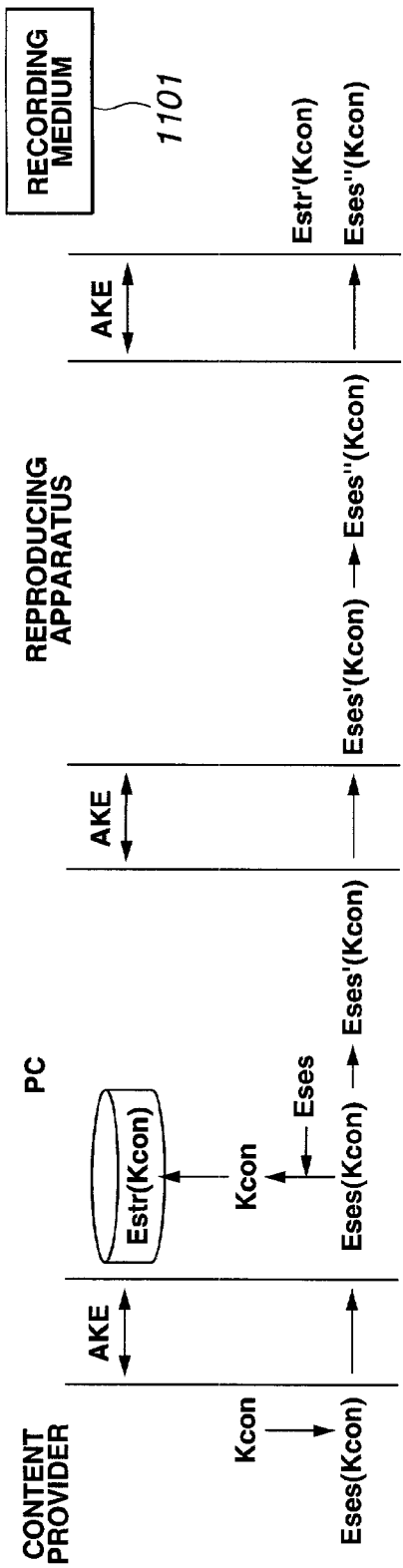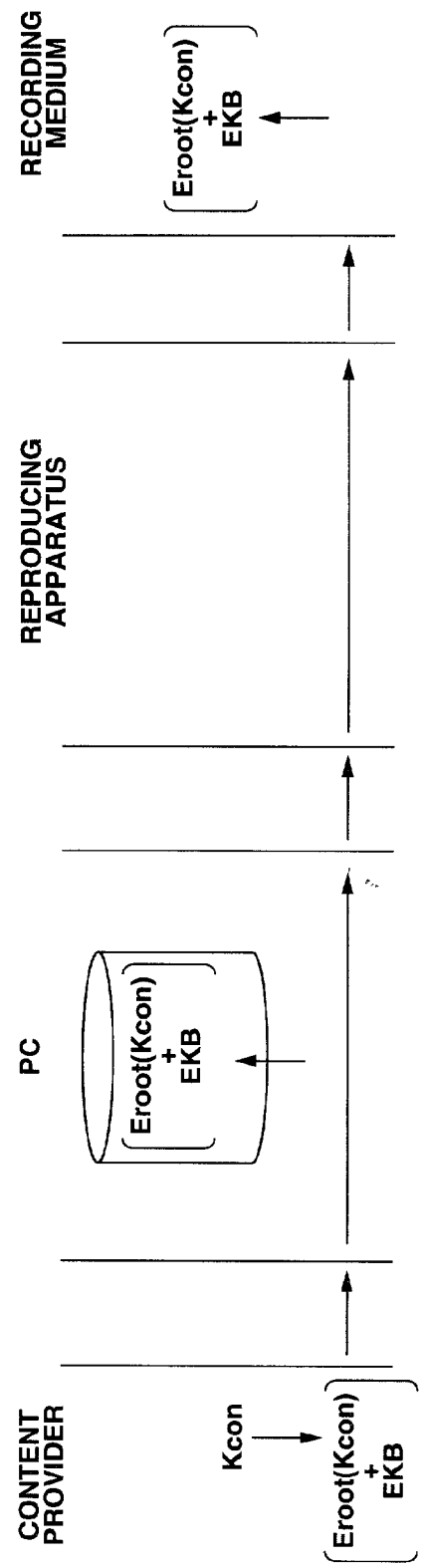
FIG.11A
FIG.11B

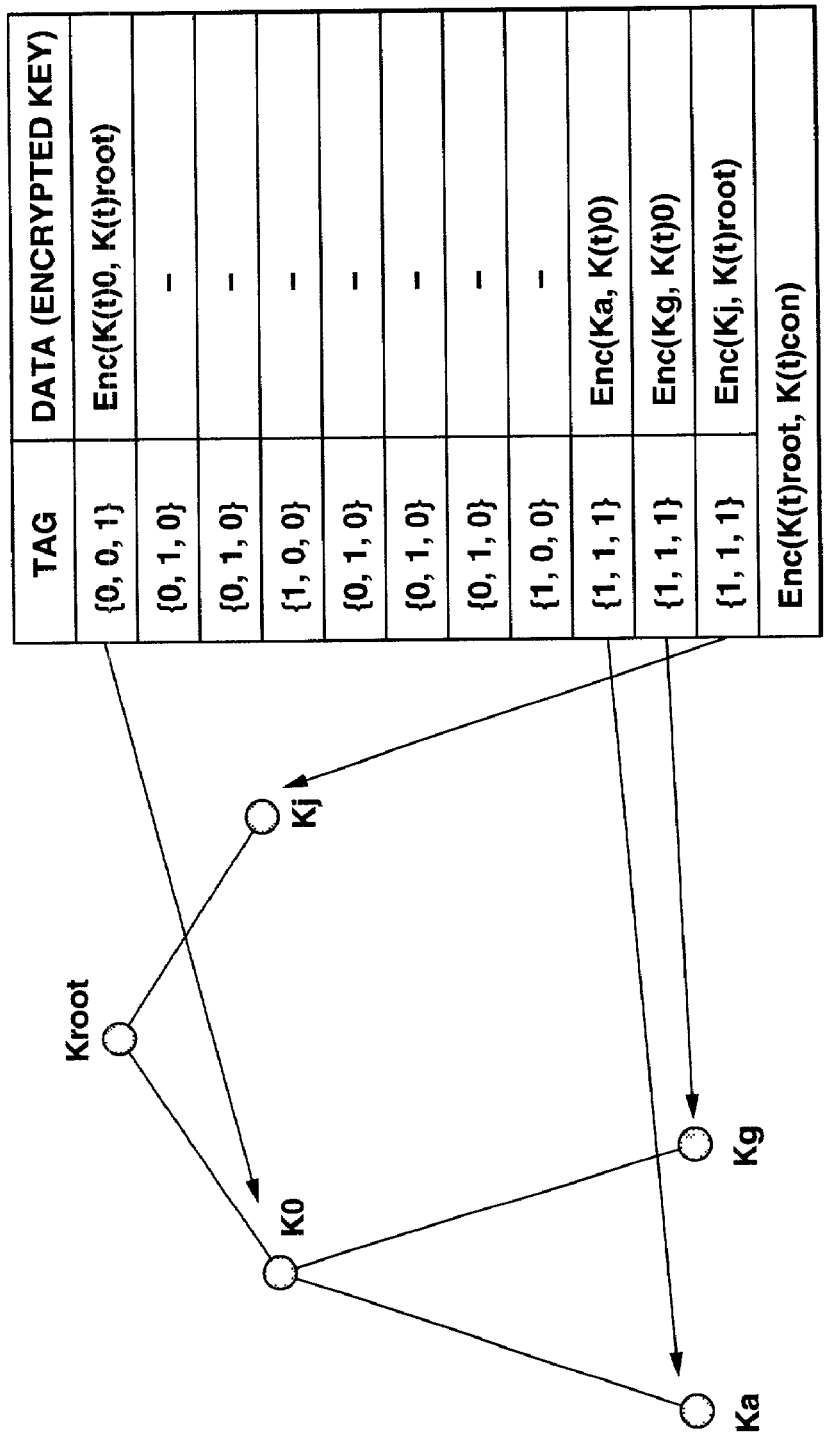

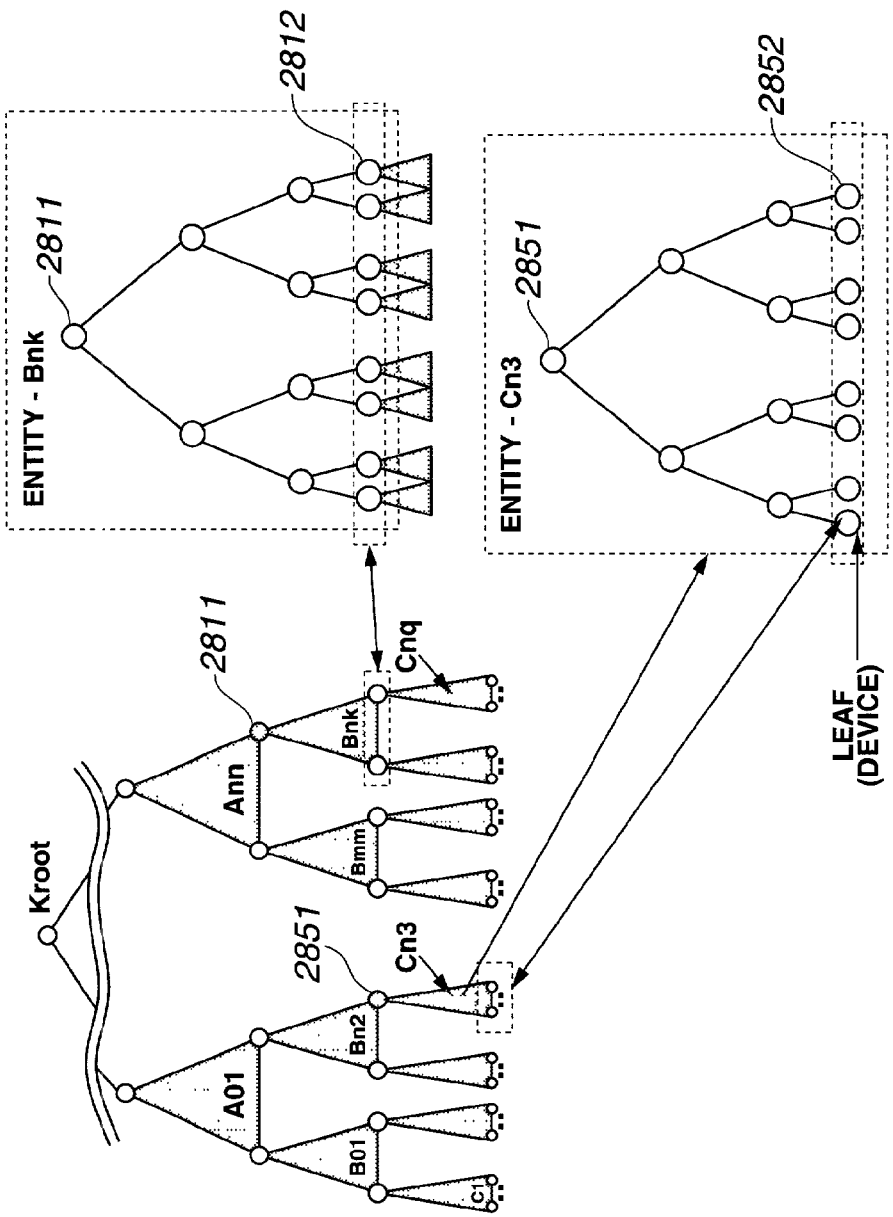

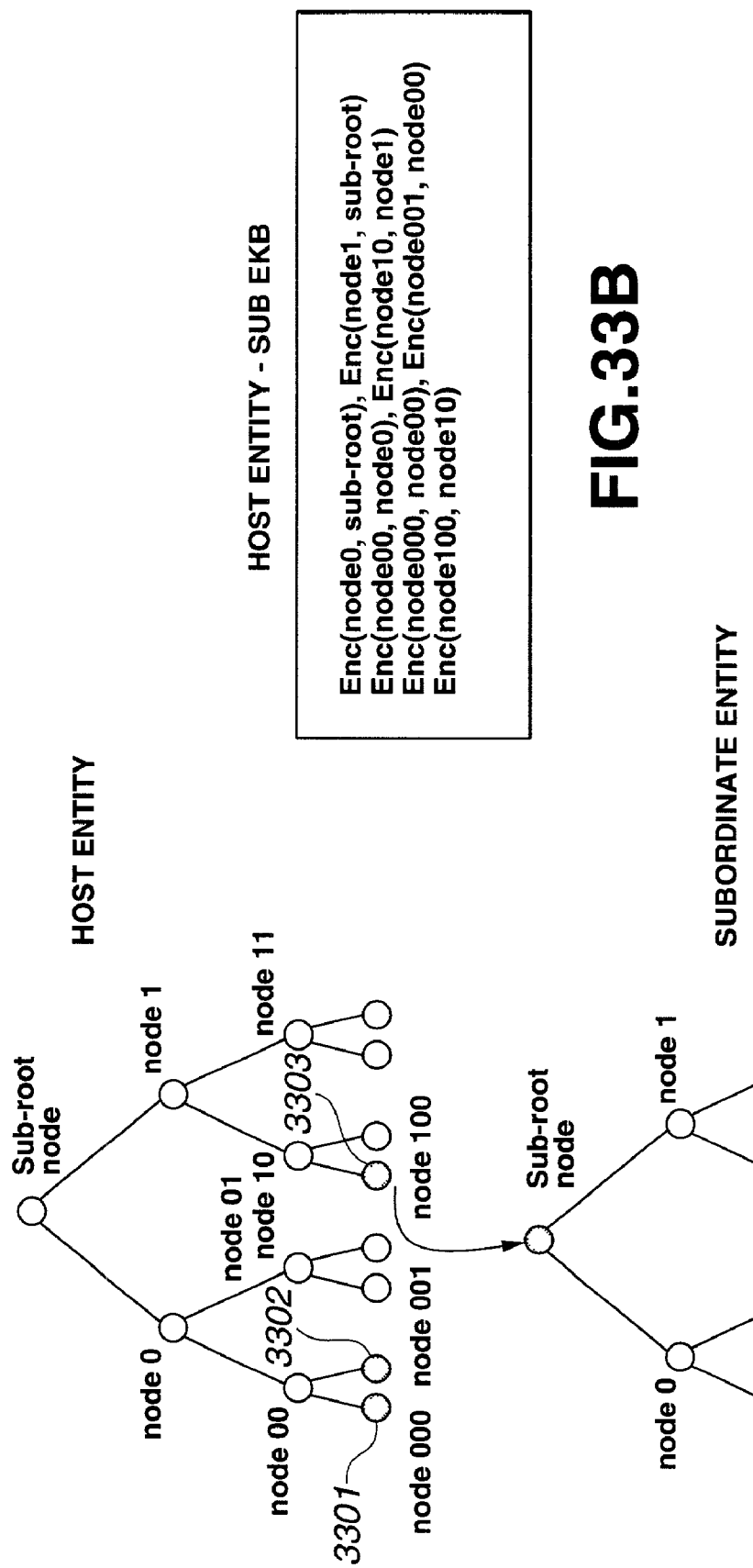

SYSTEM AND METHOD FOR PROCESSING INFORMATION USING ENCRYPTION KEY BLOCK

TECHNICAL FIELD

The present invention relates to an information processing system and an information processing method using an encryption key block, and a program distributing medium, and particularly, to a system and a method for distributing an encryption processing key in a system involving an encryption processing. Particularly, the invention relates to an information processing system and an information processing method using an encryption key block, and a program distributing medium, which uses a tree-structured hierarchical key distributing system to reduce data quantity contained in a distributing key block to thereby reduce a distributing message quantity, relieves loads of a content key distribution or data distribution when various keys are renewed, and can hold safety of data, and which realizes key distribution and management constitution based on capability by managing a hierarchical key distributing tree by using entities as sub-trees classified based on the capability as the data processing ability of devices under management, and relates to an information processing system and an information processing method using an encryption key block, and a program distributing medium, which realizes effective key distribution and management constitution by managing a hierarchical key distributing tree by using entities as subsets having a common element.

BACKGROUND ART

Recently, various software data (which will be hereinafter called contents) such as game programs, voice data, image data, and so on have been actively circulated through a network such as an internet, or storage media capable of being circulated such as DVD, CD, etc. These circulation contents are reproduced by reception of data by a PC (Personal Computer) owned by a user or game apparatus, or by mounting a memory medium, or are stored in a recording device within a recording and reproducing apparatus attached to PC and the like, for example, a memory card, a hard disk and the like, the contents being utilized by new reproducing from the stored medium.

Information apparatuses such as a video game apparatus, PC and the like have an interface for receiving the circulation contents from a network or for getting access to DVD, CD and the like, and further have control means necessary for reproducing the contents, and RAM, ROM and the like used as a memory region for programs and data.

Various contents such as music data, image data, or programs are called from a memory medium by user's instructions from the information apparatus such as a game apparatus, PC and the like used as a reproducing apparatus or user's instructions through input means connected, and are reproduced though information apparatus or a display, a speaker and the like connected.

Many software contents such as game programs, music data, image data and the like are generally held in their distribution rights by owners and sales agents. Accordingly, in distribution of these contents, there is a predetermined using limitation, that is, the use of software is granted to only valid users so that reproduction without permission is not made. That is, generally, the constitution taking security into consideration is employed.

One procedure for realizing the limit of use to users is an encryption processing of distributed contents. Namely, for example, various contents such as voice data, image data, game programs and the like encrypted through an internet or the like are distributed, and means for decrypting the encrypted contents distributed, that is, a decryption key is given to only persons confirmed to be a valid user.

Encrypted data can be returned to decrypted data that can be used by decrypting processing in accordance with the predetermined procedure. Data encrypting using a decryption key for decrypting processing, and a decrypting method, using an encrypted key for encryption processing of information as described have been heretofore well known.

There are a variety of kinds of forms of data encrypting and decrypting method using an encryption key and a decryption key, but there is, as one example therefor, a system called a so-called common key encryption system. In the common key encryption system, with an encryption key used for encrypting processing for data and a decryption key used for decrypting data made to be common, a common key used for these encrypting processing and decrypting is given to a valid user so as to eliminate the data access by an invalid user. As a typical system of the system as described, there is DES (Data Encryption Standard).

The encryption key and the decryption key used for the encrypting processing and decrypting as described above can be obtained by applying a unidirectional function such as a hash function on the basis of a pass-word or the like, for example. The unidirectional function herein termed is a function which is very difficult to obtain an input conversely from an output. For example, the unidirectional function is applied with a pass-word determined by a user as an input, and the encryption key and the decryption key are produced on the basis of the output. It is substantially impossible, from the encryption key and the decryption key thus obtained, to conversely obtain a pass-word which is an original datum thereof.

A system making processing by an encryption key used for encryption and processing by a decryption key used for decrypting different algorithm is a system so-called a public key encryption system. The public key encryption system is a method using a public key that can be used by an unspecific user, in which with respect to an encrypted document for a specific individual, encrypting processing is carried out using a public key distributed by the specific individual. The document encrypted by the public key can be subjected to decrypting processing merely by a private key corresponding to the public key used for the encrypting processing. The private key is owned merely by the individual who distributed the public key, and the document encrypted by the public key can be decrypted merely by the individual having the private key. Atypical public key encryption system is a RSA (Rivest-Shamir-Adleman) encryption. By making use of such an encryption system, there can be provided a system for enabling decrypting encrypted contents merely for a valid user.

In the content distributing system as described above employs many constitutions in which contents are encrypted and stored in the recording media such as a network, or DVD, CD and the like to provide them for users, and to provide a content key for decrypting encrypted contents for only a valid user. There is proposed a constitution in which a content key for preventing invalid copies of the content key itself is encrypted to provide it to a valid user, and an encrypted content key is decrypted using a decryption key owned by only the valid user to enable using the content key.

The judgment whether or not a user is valid is generally carried out by executing authenticating processing before distribution of contents or content keys, for example, between a content provider who is a transmitter of contents and a user's device. In general authenticating processing, confirmation is made of a mating party, and a session key effective only for communication is produced. When authentication is established, data, for example, contents or a content key is encrypted using the produced session key for communication. The authenticating system includes mutual authentication using a common key encryption system, and an authentication system using a public key system. In the authentication using a common key, a common key in the system wide is necessary, which is inconvenient at the time of renewal processing. Further, in the public key system, computation load is large and necessary memory quantity increases, and the provision of such a processing means on each device is not a desirable constitution.

DISCLOSURE OF THE INVENTION

It is an object of the present invention to provide an information processing system and an information processing method using an encryption key block, and a program distributing medium, which enables transmission of data safely to a valid user without relying on mutual authentication processing between a transmitter and a receiver of data as described above, and which realizes key distribution and management constitution based on capability by managing a hierarchical key distributing tree by using entities as sub-trees classified based on the capability as the data processing ability of devices under management.

It is another object of the present invention to provide an information processing system and an information processing method using an encryption key block, and a program distributing medium, which enables transmission of data safely to a valid user without relying on mutual authentication processing between a transmitter and a receiver of data as described above, and which realizes effective key distribution and management constitution by managing a hierarchical key distributing tree by using entities as subsets having a common element.

An information processing system using an encryption key block according to the present invention is one which constitutes a key tree in which respective keys are corresponded to a root, nodes and leaves on a path from the root to the leaves of a tree in which a plurality of devices are constituted as the leaves, executes renewal of keys on a selected path by selecting the path constituting the key tree and encryption processing of a superordinate key by a subordinate key and generates an enabling key block (EKB) to provide it to a device, and comprises a plurality of entities which constitute a part of the key tree, manage sub-trees classified based on capability as data processing ability of the devices, and generate a sub-enabling key block (sub-EKB) based only on a key set corresponding to nodes or leaves included in the sub-tree, and a key distribution center (KDC) which manages capability information of the plurality of entities and generates the enabling key block (EKB) decodable only by the entities having common capability by using the sub-enabling key block (sub-EKB) generated by the entities having the common capability.

In the information processing system using an encryption key block according to the present invention, the key distribution center (KDC) includes a capability management table in which respective identifiers for the plurality of entities, the capability information for the entities, and the sub-enabling key block (sub-EKB) are corresponded to one another, and selects an entity capable of processing distributed data to a device based on the capability management table to generate the enabling key block (EKB) decodable only by the devices under the selected entity.

In the information processing system using an encryption key block according to the present invention, a newly added entity to the key tree generates a sub-enabling key block (sub-EKB) based only on a key set corresponding to nodes or leaves in the sub-tree of the new entity, executes registration processing of the sub-EKB to the key distribution center (KDC), and executes notification processing of capability information of the own entity.

In the information processing system using an encryption key block according to the present invention, the plurality of entities have a hierarchical structure of superordinate entities and subordinate entities in which a terminal node at the lowermost stage of an entity is made to be a top node (sub-root) of another entity.

In the information processing system using an encryption key block according to the present invention, each of the plurality of entities has authority of setting and renewing the key corresponding to the nodes or leaves constituting the sub-tree which belongs to the own entity.

In the information processing system using an encryption key block according to the present invention, each device which belongs to an entity at the lowermost class with leaves at the lowermost stage in the entity being leaves corresponding to respective devices among the plurality of entities has stored therein a node key and a leaf key set in nodes and leaves on a path from a top node (sub-root) of the entity that the device itself belongs to through the leaf that corresponds to the device itself.

In the information processing system using an encryption key block according to the present invention, each of the plurality of entities adds a self management entity in the lower stage of the own entity, such that one or more nodes or leaves in the nodes or leaves at the lowermost stage of the own entity are reserved as reserve nodes.

In the information processing system using an encryption key block according to the present invention, the superordinate entity which adds the new entity to its terminal node sets a key corresponding to the terminal node of the superordinate entity as a node that sets the sub-tree of the new entity as a top node (sub-root) key of the new entity.

In the information processing system using an encryption key block according to the present invention, an entity which executes revoke processing of a device renews a node key set in nodes on a path from a top node (sub-root) in the entity through a leaf corresponding to the revoked device and generates a renewal sub-EKB into which the renewed node key is constituted as an encryption key decodable only by leaf devices other than the revoked device to send it to a superordinate entity, and the superordinate entity renews a node key on a path from a terminal node to which the renewal sub-EKB has been sent through its own sub-root and generates a renewal sub-EKB to send it to a further superordinate entity, such that the revoke processing of the device is executed by sequentially executing renewal sub-EKB generation and sending processing on the entity basis up to a highest entity to carry out renewal of each node key on the path from the revoked device through a root and executing registration processing of the renewal sub-EKB generated in the renewal of the node key to the key distribution center (KDC).

In the information processing system using an encryption key block according to the present invention, an entity which executes revoke processing of a subordinate entity renews a node key set in nodes on a path from a top node (sub-root) in the entity through a terminal node corresponding to the revoked entity and generates a renewal sub-EKB into which the node key has been renewed to send it to a superordinate entity, and the superordinate entity renews a node key on a path from a terminal node to which the renewal sub-EKB has been sent through its own sub-root and generates a renewal sub-EKB to send it to a further superordinate entity, such that the revoke processing on the entity basis is executed by sequentially executing renewal sub-EKB generation and sending processing on the entity basis up to a highest entity to carry out renewal of each node key on the path from the revoked entity through a root and executing registration processing of the renewal sub-EKB generated in the renewal of the node key to the key distribution center (KDC).

In the information processing system using an encryption key block according to the present invention, an entity which executes revoke processing of a subordinate entity renews a node key set in nodes except for a terminal node on a path from a top node (sub-root) in the entity through the terminal node corresponding to the revoked entity and generates a renewal sub-EKB into which the node key has been renewed to send it to a superordinate entity, and the superordinate entity renews a node key on a path from a terminal node to which the renewal sub-EKB has been sent through its own sub-root and generates a renewal sub-EKB to send it to a further superordinate entity, such that the revoke processing on the entity basis is executed by sequentially executing renewal sub-EKB generation and sending processing on the entity basis up to a highest entity to carry out renewal of each node key except for the terminal node corresponding to the revoked entity on the path from the revoked entity through a root and executing registration processing of the renewal sub-EKB generated in the renewal of the node key to the key distribution center (KDC).

Also, an information processing method using an encryption key block according to the present invention is one in an information processing system which constitutes a key tree in which respective keys are corresponded to a root, nodes and leaves on a path from the root to the leaves of a tree in which a plurality of devices are constituted as the leaves, executes renewal of keys on a selected path by selecting the path constituting the key tree and encryption processing of a superordinate key by a subordinate key and generates an enabling key block (EKB) to provide it to a device, and comprises the steps of generating a sub-enabling key block (sub-EKB) based only on a key set corresponding to nodes or leaves included in a sub-tree of each entity in entities which constitute a part of the key tree and manage sub-trees classified based on capability as data processing ability of the devices, and extracting a sub-enabling key block (sub-EKB) generated by entities having common capability based on capability information of the plurality of entities and generating the enabling key block (EKB) decodable only by the entities having the common capability in a key distribution center (KDC) which has the capability information of the plurality of entities.

In the information processing method using an encryption key block according to the present invention, the step of generating the enabling key block (EKB) in the key distribution center (KDC) includes the steps of selecting the entities having the common capability, generating an entity tree constituted by the entities selected in the entity selection step, renewing a node key constituting the entity tree, and generating an enabling key block (EKB) decodable only by the selected entities based on the node key renewed in the node key renewal step and a sub-EKB of the selected entities.

In the information processing method using an encryption key block according to the present invention, the key distribution center (KDC) includes a capability management table in which respective identifiers for the plurality of entities, the capability information for the entities, and the sub-enabling key block (sub-EKB) are corresponded to one another, and selects an entity capable of processing distributed data to a device based on the capability management table to generate the enabling key block (EKB) decodable only by the devices under the selected entity.

In the information processing method using an encryption key block according to the present invention, a newly added entity to the key tree generates a sub-enabling key block (sub-EKB) based only on a key set corresponding to nodes or leaves in the sub-tree of the new entity, executes registration processing of the sub-EKB to the key distribution center (KDC), and executes notification processing of capability information of the own entity.

In the information processing method using an encryption key block according to the present invention, each of the plurality of entities executes setting and renewing the key corresponding to the nodes or leaves constituting the sub-tree which belongs to the own entity.

In the information processing method using an encryption key block according to the present invention, the superordinate entity which adds the new entity to its terminal node sets a key corresponding to the terminal node of the superordinate entity as a node that sets the sub-tree of the new entity as a top node (sub-root) key of the new entity.

In the information processing method using an encryption key block according to the present invention, an entity which executes revoke processing of a device renews a node key set in nodes on a path from a top node (sub-root) in the entity through a leaf corresponding to the revoked device and generates a renewal sub-EKB into which the renewed node key is constituted as an encryption key decodable only by leaf devices other than the revoked device to send it to a superordinate entity, and the superordinate entity renews a node key on a path from a terminal node to which the renewal sub-EKB has been sent through its own sub-root and generates a renewal sub-EKB to send it to a further superordinate entity, such that the revoke processing of the device is executed by sequentially executing renewal sub-EKB generation and sending processing on the entity basis up to a highest entity to carry out renewal of each node key on the path from the revoked device through a root and executing registration processing of the renewal sub-EKB generated in the renewal of the node key to the key distribution center (KDC).

In the information processing method using an encryption key block according to the present invention, an entity which executes revoke processing of a subordinate entity renews a node key set in nodes on a path from a top node (sub-root) in the entity through a terminal node corresponding to the revoked entity and generates a renewal sub-EKB into which the node key has been renewed to send it to a superordinate entity, and the superordinate entity renews a node key on a path from a terminal node to which the renewal sub-EKB has been sent through its own sub-root and generates a renewal sub-EKB to send it to a further superordinate entity, such that the revoke processing on the entity basis is executed by sequentially executing renewal sub-EKB generation and sending processing on the entity basis up to a highest entity to carry out renewal of each node key on the path from the revoked entity through a root and executing registration processing of the renewal sub-EKB generated in the renewal of the node key to the key distribution center (KDC).

In the information processing method using an encryption key block according to the present invention, an entity which executes revoke processing of a subordinate entity renews a node key set in nodes except for a terminal node on a path from a top node (sub-root) in the entity through the terminal node corresponding to the revoked entity and generates a renewal sub-EKB into which the node key has been renewed to send it to a superordinate entity, and the superordinate entity renews a node key on a path from a terminal node to which the renewal sub-EKB has been sent through its own sub-root and generates a renewal sub-EKB to send it to a further superordinate entity, such that the revoke processing on the entity basis is executed by sequentially executing renewal sub-EKB generation and sending processing on the entity basis up to a highest entity to carry out renewal of each node key except for the terminal node corresponding to the revoked entity on the path from the revoked entity through a root and executing registration processing of the renewal sub-EKB generated in the renewal of the node key to the, key distribution center (KDC).

Further, A program distributing medium according to the present invention distributes a computer program which makes enabling key block (EKB) generating processing executed on a computer system in an information processing system which constitutes a key tree in which respective keys are corresponded to a root, nodes and leaves on a path from the root to the leaves of a tree in which a plurality of devices are constituted as the leaves, executes renewal of keys on a selected path by selecting the path constituting the key tree and encryption processing of a superordinate key by a subordinate key and generates an enabling key block (EKB) to provide it to a device. The computer program comprises the steps of generating a sub-enabling key block (sub-EKB) based only on a key set corresponding to nodes or leaves included in a sub-tree of each entity in entities which constitute a part of the key tree and manage sub-trees classified based on capability as data processing ability of the devices, and extracting a sub-enabling key block (sub-EKB) generated by entities having common capability based on capability information of the plurality of entities and generating the enabling key block (EKB) decodable only by the entities having the common capability in a key distribution center (KDC) which has the capability information of the plurality of entities.

An information processing system using an encryption key block according to the present invention is one which constitutes a key tree in which respective keys are corresponded to a root, nodes and leaves on a path from the root to the leaves of a tree in which a plurality of devices are constituted as the leaves, executes renewal of keys on a selected path by selecting the path constituting the key tree and encryption processing of a superordinate key by a subordinate key and generates an enabling key block (EKB) to provide it to a device, and comprises a plurality of entities which manage a sub-tree as a partial tree constituting the key tree and generate a sub-enabling key block (sub-EKB) based only on a key set corresponding to nodes or leaves included in the sub-tree, and a key distribution center (KDC) which generates the enabling key block (EKB) decodable only by selected entities by using the sub-enabling key block (sub-EKB) generated by the plurality of entities.

In the information processing system using an encryption key block according to the present invention, the plurality of entities have a hierarchical structure of superordinate entities and subordinate entities in which a terminal node at the lowermost stage of an entity is made to be a top node (sub-root) of another entity.

In the information processing system using an encryption key block according to the present invention, each of the plurality of entities has authority of setting and renewing the key corresponding to the nodes or leaves constituting the sub-tree which belongs to the own entity.

In the information processing system using an encryption key block according to the present invention, each device which belongs to an entity at the lowermost class with leaves at the lowermost stage in the entity being leaves corresponding to respective devices among the plurality of entities has stored therein a node key and a leaf key set in nodes and leaves on a path from a top node (sub-root) of the entity that the device itself belongs to through the leaf that corresponds to the device itself.

In the information processing system using an encryption key block according to the present invention, each of the plurality of entities adds a self management entity in the lower stage of the own entity, such that one or more nodes or leaves in the nodes or leaves at the lowermost stage of the own entity are reserved as reserve nodes.

In the information processing system using an encryption key block according to the present invention, the superordinate entity which adds the new entity to its terminal node sets a key corresponding to the terminal node of the superordinate entity as a node that sets the sub-tree of the new entity as a top node (sub-root) key of the new entity.

In the information processing system using an encryption key block according to the present invention, a newly added entity generates a sub-enabling key block (sub-EKB) based only on a key set corresponding to nodes or leaves in the sub-tree of the new entity and executes registration processing of the sub-EKB to the key distribution center (KDC).

In the information processing system using an encryption key block according to the present invention, an entity which executes revoke processing of a device renews a node key set in nodes on a path from a top node (sub-root) in the entity through a leaf corresponding to the revoked device and generates a renewal sub-EKB into which the renewed node key is constituted as an encryption key decodable only by leaf devices other than the revoked device to send it to a superordinate entity, and the superordinate entity renews a node key on a path from a terminal node to which the renewal sub-EKB has been sent through its own sub-root and generates a renewal sub-EKB to send it to a further superordinate entity, such that the revoke processing of the device is executed by sequentially executing renewal sub-EKB generation and sending processing on the entity basis up to a highest entity to carry out renewal of each node key on the path from the revoked device through a root and executing registration processing of the renewal sub-EKB generated in the renewal of the node key to the key distribution center (KDC).

In the information processing system using an encryption key block according to the present invention, an entity which executes revoke processing of a subordinate entity renews a node key set in nodes on a path from a top node (sub-root) in the entity through a terminal node corresponding to the revoked entity and generates a renewal sub-EKB into which the node key has been renewed to send it to a superordinate entity, and the superordinate entity renews a node key on a path from a terminal node to which the renewal sub-EKB has been sent through its own sub-root and generates a renewal sub-EKB to send it to a further superordinate entity, such that the revoke processing on the entity basis is executed by sequentially executing renewal sub-EKB generation and sending processing on the entity basis up to a highest entity to carry out renewal of each node key on the path from the revoked entity through a root and executing registration processing of the renewal sub-EKB generated in the renewal of the node key to the key distribution center (KDC).

In the information processing system using an encryption key block according to the present invention, an entity which executes revoke processing of a subordinate entity renews a node key set in nodes except for a terminal node on a path from a top node (sub-root) in the entity through the terminal node corresponding to the revoked entity and generates a renewal sub-EKB into which the node key has been renewed to send it to a superordinate entity, and the superordinate entity renews a node key on a path from a terminal node to which the renewal sub-EKB has been sent through its own sub-root and generates a renewal sub-EKB to send it to a further superordinate entity, such that the revoke processing on the entity basis is executed by sequentially executing renewal sub-EKB generation and sending processing on the entity basis up to a highest entity to carry out renewal of each node key except for the terminal node corresponding to the revoked entity on the path from the revoked entity through a root and executing registration processing of the renewal sub-EKB generated in the renewal of the node key to the key distribution center (KDC).

In the information processing system using an encryption key block according to the present invention, the entities are constituted as managing subjects of devices or entities belonging to a common category such as the device kind, service kind, managing means kind, etc.

Further, an information processing method using an encryption key block according to the present invention is one in an information processing system which constitutes a key tree in which respective keys are corresponded to a root, nodes and leaves on a path from the root to the leaves of a tree in which a plurality of devices are constituted as the leaves, executes renewal of keys on a selected path by selecting the path constituting the key tree and encryption processing of a superordinate key by a subordinate key and generates an enabling key block (EKB) to provide it to a device. The method comprises the steps of generating a sub-enabling key block (sub-EKB) based only on a key set corresponding to nodes or leaves included in a sub-tree of each entity in a plurality of entities which manage sub-trees as a partial tree constituting the key tree, and generating the enabling key block (EKB) decodable only by selected entities by using the sub-enabling key block (sub-EKB) generated by the plurality of entities in a key distribution center (KDC).

In the information processing method using an encryption key block according to the present invention, each of the plurality of entities executes setting and renewing the key corresponding to the nodes or leaves constituting the sub-tree which belongs to the own entity.

In the information processing method using an encryption key block according to the present invention, the superordinate entity which adds the new entity to its terminal node sets a key corresponding to the terminal node of the superordinate entity as a node that sets the sub-tree of the new entity as a top node (sub-root) key of the new entity.

In the information processing method using an encryption key block according to the present invention, a newly added entity generates a sub-enabling key block (sub-EKB) based only on a key set corresponding to nodes or leaves in the sub-tree of the new entity and executes registration processing of the sub-EKB to the key distribution center (KDC).

In the information processing method using an encryption key block according to the present invention, an entity which executes revoke processing of a device renews a node key set in nodes on a path from a top node (sub-root) in the entity through a leaf corresponding to the revoked device and generates a renewal sub-EKB into which the renewed node key is constituted as an encryption key decodable only by leaf devices other than the revoked device to send it to a superordinate entity, and the superordinate entity renews a node key on a path from a terminal node to which the renewal sub-EKB has been sent through its own sub-root and generates a renewal sub-EKB to send it to a further superordinate entity, such that the revoke processing of the device is executed by sequentially executing renewal sub-EKB generation and sending processing on the entity basis up to a highest entity to carry out renewal of each node key on the path from the revoked device through a root and executing registration processing of the renewal sub-EKB generated in the renewal of the node key to the key distribution center (KDC).

In the information processing method using an encryption key block according to the present invention, an entity which executes revoke processing of a subordinate entity renews a node key set in nodes on a path from a top node (sub-root) in the entity through a terminal node corresponding to the revoked entity and generates a renewal sub-EKB into which the node key has been renewed to send it to a superordinate entity, and the superordinate entity renews a node key on a path from a terminal node to which the renewal sub-EKB has been sent through its own sub-root and generates a renewal sub-EKB to send it to a further superordinate entity, such that the revoke processing on the entity basis is executed by sequentially executing renewal sub-EKB generation and sending processing on the entity basis up to a highest entity to carry out renewal of each node key on the path from the revoked entity through a root and executing registration processing of the renewal sub-EKB generated in the renewal of the node key to the key distribution center (KDC).

In the information processing method using an encryption key block according to the present invention, an entity which executes revoke processing of a subordinate entity renews a node key set in nodes except for a terminal node on a path from a top node (sub-root) in the entity through the terminal node corresponding to the revoked entity and generates a renewal sub-EKB into which the node key has been renewed to send it to a superordinate entity, and the superordinate entity renews a node key on a path from a terminal node to which the renewal sub-EKB has been sent through its own sub-root and generates a renewal sub-EKB to send it to a further superordinate entity, such that the revoke processing on the entity basis is executed by sequentially executing renewal sub-EKB generation and sending processing on the entity basis up to a highest entity to carry out renewal of each node key except for the terminal node corresponding to the revoked entity on the path from the revoked entity through a root and executing registration processing of the renewal sub-EKB generated in the renewal of the node key to the key distribution center (KDC).

Further, a program distributing medium according to the present invention distributes a computer program which makes enabling key block (EKB) generating processing executed on a computer system in an information processing system which constitutes a key tree in which respective keys are corresponded to a root, nodes and leaves on a path from the root to the leaves of a tree in which a plurality of devices are constituted as the leaves, executes renewal of keys on a selected path by selecting the path constituting the key tree and encryption processing of a superordinate key by a subordinate key and generates an enabling key block (EKB) to provide it to a device. The computer program comprises the steps of generating a sub-enabling key block (sub-EKB) based only on a key set corresponding to nodes or leaves included in a sub-tree of each entity in a plurality of entities which manage sub-trees as a partial tree constituting the key tree, and generating the enabling key block (EKB) decodable only by selected entities by using the sub-enabling key block (sub-EKB) generated by the plurality of entities in a key distribution center (KDC).

In the information processing system and the information processing method using an encryption key block according to the present invention, the tree-structured hierarchical encryption key distributing system is used to reduce a distributing message quantity needed for key renewal. That is, the key distribution method in which each device is arranged to each leaf of n trees is used, and a content key which is, for example, an encryption key of content data, an authentication key used for authentication processing, or a program code is distributed with an enabling key block. Thus, it is possible to safely distribute data decodable only by a valid device.

Also, in the information processing system and the information processing method using an encryption key block according to the present invention, a hierarchical key distribution tree is managed by entities as sub-trees classified based on capability as data processing ability of devices under management to realize a key distribution and a management structure based on capability.

Further, in the information processing system and the information processing method using an encryption key block according to the present invention, an effective key distribution and an effective management structure are realized in which a hierarchical key distribution tree is managed by entities as a partial set having a common element.

It is noted that the program distributing medium according to the present invention is a medium for distributing a computer program in the form that can be read by a computer to a general computer system capable of executing, for example, various program codes. The medium includes recording media such as CD, FD, MO, etc., or a transfer medium such as a network, whose form is not particularly limited.

Such a program distributing medium defines a cooperative relationship in terms of constitution or function between a computer program and a distributing medium in order to realize a function of a predetermined computer program in a computer system. In other words, a computer program is installed in a computer system through the distributing medium to exhibit the cooperative operation in the computer system to obtain the operation and effect similar to another aspects.

The other objects, features and advantages of the present invention will be apparent from the detailed description with reference to the embodiments and the accompanying drawings of the present invention.

BRIEF DESCRIPTION OF THE DRAWINGS

FIGS. 4A and 4B are views each showing an example of an enabling key block (EKB) used in distribution of various keys and data in the information processing system according to the present invention.

FIGS. 11A and 11B are views each showing comparison between processing for sending an enabling key block (EKB) and contents in the information processing system according to the present invention and a conventional sending processing.

FIGS. 26A and 26B are views each for explaining a simplified enabling key block (EKB) (Example 1) in the information processing system of the present invention.

FIGS. 28A to 28C are views each for explaining, in detail, an entity control constitution of a hierarchical tree structure in the information processing system of the present invention.

FIGS. 33A and 33B are views each for explaining a sub-EKB used in an entity control constitution of a hierarchical tree structure in the information processing system of the present invention.

BEST MODE FOR CARRYING OUT THE INVENTION

[Outline of System]

Figure 1:
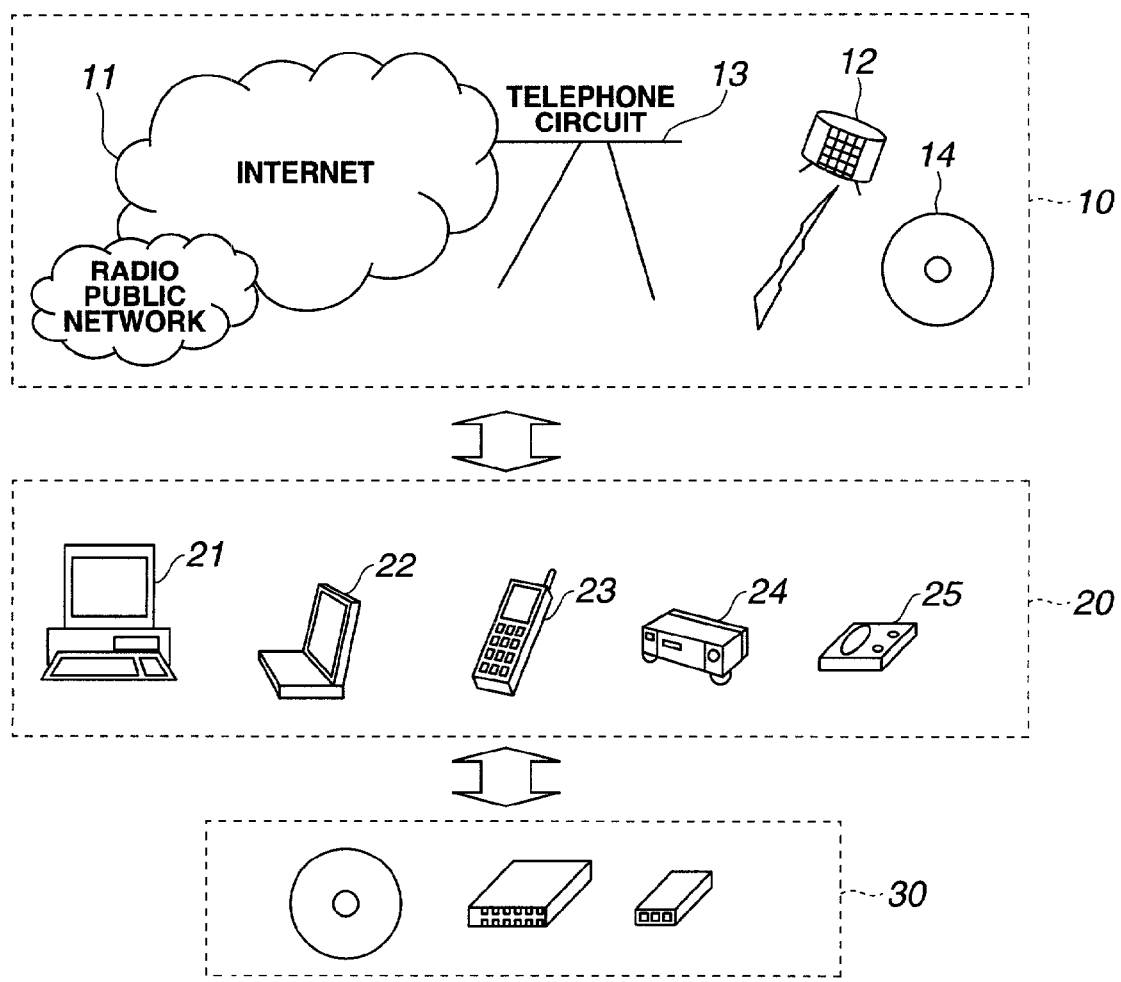
FIG. 1 is a view for explaining an example of constitution of an information processing system according to the present invention.

FIG. 1 shows an example of a content distributing system to which the data processing system of the present invention can be applied. The content distributing side 10 transmits a content or a content key encrypted to various content reproducible apparatuses on the content receiving side 20. The apparatus on the content receiving side 20 decrypts an encrypted content or a content key received to obtain a content or a content key, and carries out reproduction of image data and voice data or execution of various programs. The exchange of data between the content distributing side 10 and the content receiving side 20 is executed through a network such as an internet or through a circulatable recording medium such as DVD, CD.

The data distributing means on the content distributing side 10 includes an internet 11, a satellite broadcasting 12, a telephone circuit 13, media 14 such as DVD, CD, etc., and on the other hand, the devices on the content receiving side 20 include a personal computer (PC) portable apparatuses 23 such as a portable device (PD), a portable telephone, PDA (Personal Digital Assistants), etc., a recording and reproducing unit 24 such as DVD, CD players, and a reproduction exclusive-use unit 25 such as a game terminal. In these devices on the content receiving side 20, contents distributed from the content distributing side 10 are obtained from communication means such as a network, or from a media 30.

[Constitution of Device]

Figure 2:
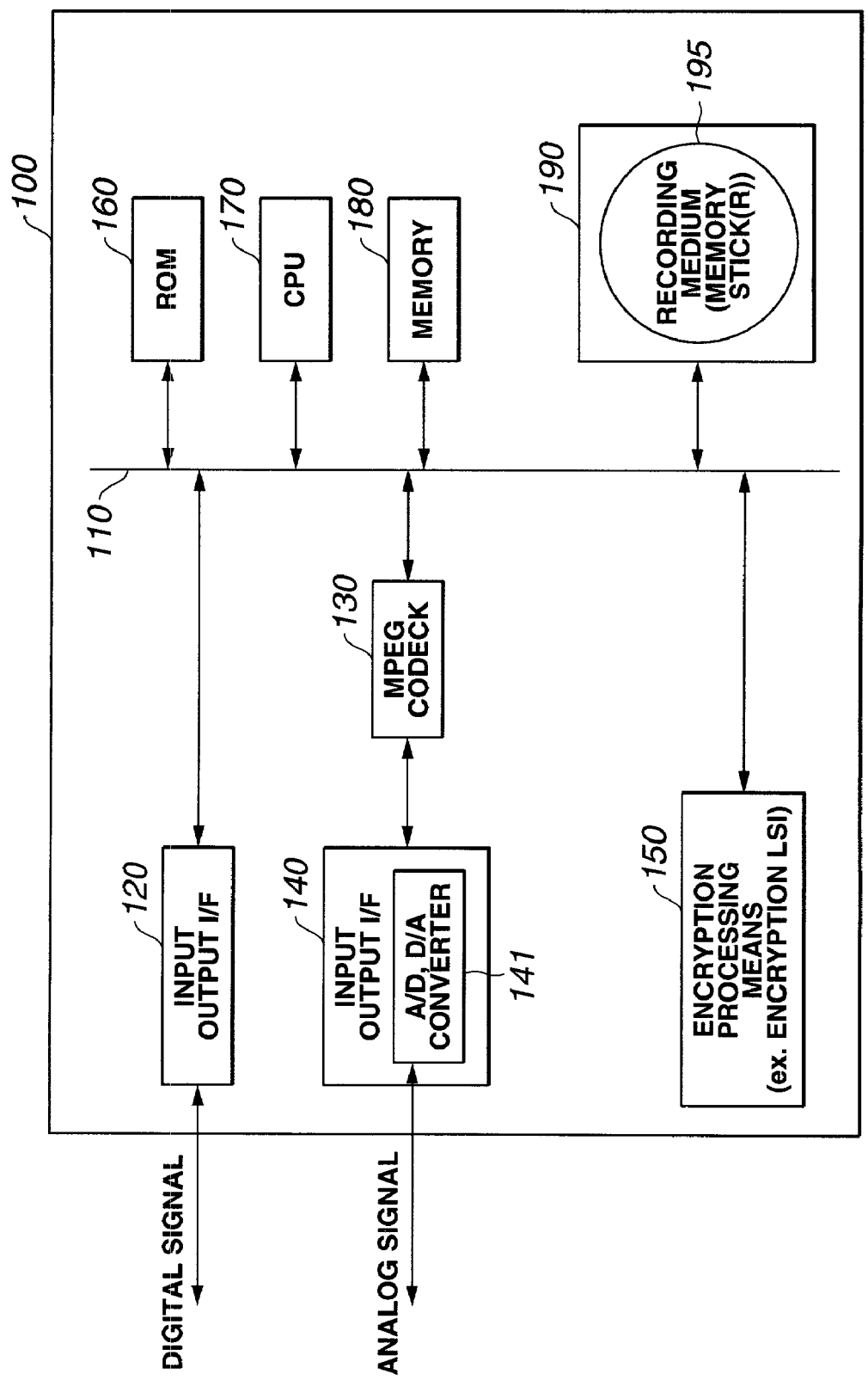
FIG. 2 is a block diagram showing an example of constitution of a recording and reproducing apparatus that can be applied in the information processing system according to the present invention.

FIG. 2 shows a block diagram of a recording and reproducing device 100 as one example of devices on the content receiving side 20 shown in FIG. 1. The recording and reproducing device 100 has an input/output I/F (Interface) 120, a MPEG (Moving Picture Experts Group) codec 130, an I/F (Interface) 140 provided with A/D, D/A converter 141, an encryption processing means 150, ROM (Read Only Memory) 160, CPU (Central Processing Unit) 170, a memory 180, and a drive 190 for a recording medium 195, which are connected to each other by a bus 110.

The input/output I/F 120 receives a digital signal constituting various contents such as an image, voice, a program, etc. supplied from the outside to output it to the bus 110, and receives a digital signal of the bus 110 to output it to the outside. The MPEG codec 130 decrypts MPEG coded data supplied through the bus 110 to output it to the input/output I/F 140, and MPEG-decrypts a digital signal supplied from the input/output I/F 140 to output it to the bus 110. The input/output I/F 140 contains an A/D, D/A converter 141 therein. The input/output I/F 140 receives an analog signal as a content supplied from the outside, which is subjected to A/D (Analog Digital) conversion by the A/D, D/A converter 141 whereby the signal is output as a digital signal to the MPEG codec 130, and a digital signal from the MPEG codec 130 is subjected to D/A (Digital Analog) conversion by the A/D, D/A converter 141, which is output as an analog signal to the outside.

The encryption processing means 150 is constituted form, for example, one chip LSI (Large Scale Integrated circuit), to execute encrypting, decrypting processing or authentication processing of a digital signal as a content supplied through the bus 110, and output encrypted data and decrypted data to the bus 110. The encryption processing means 150 can be also realized by not only the one chip LSI but by a combination of various soft wares or hard wares. The constitution of the processing means formed from the software configuration will be described later.

ROM 160 stores program data processed by the recording and reproducing device. The CPU 170 executes programs stored in the ROM 160 and the memory 180 to thereby control the MPEG codec 130 and the encryption processing means 150. The memory 180 is for example, a non-volatile memory, which stores a program that is executed by the CPU 170, data necessary for operation of CPU 170, and a key set used in the encryption processing executed by the device. The key set will be explained later. The drive 190 drives the recoding medium 195 capable of recording and reproducing digital data to thereby read (reproduce) digital data from the recording medium 195 to output it to the bus 110, and supplies digital data supplied through the bus 110 to the recording medium 195 for recording.

The recording medium 195 is a medium capable of storing digital data, for example, an optical disk such as DVD, CD, an optical magnetic disk, a magnetic disk, a magnetic tape, or a semiconductor memory such as RAM, and in the present embodiment, the medium can be detachably mounted on the drive 190. However, the recording medium 195 may be housed in the recording and reproducing device 100.

The encryption processing means 150 shown in FIG. 2 may be constituted as a single one-chip LSI, and may employ a constitution that is realized by a combination of a software and a hardware.

[Tree Structure as a Key Distributing Constitution]

Next, the constitution for holding an encryption processing key in each device and a data distributing constitution where encrypted data are distributed from the content distributing side 10 shown in FIG. 1 to each device on the content receiving side 20 will be described using FIG. 3.

Figure 3:
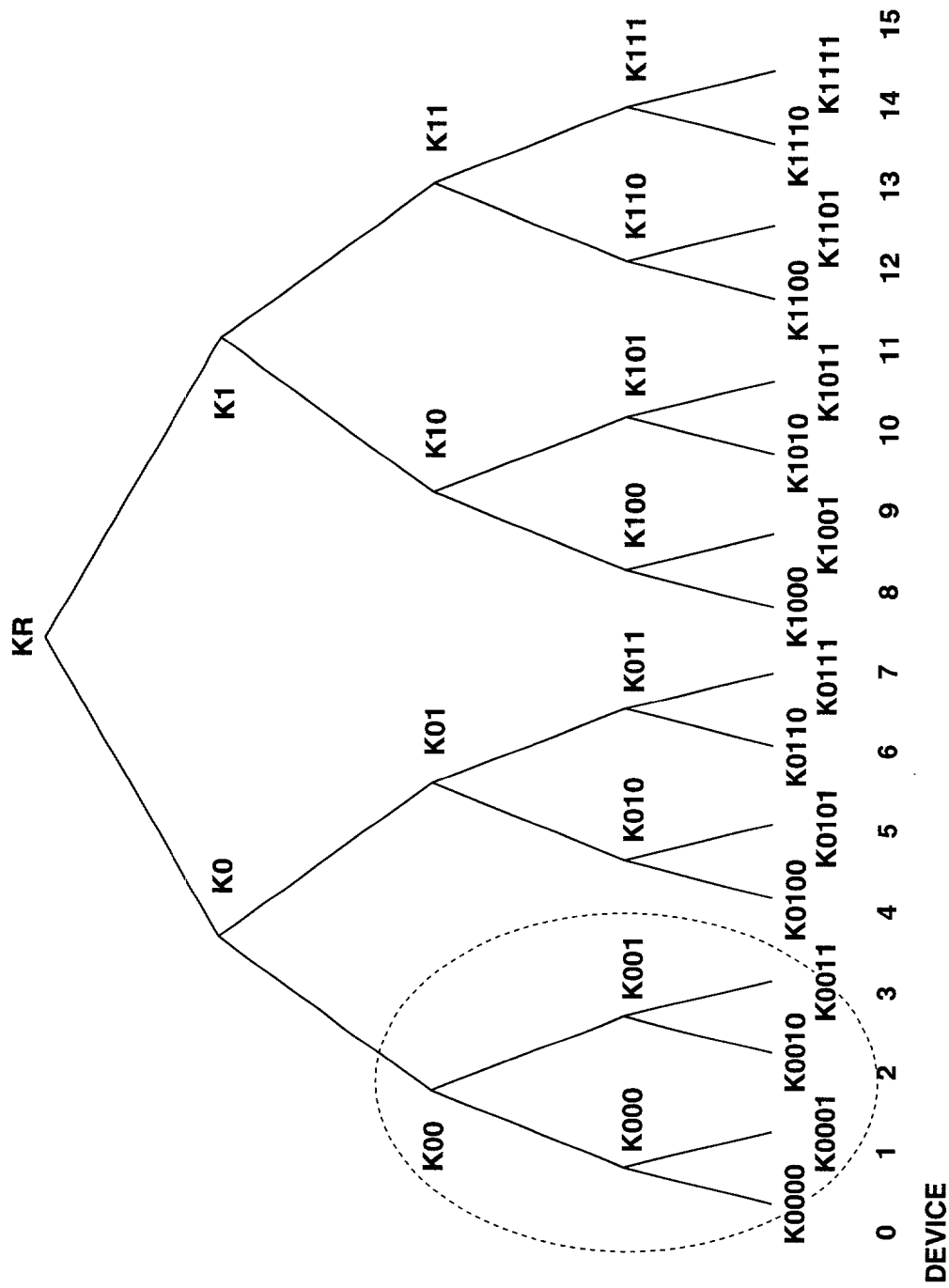
FIG. 3 is a tree constitution view for explaining encryption processing of various keys and data in the information processing system according to the present invention.

Numbers 0 to 15 shown in the lowest stage in FIG. 3 are individual devices on the content receiving side 20. That is, each leaf of the hierarchical tree structure shown in FIG. 3 corresponds to a device.

Each of devices 0 to 15 stores a key set comprising a key assigned to a node from own leaf to a root (a node key) and a leaf key of each leaf, in the hierarchical tree shown in FIG. 3, at the time of manufacture or at the time of shipment, or afterwards. K0000 to K1111 shown in the lowest stage of FIG. 3 are respectively leaf keys assigned to devices 0 to 15, and keys from KR to K111 described in the second node from the lowest stage are node keys.

In the constitution shown in FIG. 3, for example, a device 0 has a leaf key K0000 and node keys K000, K00, K0, KR. A device 5 has K0101, K010, K01, K0, KR. A device 15 has K111, K111, K11, K1, KR. In the tree of FIG. 3, only 16 devices 0 to 15 are described, and the tree structure is shown as a systematic constitution to left and right well balanced of a 4-stage constitution. However, much more devices may be constituted in the tree, and the parts of the tree may have the different number of stages.

Further, each device included in the tree structure shown in FIG. 3 includes various recording media, for example, DVD, CD, MD of the embedded type or the type detachably mounted on the device, or devices of various types using a flash memory or the like. Further, various application service may coexist. In addition to the coexisting constitution of various devices and various application, the hierarchical tree structure which is a content or a key distributing constitution shown in FIG. 3 is applied.

In the system in which various devices and applications coexist, for example, a portion surrounded by the dotted line in FIG. 3, that is, the devices 0, 1, 2 and 3 are set as a single group using the same recording medium. For example, with respect to the device included in the group surrounded by the dotted line, processing is executed such that a common content is encrypted and sent from a provider, a content key used in common to devices is sent, or payment data for content charges is also encrypted and output from each device to a provider or a settlement organization. The organization for carrying out data transmit-receiving to and from the devices such as a content provider or a settlement organization executes processing for sending the portion surrounded by the dotted line of FIG. 3, that is, data collectively with the device 0, 1, 2, 3 as one group. A plurality of such groups are present in the tree of FIG. 3. The organization for carrying out data transmit-receiving to and from devices such as a content provider or a settlement organization functions as message data distributing means.

Node keys and leaf keys may be controlled collectively by a single key control center, or may be controlled every group by message data distributing means such as a provider, or a settlement organization for carrying out transmit-receiving of various data with respect to groups. These node keys and leaf keys are subjected to renewal processing when a key is leaked. This renewal processing is executed by a key control center, a provider or a settlement organization.

In this tree structure, as will be apparent from FIG. 3, three devices 0, 1, 2, 3 included in one group hold common keys K00, K0, KR as a node key. By utilizing this node key common constitution, for example, a common content key can be distributed to only devices 0, 1, 2, 3. For example, if the node key K00 itself held in common is set as a content key, only the devices 0, 1, 2, 3 can be set as a common content key without executing new sending of key. Further, a value Enc(K00, Kcon) obtained by encrypting a new content key Kcon by a node key K00 is distributed to the devices 0, 1, 2, 3 through a network or by being stored in the recording medium, only the devices 0, 1, 2, 3 can decryption the encrypted Enc(K00, Kcon) using a common node key K00 held in the respective devices to obtain a content key: Kcon. The Enc(Ka, Kb) indicates data into which Kb is encrypted by Ka.

Further, where at the time t, keys: K0011, K001, K00, K0, KR owned by the device 3 are analyzed by a hacker and then exposed, it is necessary for protecting data transmit-received in a system (a group of devices 0, 1, 2, 3) to separate the device 3 from the system. To this end, node keys: K001, K00, K0, KR are respectively renewed to new keys K(t)001, K(t)00, K(t)0, K(t)R, which renewed keys to be notified to the devices 0, 1, 2. Here, K(t)aaa indicates a renewal key of Kaaa of generation: t.

The distributing processing of renewal key will be described. Renewal of key is executed by storing a table constituted by block data called an enabling key block (EKB: Enabling Key Block) shown in FIG. 4A in a network, for example, or in a recording medium to supply them to the devices 0, 1, 2. The enabling key block (EKB) is constituted by a decryption key for distributing a key newly renewed to a device corresponding to each leaf constituting a tree structure as shown in FIG. 3. The enabling key block (EKB) is sometimes called a key renewal block (KRB: Key Renewal Block).

In the enabling key block (EKB) shown in FIG. 4A, only the device in which a node key need to be renewed is constituted as block data having a data constitution that can be renewed. An example of FIGS. 4A and 4B shows, in the devices 0, 1 and 2 in the tree structure shown in FIG. 3, block data formed for the purpose of distributing a renewal node key of generation t. As will be apparent from FIG. 3, the device 0 and the device 1 require K(t)00, K(t)0, K(t)R as renewal node keys, and the device 2 requires K(t)00 1, K(t)00, K(t)0, K(t)R as renewal node keys.

As shown in EKB of FIG. 4A, a plurality of encrypted keys are included in EKB. The encrypted key in the lowest stage is Enc(K0010, K(t)001). This is a renewal node key K(t)001 encrypted by a leaf key K0010 of the device 2, and the device 2 is able to decrypt this encrypted key by its leaf key to obtain K(t)001. By using K(t)001 obtained by decrypting, an encrypted key Enc(K(t)001, K(t)00) in the second stage from bottom can be decrypted to obtain a renewal node key K(t)00. Sequentially, an encrypted key Enc(K(t)00, K(t)0) in the second stage from top of FIG. 4A is decrypted to obtain a renewal node key K(t)0, and an encrypted key Enc(K(t)0, K(t)R) in the first stage from top of FIG. 4A is decrypted to obtain K(t)R. On the other hand, in the device K 0000, K0001, a node key K000 is not included to be renewed, and a key necessary for a renewal node key is K(t)00, K(t)0, K(t)R. The device K0000.K0001 decrypts an encrypted key Enc(K000, K(t)00) in the third stage from top of FIG. 4A to obtain K(t)00, and thereafter, an encrypted key Enc(K(t)00, K(t)0) in the second stage from top of FIG. 4A is decrypted, and an encrypted key Enc(K(t)0, K(t)R) in the first stage from top of FIG. 4A is decrypted to obtain K(t)R. By doing so, the devices 0, 1, 2 can obtain a renewed key K(t)001, K(t)00, K(t)0 and K(t)R. The index in FIG. 4A shows the absolute address of a node key and a leaf key used as a decryption key.

Where renewal of a node key: K(t)0, K(t)R in the upper stage in the tree structure shown in FIG. 3 is unnecessary, and a renewal processing of only the node key K00 is necessary, an enabling key block (EKB) in FIG. 4B can be used to distribute a renewal nod key K(t)00 to the devices 0, 1, 2.

EKB shown in FIG. 4B can be used, for example, to distribute a new content key in common in a specific group. Concretely, it is supposed that the devices 0, 1, 2, 3 shown by the dotted line in FIG. 3 use a recording medium, and a new common content key K(t)con is necessary. At this time, Enc(K(t)00, K(t)con) into which new common content key: K(t)con is encrypted with K(t)00 into which a common node key K00 of the devices 0, 1, 2 is renewed is distributed with EKB shown in FIG. 4B. By this distribution, distribution of data not decrypted in the apparatus of other groups such as a device 4 becomes enabled.

That is, if the devices 0, 1, 2 decrypt the encrypted sentence using K(t)00 obtained by processing EKB, a content key at the time t K(t)con can be obtained.

[Distribution of a Content Key Using EKB]

Figure 5:
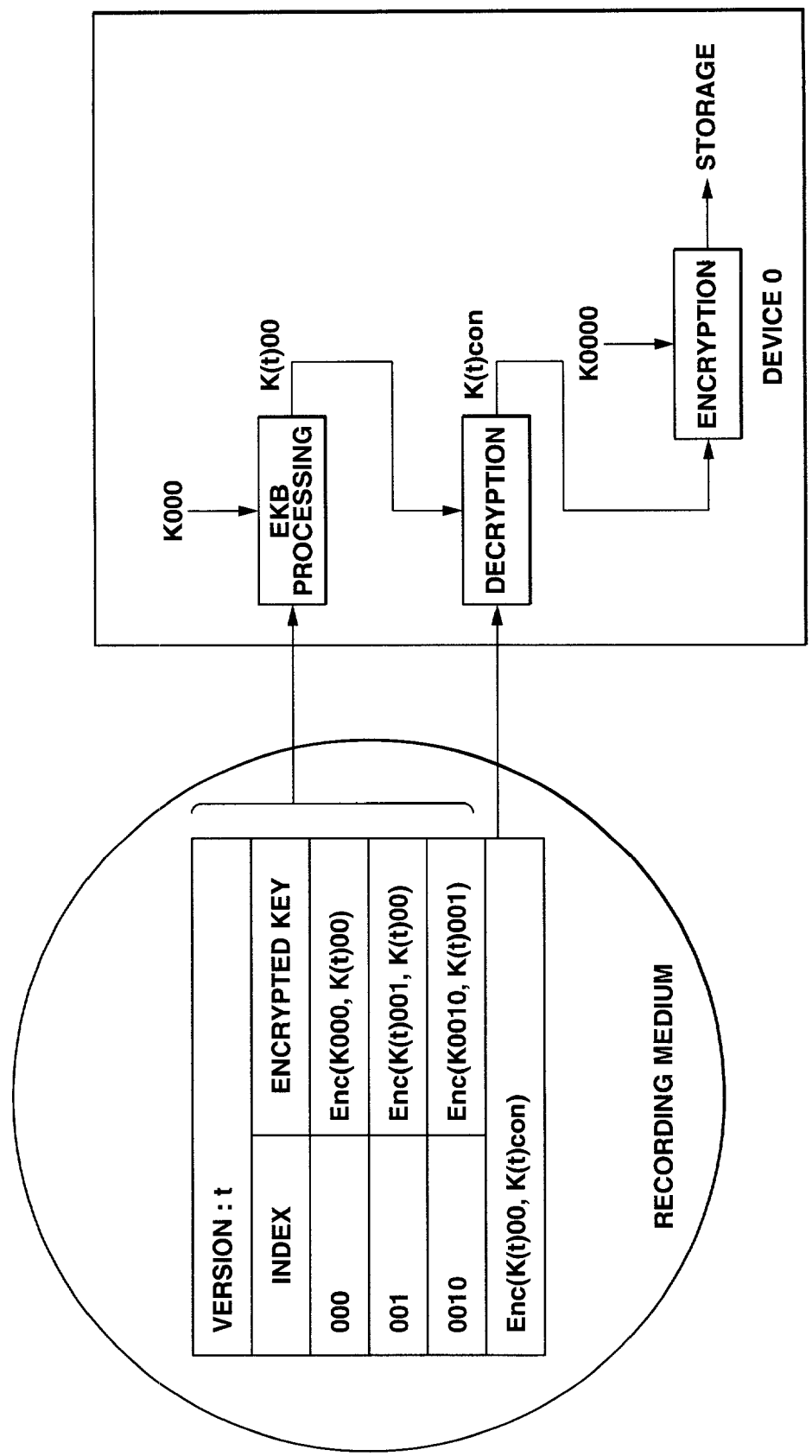
FIG. 5 is a view showing an example of distribution and an example of decrypting processing using an enabling key block (EKB) of content keys in the information processing system according to the present invention.

FIG. 5 shows, as an example of processing for obtaining a content key at the time t K(t)con, a processing of a device 0 which receives, through a recording medium, data Enc(K(t)00, K(t.)con into which a new common content key K(t)con is encrypted using K(t)00 and EKB shown in FIG. 4B. That is, this is an example in which encrypted message data by EKB is a content key K(t)con.

As shown in FIG. 5, a device 0 uses generation: EKB at generation: t stored in the recording medium and a node key K000 stored in advance by itself to produce a node key K(t)00 by the EKB processing similar to that described above. Further, a renewal content key K(t)con is decrypted using a renewal node key K(t)00 decrypted, and is encrypted by a leafkey K0000 owned by itself and stored in order to use it later.

[Format of EKB]

Figure 6:
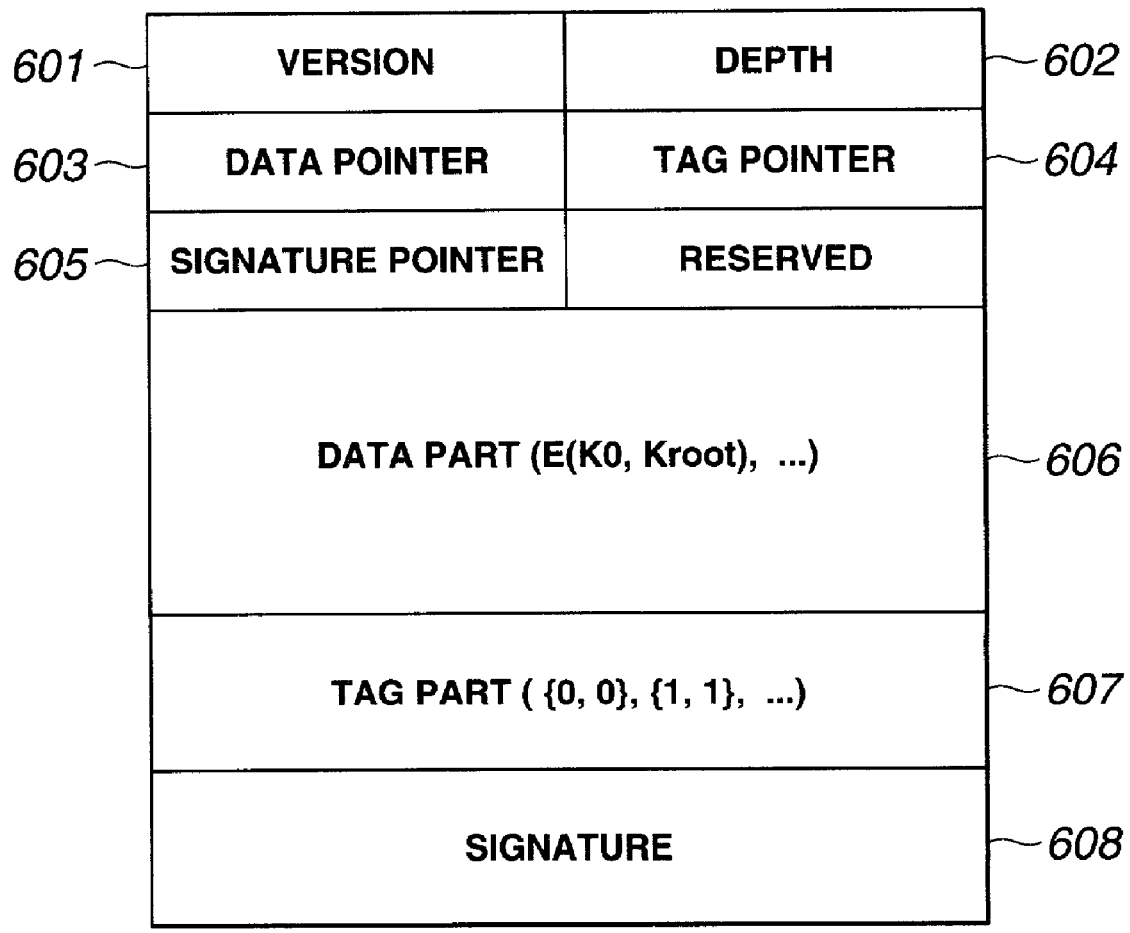
FIG. 6 is a view showing an example of a format of an enabling key block (EKB) in the information processing system according to the present invention.

FIG. 6 shows an example of format of the enabling key block (EKB). A version 601 is a discriminator showing the version of the enabling key block (EKB). The version has a function for showing a corresponding relation between a function for discriminating latest EKB and a content. The depth shows the number of hierarchies of a hierarchical tree with respect to a device of the distributing destination of the enabling key block (EKB). A data pointer 603 is a pointer for indicating a position of data part in the enabling key block (EKB), and a tag pointer 604 is a pointer for indicating a position of a tag part, and a signature pointer 605 is a pointer for indicating a position of signature.

A data part 606 stores, for example, data having a node key to be renewed encrypted. For example, it stores various encrypted keys in connection with a renewal node key as shown in FIG. 5.

Figure 7:
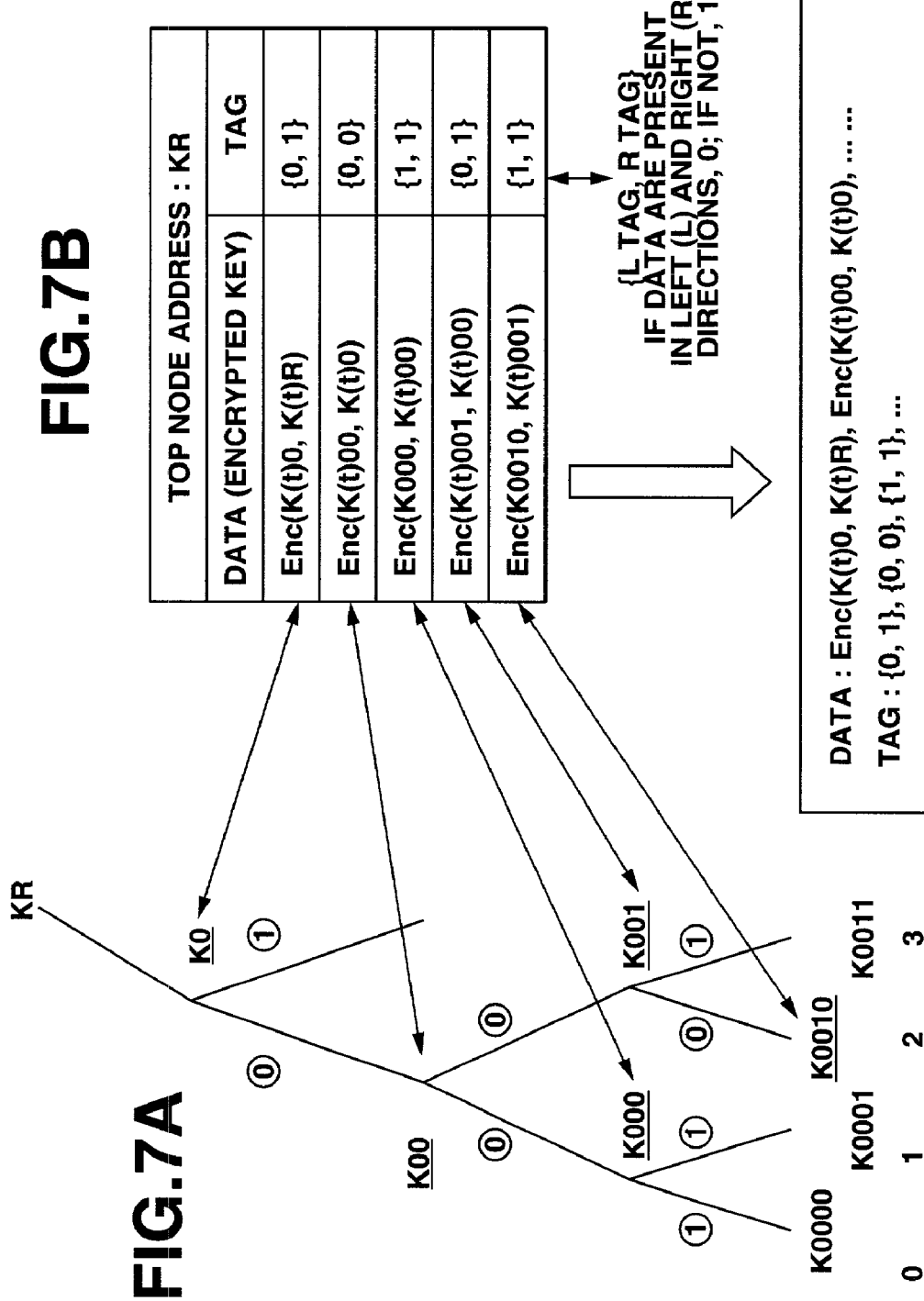
FIGS. 7A to 7C are views each for explaining a constitution of a tag of an enabling key block (EKB) in the information processing system according to the present invention.

A tag part 607 is a tag for indicating a positional relationship of encrypted node keys and leafkeys stored in the data part. An attaching rule of this tag will be described with reference to FIGS. 7A to 7C. FIGS. 7A to 7C show an example for sending the enabling key block (EKB) described previously in FIG. 4A as data. The data at that time is as shown in FIG. 7B. An address of a top node included in an encrypted key at that time is used as a top node address. In this case, since a renewal key of a root key K(t)R is included, a top node address is KR. At this time, for example, data Enc(K(t)0, K(t)R) in the uppermost stage is at a position shown in a hierarchical tree shown in FIG. 7A. Next data is Enc(K(t)00, K(t)0), which is at a position under on the left hand of the previous data in the tree. Where data is exist, a tag is set to 0, and where data is not exist, a tag is set to 1. The tag is set as (left (L) tag, right (R) tag). Since data is exist at left of data at the top stage Enc(K(t)0, K(t)R), L tag=0, and since data is not exist to right, R tag=1. Tags are set to all the data to constitute a row of data and a row of tags shown in FIG. 7C.

The tag is set in order to show at which position of the tree structure data Enc(Kxxx, Kyyy) is positioned. Since the key data Enc(Kxxx, Kyyy) . . . are mere enumerated data of simply encrypted keys, a position on the tree of an encrypted key stored as data can be discriminated by the aforementioned tag. For example, data constitution as in the following can be provided using the node index placed in correspondence to the encrypted data like the constitution described in FIGS. 4A and 4B previously without using the aforementioned tag:

0: Enc(K(t)0, K(t)root)
00: Enc(K(t)00, K(t)0)
000: Enc(K(t)000, K(t)00)
. . .

However, the constitution using such an index as described results in lengthy data to increase data quantities, which is not preferable in the distribution through a network. On the other hand, the aforementioned tag is used as index data showing a key position whereby a key position can be discriminated with less data quantity.

Returning to FIG. 6, the EKB format will be her described. The signature is an electronic signature executed, for example, by a key control center, a content provider, a settlement organization or the like which distributed the enabling key block (EKB). The device which received EKB confirms by authentication of signature that it is an enabling key block (EKB) distributed by a valid enabling key block (EKB) distributor.

[Content Key Using EKB and Distribution of Contents]

While in the aforementioned example, a description was made of an example in which only the content key is sent along with EKB, a description will be made hereinafter of the constitution in which a content encrypted by a content key, and a content key encrypted by a content encrypted key along with a content key encryption key encrypted by EKB are sent.

Figure 8:
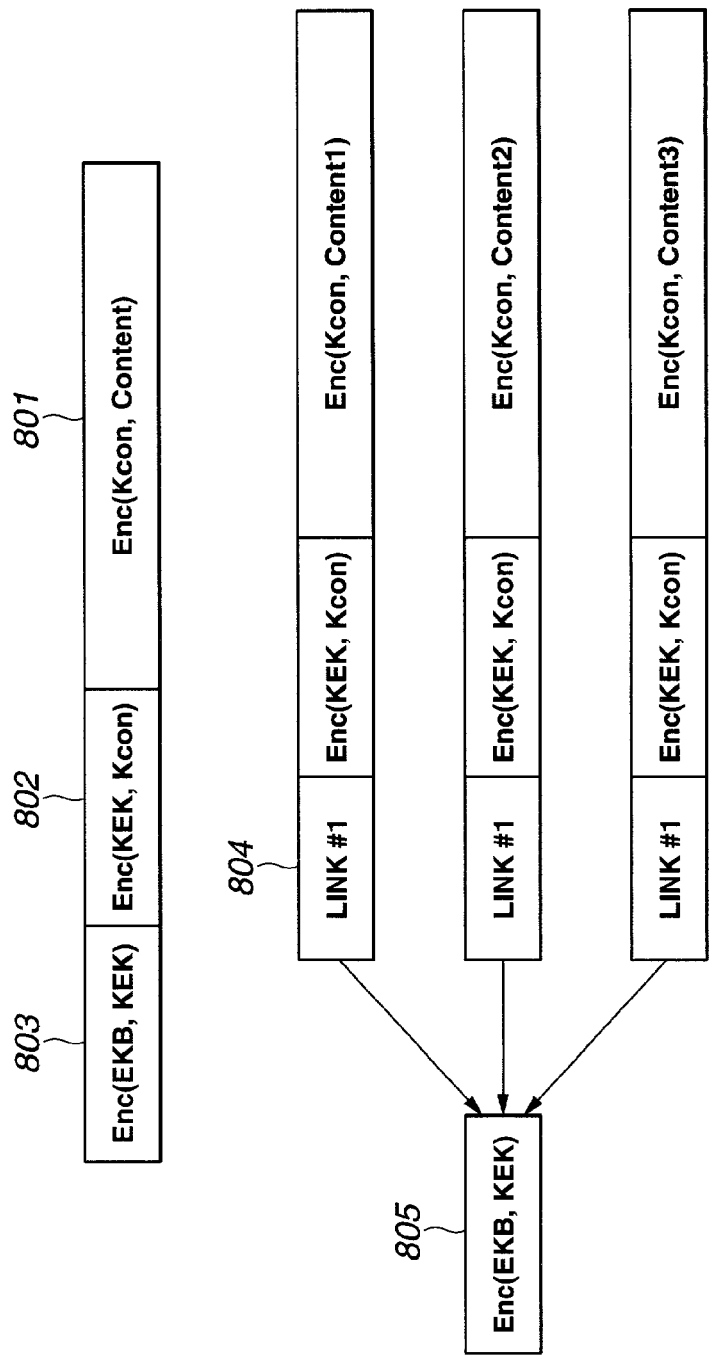
FIGS. 8A and 8B are views each showing an enabling key block (EKB) and an example of data constitution for distributing content keys and contents in the information processing system according to the present invention.

FIGS. 8A and 8B show this data constitution. In the constitution shown in FIG. 8A, Enc(Kcon, content) 801 is data in which a content is encrypted by a content key(Kcon), Enc(KEK, Kcon) 802 is data in which a content key (Kcon) is encrypted by a content key-encryption key (KEK: Key Encryption key), and Enc(EKB, KEK) 803 is data in which a content key-encryption key KEK is encrypted by an enabling key block (EKB).

Here, the content key-encryption key KEK may be a node key (K000, K00 . . . ) or a root key (KR) itself, and may be a key encrypted by a node key (K000, K0 . . . ) or a root key (KR).

FIG. 8B shows an example of constitution where a plurality of contents are recorded in media, which makes use of the same Enc(EKB, KEX) 805. In such a constitution as described, the same Enc(EKB, KEK) is not added to each data, but data showing a linking destination linked to Enc (EKB, KEK) is added to each data.

Figure 9:
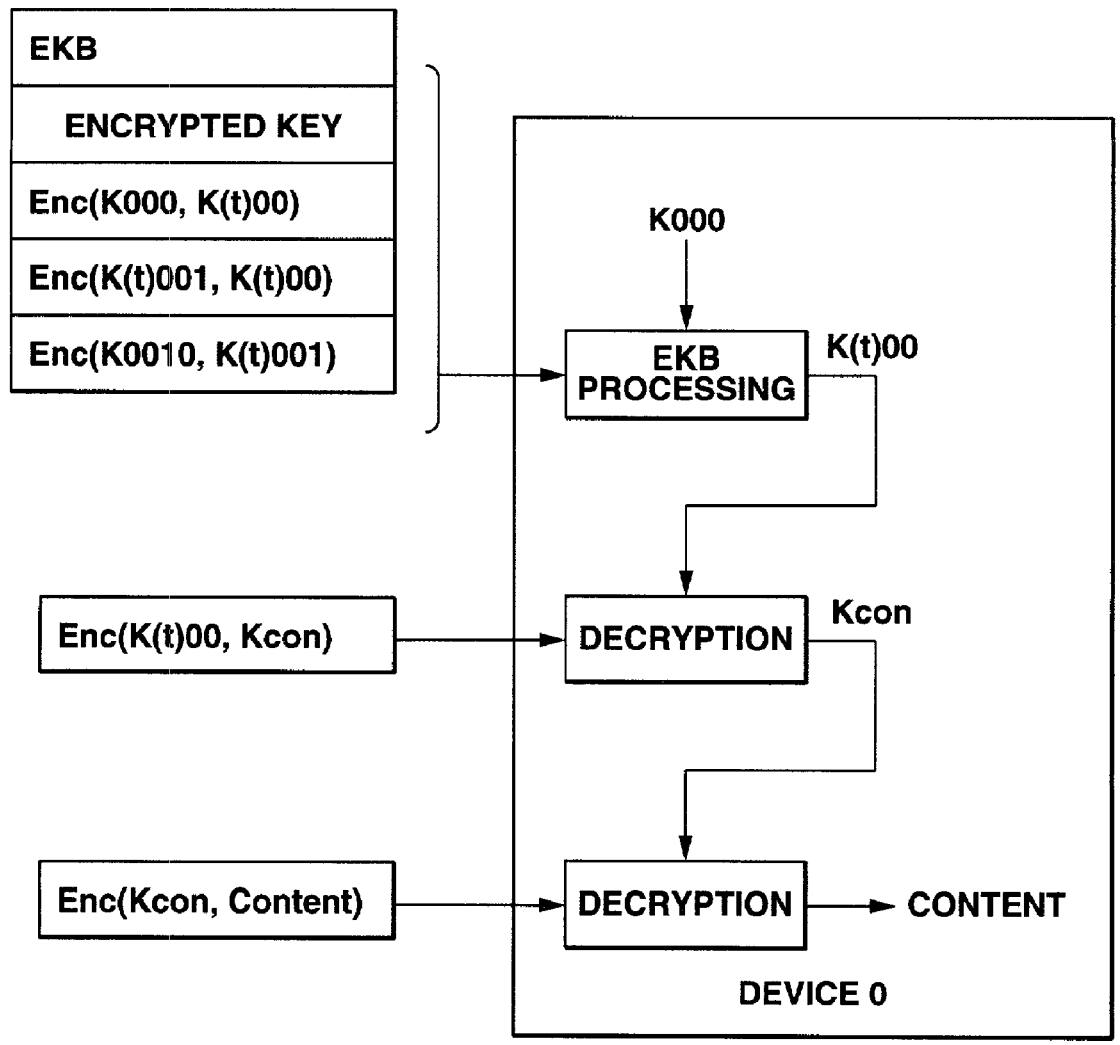
FIG. 9 is a view showing an example of processing in a device in case of distributing an enabling key block (EKB), content keys, and contents in the information processing system according to the present invention.

FIG. 9 shows an example of a case where a content encryption key KEK is constituted as a renewal node key K(t)00 obtained by renewed the node key K00 shown in FIG. 3. In this case, if in a group surrounded by the dotted frame in FIG. 3, the device 3 is revoked, for example, due to the leak of a key, data having an enabling key bock (EKB) shown in FIG. 9 and data into which a content key (Kcon) is encrypted by a content key encryption key (KEK=K(t)00), and data into which a content is encrypted by a content key (Kcon) are distributed to members of the other groups, that is, devices 0, 1, 2 whereby the devices 0, 1, 2 can obtain the content.

The right side in FIG. 9 shows the decrypting procedure in the device 0. The device 0, first, obtains a content key encryption key (KEK=K(t)00) by decrypting process using a leafkey K000 held by itself from the received enabling key bock. Then, the device 0 obtains a content key Kcon decrypted by the K(t)00, and further carries out decrypting by the content key Kcon. The device 0 can use the content as a result of the above process. The devices 1, 2 are also able to obtain a content key encryption key (KEK=K(t)00) by processing EKB by the different procedures and are able to use the content similarly.

The devices 4, 5, 6 . . . of the other groups shown in FIG. 3 are not able to obtain a content key encryption key (KEK=K(t)00) using a leaf key and a node key held by themselves even if they receive the same data (EKB) as mentioned above. The device 3 revoked is likewise not able to obtain the content key encryption key (KEK=K(t)00) by a leaf key and a node key, and only the device having the proper right is able to decrypt and use the content.

If the distribution of a content key making use of EKB is used, in a manner as described, the encrypted content which only valid right holder can decrypt can be distributed safely.

An enabling key block (EKB), a content key, an encrypted content or the like has a constitution capable of providing distribution safely through a network, but the enabling key block (EKB), the content key and the encrypted content can be also stored in a recording medium such as DVD, CD and provided to a user. In this case, if constitution is made such that a content key obtained by decrypting an enabling key block (EKB) stored in one and the same recording medium is used for decrypting the encrypted content stored in the recording medium, distribution process of an encrypted content that can be used only with a leaf key and a node key held in advance by the valid tight holder only, that is, content distribution for which a usable user's device is limited can be realized by a simple constitution.

Figure 10:
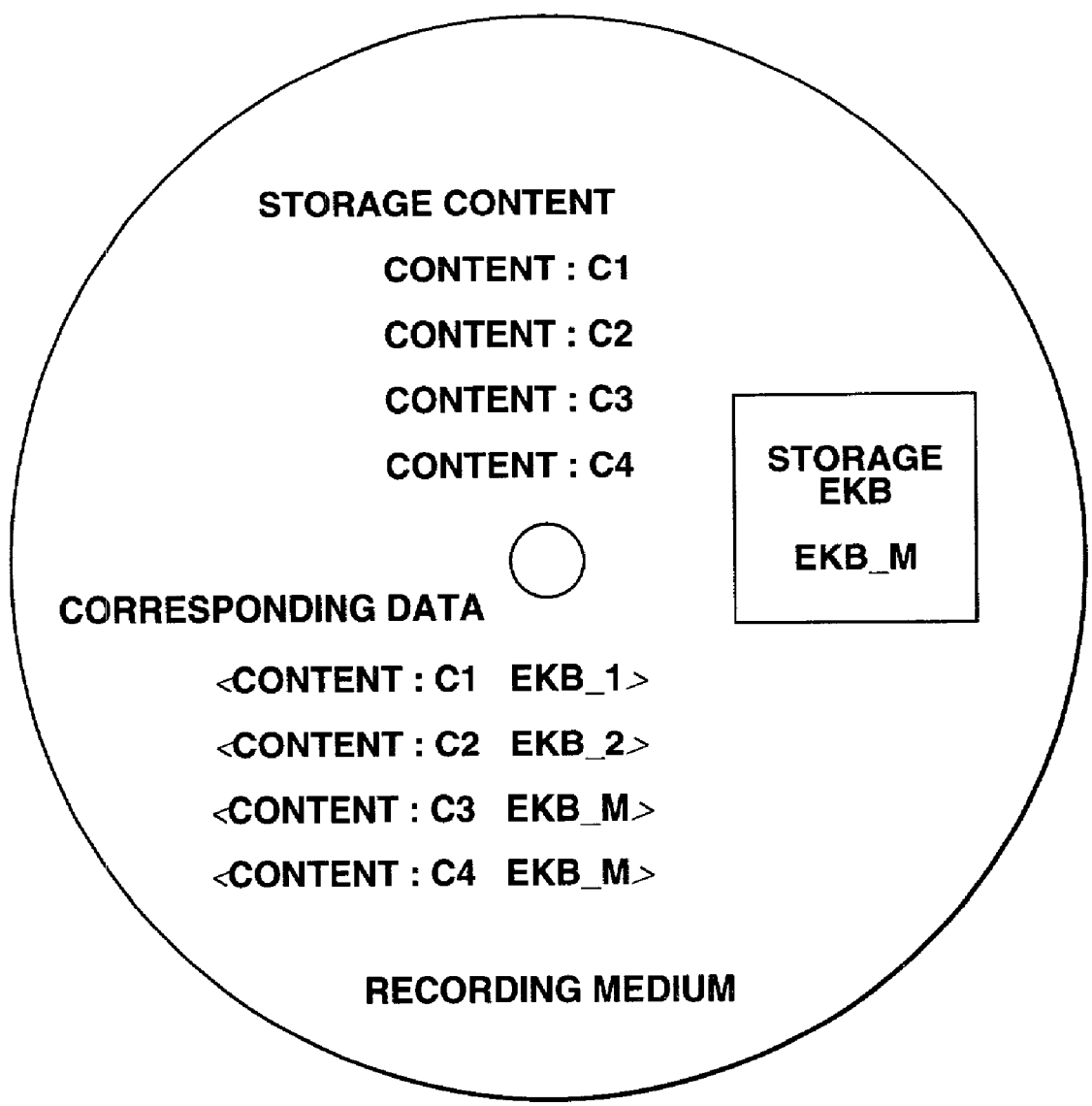
FIG. 10 is a view for explaining the situation how to cope with the case where an enabling key block (EKB) and contents are stored in the information processing system according to the present invention.

FIG. 10 shows an example of constitution in which an enabling key block (EKB) is stored together with an encrypted content are stored in a recording medium. In the example shown in FIG. 10, stored in the recording medium are contents C1 to C4, data with the enabling key block corresponding to each stored content placed in correspondence thereto, and an enabling key block of version M (EKB-M). For example, EKB-1 is used to produce a content key Kcon1 having a content C1 encrypted, and for example, EKB-2 is used to produce a content key Kcon2 having a content C2 encrypted. In this example, an enabling key bock of version M (EKB-M) is stored in a recording medium. Since contents C3, C4 is placed in correspondence to the enabling key block (EKB-M), contents of the contents C3, C4 can be obtained by decrypting the enabling key block (EKB-M). Since EKB-1, EKB-2 are not stored in a disk, it is necessary to obtain EKB-1, EKB-2 necessary for decrypts the respective content keys by new distribution means, for example, network distribution or distribution by a recording medium.

FIGS. 11A and 11B show a comparative example between a content key distribution by using EKB and conventional content key distribution where a content key is circulated among a plurality of devices. FIG. 11A shows the conventional constitution, and FIG. 11B shows an example making use of an enabling key block (EKB) according to the present invention. In FIGS. 11A and 11B, Ka (Kb) indicates data in which Kb is encrypted by Ka.

As shown in FIG. 11A, processing has been heretofore carried out in which validity of a data transmit-receiver is confirmed, authentication processing and authentication and key exchange (AKE) are executed between devices to co-own a session key Kses used in encrypting process of data transmission, and a content key Kcon is encrypted by the session key Kses under the condition that the authentication is established to effect transmission.

For example, in PC shown in FIG. 11A, it is possible to decrypt a content key Kses encrypted by a session key received by the session key to obtain Kcon, and further possible to encrypt Kcon obtained by a stored key Kstr held by PC itself to store it in own memory.

In FIG. 11A, processing is necessary in which even where data is desired to be distributed in the form capable of being used for only a recording device 1101 shown in FIG. 11A, when PC or a reproducing device is present, authentication process as shown in FIG. 11A is executed so that content keys are encrypted by the respective session keys to effect distribution. The PC or the reproducing device is likewise able to use a session key produced in the authentication process and co-owned to decrypt an encrypted content key and obtain a content key.

On the other hand, in an example making use of an enabling key block (EKB) shown in the lower stage of FIG. 11B, an enabling key block (EKB), and data (Kroot (Kcon)) having a content key Kcon encrypted by a node key or a root key obtained by processing the enabling key block (EKB) are distributed from a content provider, whereby the content key Kcon can be decrypted and obtained by only the apparatus capable of processing EKB distributed.

Accordingly, for example, the useable enabling key block (EKB) is produced only on the right end in FIG. 11B, and the enabling key block (EKB), and data having a content key Kcon encrypted by a node key or a root key obtained by EKB processing are sent together whereby the PC, the reproducing apparatus or the like present cannot execute processing of EKB by a leaf key or node key owned by itself. Accordingly, the useable content key can be distributed to only the valid device safely without executing processes such as authentication process between the data transmit-receive devices, the production of a session key, and the process for encrypting a content key Kcon by the session key.

Where the useable content key is desired to be distributed to PC, a recording and reproducing unit also, an enabling key block (EKB) capable of being processed is produced and distributed to thereby obtain a common content key.

[Distribution of Authentication Key Using Enabling Key Block (EKB) (Common Key System)]

In the distribution of data used in the enabling key block (EKB) or a key described above, since an enabling key block (EKB) and a content or a content key which are transferred between devices always maintain the same encryption form, there is the possibility that an invalid copy is produced due to the so-called replay attack, which steals and records a data transmission channel and transfer it later again. For preventing such an attack as described, there is effective means for executing authentication process and key exchange process similar to those of prior art between data transfer devices. Now, a description is made of the constitution in which an authentication key Kake used when the authentication process and key exchange process are executed is distributed to a device using the aforementioned enabling key block (EKB) whereby the authentication process in conformity with a common key system having a common authentication key as a safe private key is executed. That is, this is an example in which encrypted message data by EKB is used as an authentication key.

Figure 12:
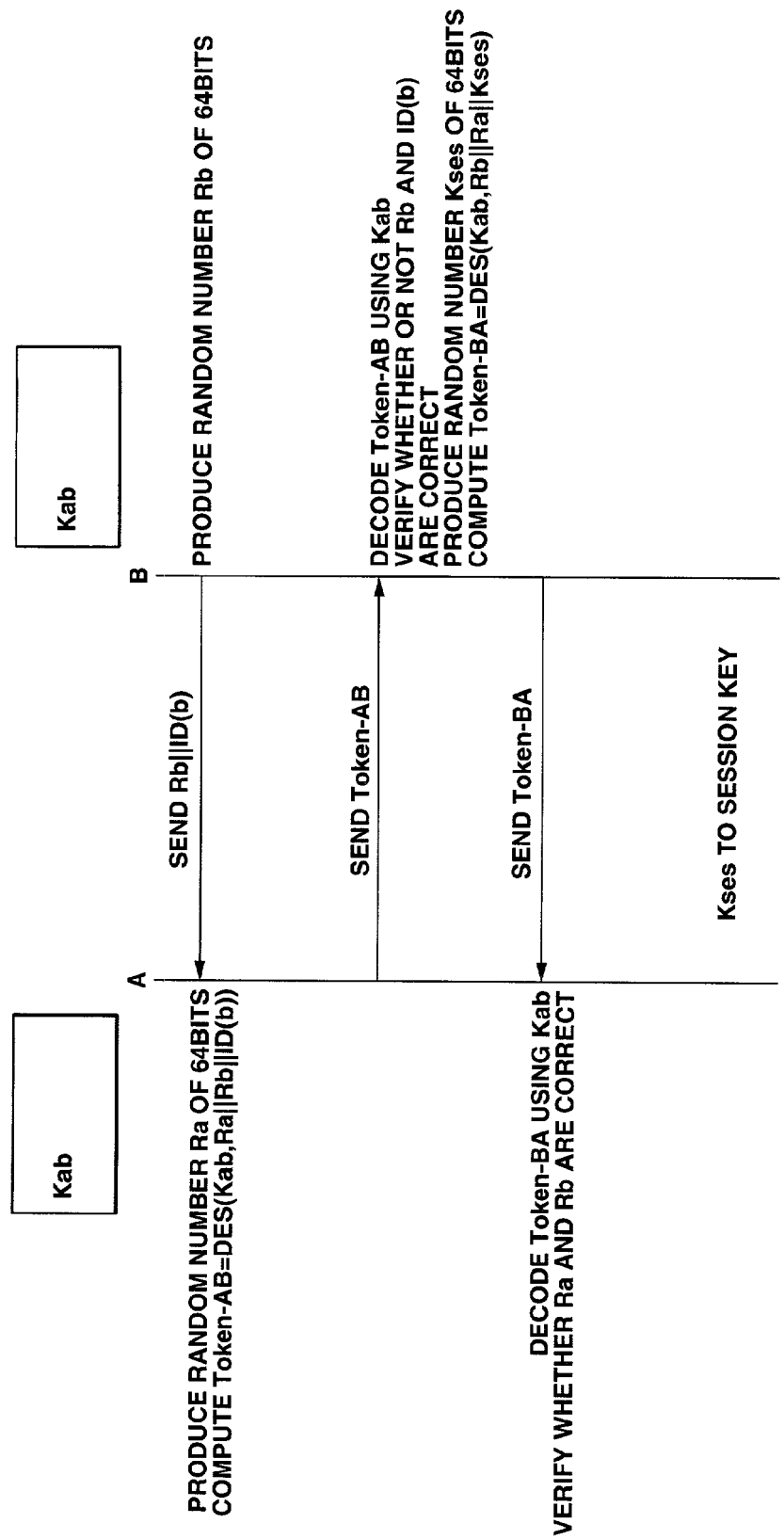
FIG. 12 is a view showing an authentication processing sequence according to an applicable common key encryption system in the information processing system according to the present invention.

FIG. 12 shows a mutual authentication method (ISO/IEC 9798-2) using a common key encryption system. While in FIG. 12, DES is used as the common key encryption system, other systems may be used as long as they are the common key encryption system. In FIG. 12, first, B produces the random number Rb of 64 bits, and Rb and ID (b), which is own ID, are transmitted to A. A which receives them newly produces the random number Ra of 64 bits, and data are encrypted using a key Kab in the CBC mode of DES in order to Ra, Rb and Rc to transmit them to B. The key Kab is a key to be stored in a recording element as a private key common to A and B. According to the encrypting processing by the key Kab using the CBC mode of DES, for example, in the processing using DES, an initial value and Ra are subjected to exclusive OR; in the DES encryption part, the key Kab is used for encrypting to generate an encrypted text E1 and continuously, the encrypted text E1 and Rb are subjected to exclusive OR; in the DES encryption part, a key Kab is used for encrypting, and encrypted text E2 and ID (b) are subjected to exclusive OR; and in the DES encryption part, a key Kab is used for encrypting to generate transmission data (Token-AB) by an encrypted text E3 produced.

B, which received the above data, decrypts the received data by a key Kab (authentication key) likewise stored in a recording element as a common private key. A decrypting method of received data, first, decrypts an encrypted text E1 by an authentication key Kab to obtain the random number Ra. Next, an encrypted text E2 is decrypted by an authentication key Kab, and the result therefrom and E1 are subjected to exclusive OR to obtain Rb. Finally, an encrypted text E3 is decrypted by an authentication key Kab, and the result therefrom and E2 are subjected to exclusive OR to obtain ID (b). Authentication is made if Ra and ID (b) out of Ra, Rb and ID (b) thus obtained are coincided with one transmitted by B. When passed this authentication, B authenticates that A is valid.

Next, B produces a session key (Kses) to be used after authentication (Producing method: To use the random number). Then, Rb, Ra, Kses are encrypted in that order using an authentication key Kab in the CBC mode of DES and are returned to A.

A, which received the above data, decrypts the received data by an authentication key Kab. A decrypting method of the received data is similar to the decrypting process of B, which is therefore omitted in its detail. Authentication is made if Rb and Ra out of Rb, Ra and Kses thus obtained are coincided with one transmitted by A. When passed the authentication, A authenticates that B is valid. After authentication of mating parties each other, the session key Kses is used as a common key for secrete communication after authentication.

Where invalidity or uncoincidence is found when the received data are authenticated, processing is interrupted as a failure of mutual authentication.

In the above-described authentication process, A and B co-own a common authentication key Kab. The common authentication key Kab is distributed to a device using the enabling block key (EKB).

For example, in the example shown in FIG. 12, there may be employed the constitution in which out of A or B, the other encrypts an authentication key Kab and an enabling key block (EKB) produced by producing a decodable enabling key block (EKB) to transmit it to the other, or the constitution in which a third party produces an enabling key bock (EKB) that can be used by both devices A and B for the devices A and B to encrypt an authentication key Kab by the enabling key block (EKB) produced for the devices A, B to distribute it.

Figure 13:
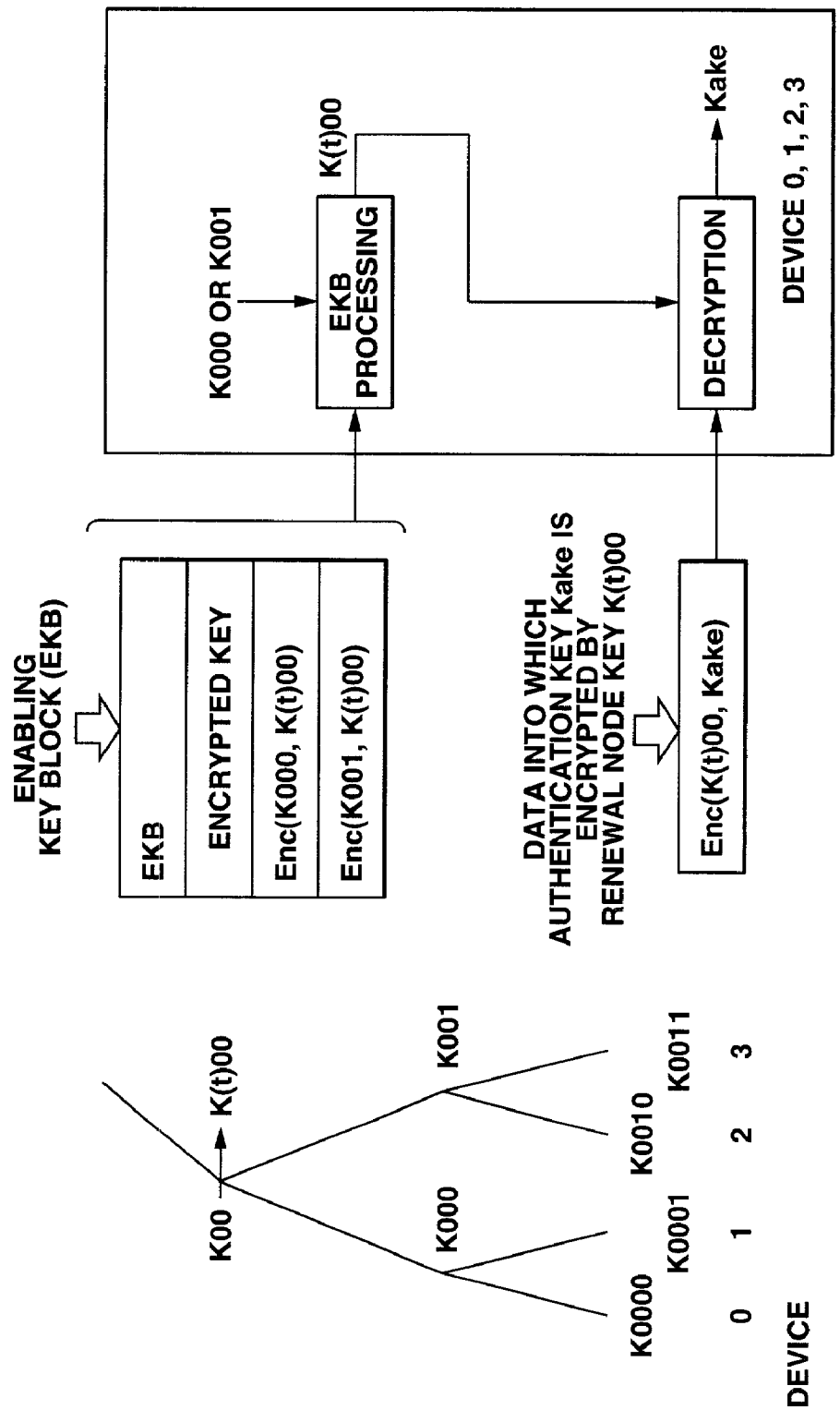
FIG. 13 is a view (1) showing an enabling key block (EKB), a data constitution for distributing an authentication key, and a processing example by a device in the information processing system according to the present invention.
Figure 14:
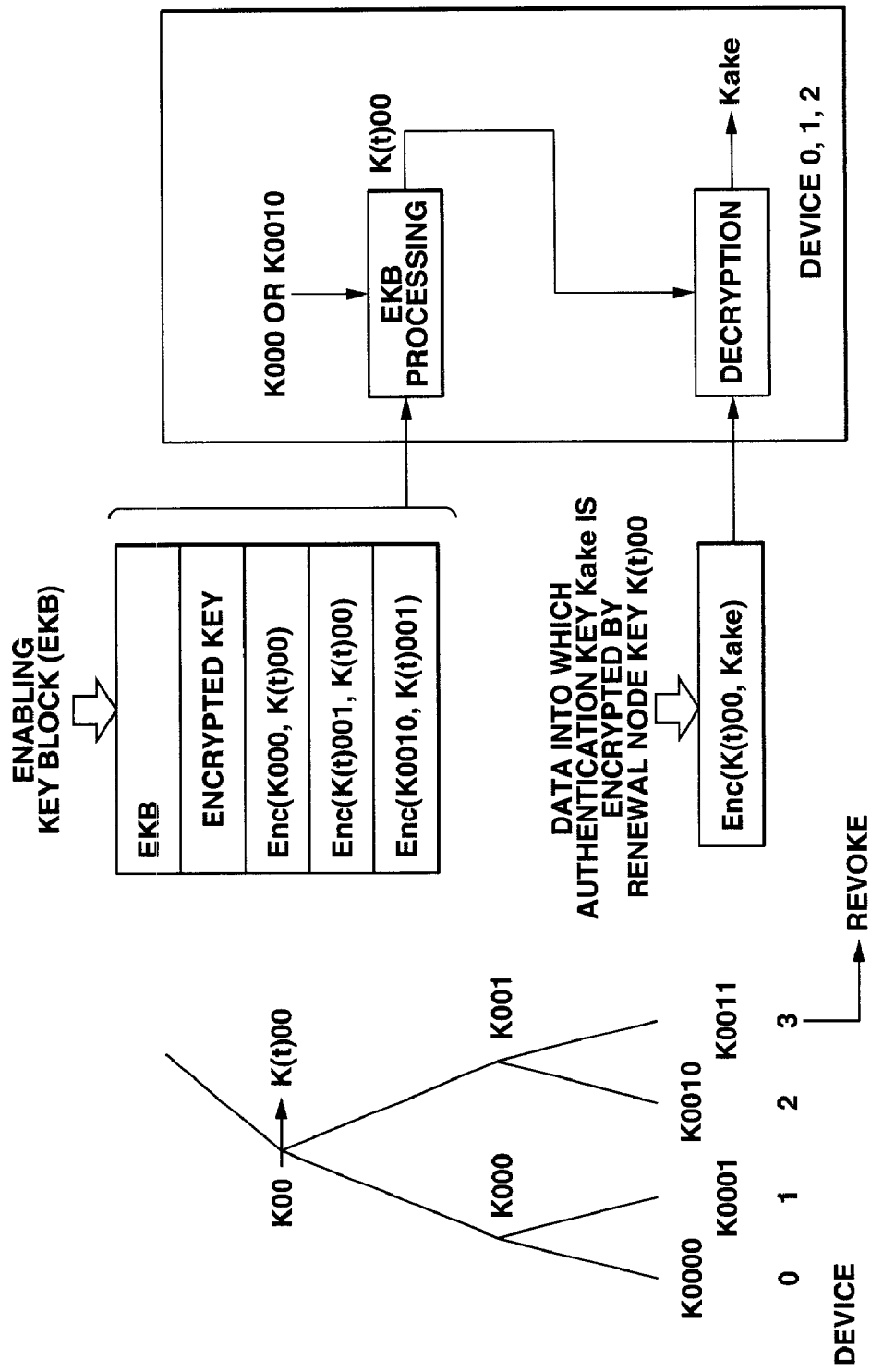
FIG. 14 is a view (2) showing an enabling key block (EKB), a data constitution for distributing an authentication key, and a processing example by a device in the information processing system according to the present invention.

FIGS. 13 and 14 show examples of the constitution in which an authentication key Kake common to a plurality of devices is distributed by an enabling key block (EKB). FIG. 13 shows an example in which a decodable authentication key Kake is distributed to devices 0, 1, 2, 3, and FIG. 14 shows an example in which the device 3 out of the devices 0, 1, 2, 3 is revoked to distribute a decodable authentication key to only the devices 0, 1, 2.

In the example of FIG. 13, a node key K(t)00 renewed using a node key and a leaf key in the devices 0, 1, 2, 3 is produced and distributed, by producing a decodable enabling key block (EKB), along with data (b) having an authentication key Kaka decrypted by a renewal node key K(t)00. First, the respective devices, as shown on the right side of FIG. 13, processes (decrypts) EKB to thereby obtain a renewed node key K(t)00, and then decrypts an authentication key: Enc(K(t)00, Kake) encrypted using the obtained node key K(t)00 to obtain an authentication key Kake.

In other devices 4, 5, 6, 7 . . . , even if the same enabling key block (EKB) is received, the node key K(t)00 renewed by processing EKB cannot be obtained, and therefore, an authentication key can be sent to only the valid device safely.

On the other hand, the example of FIG. 14 is an example in which as the device is, for example, revoked by leak of a key, the device 3 in a group surrounded by the dotted frame of FIG. 3 produces a decodable enabling key block (EKB) with respect to the only members of the other group, that is, the devices 0, 1, 2 for distribution. Data having (a) an enabling key block (EKB) and (b) an authentication key (Kake) shown in FIG. 14 encrypted by the node key (K(t)00) are distributed.

On the right side of FIG. 14, the decrypting procedure is shown. First, the devices 0, 1, 2 obtains an enabling node key (K(t)00) by decrypting process using a leaf key or a node key owned by itself from the received enabling key block. Next, the devices obtain an authentication Key Kake by decrypting made by K(t)00.

The devices 4, 5, 6 . . . in the other group shown in FIG. 3 cannot obtain a renewal node key (K(t)00) using a leaf key and a node key owned by itself even if similar data (EKB) is received. Similarly, also in the device 3 revoked, the renewal node key (K(t)00) cannot be obtained by a leafkey and a node key owned by itself, and only the device having a valid right is able to decrypt an authentication key for use.

If distribution of an authentication key making use of EKB is used, only the valid right holder is able to distribute a decodable authentication key safely with less data quantity.

[Distribution of Content Key Using a Public Key Authentication and an Enabling Key Block (EKB)]

Figure 15:
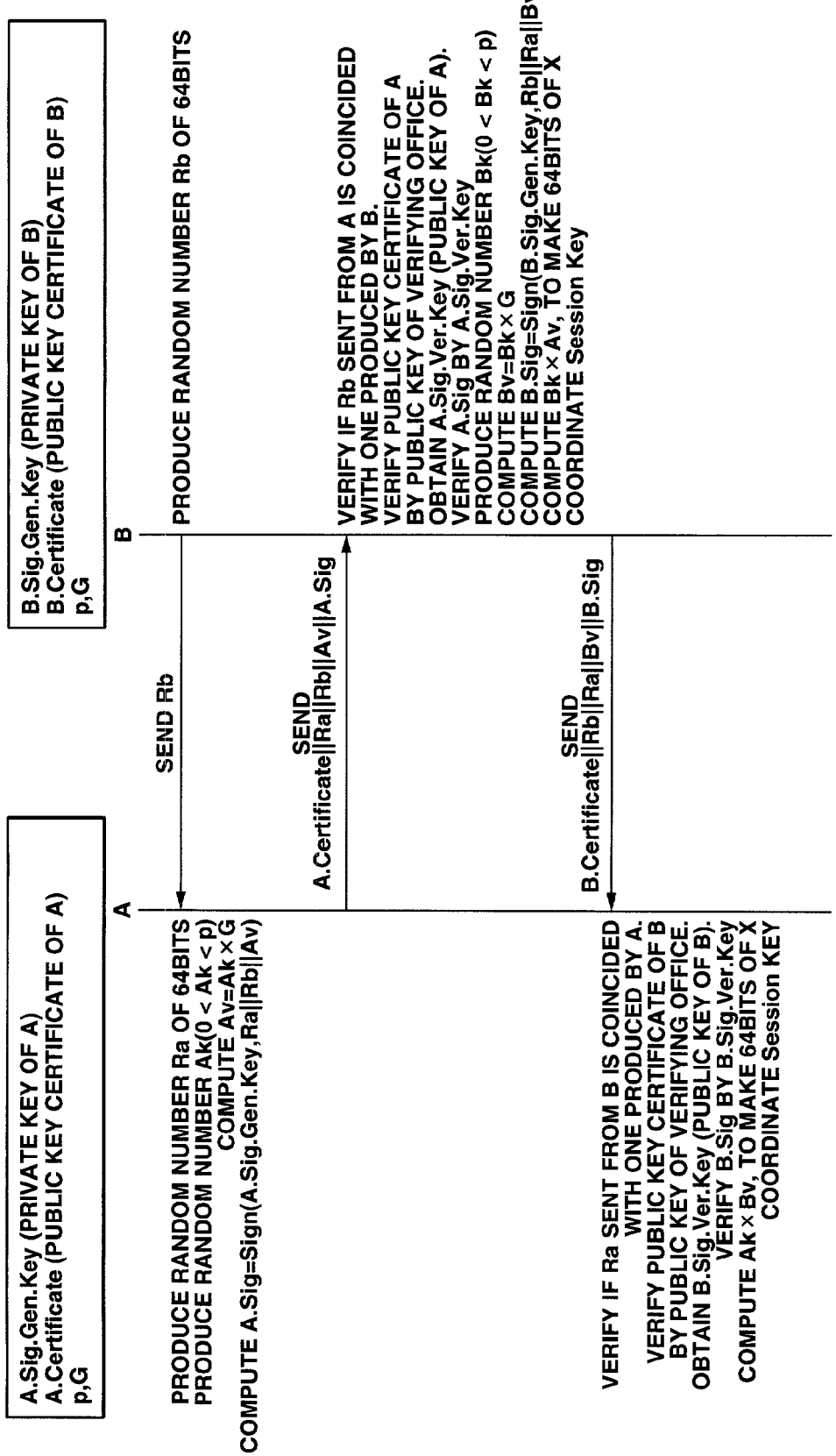
FIG. 15 is a view showing an authentication processing sequence by a public key encryption system applicable in the information processing system according to the present invention.

In the following, the distribution process of the content key using a public key authentication and an enabling key block (EKB) will be described. First, a mutual authentication method using an elliptic curve encryption of 160-bit length, which is a public key encryption system, will be described with reference to FIG. 15. In FIG. 15, ECC is used as the public key encryption system, but any system may be used as long as it is a public key encryption system similar thereto. Further, the key size need not be 160 bits. In FIG. 15, first, B produces the random number Rb of 64 bits to transmit it to A. A which received it newly produces the random number Ra of 64 bits and the random number Ak smaller than the prime number p. And, a point Av=Ak×G obtained by making a base point G, Ak times is obtained to produce an electronic signature A, Sig with respect to Ra, Rb, Av (X coordinate and Y coordinate), which is returned along with a public certificate of A to B. In Ra and Rb, X coordinate and Y coordinate of 64 bits, Av are respectively 160 bits, and therefore, an electronic signature with respect to 448 bits in total is produced.

B which received the public key certificate, Ra, Rb, Av, the electronic signature A. Sig authenticates if Rb transmitted by A is coincided with one produced by B. As a result, when coincided, an electronic signature within the public key certificate of A is authenticated by a public key of an authentication office to take out a public key of A. The electronic signature A. Sig is authenticated using a public key of A taken out.

Next, B produces the random number Bk which is smaller than the prime number p. A point Bv=Bk×G obtained by making a base point G Bk times is obtained to produce an electronic signature B. Sig with respect to Rb, Ra, Bv (X coordinate and Y coordinate), which is returned to A along with a public key certificate of B.

A which received the public key certificate, Rb, Ra, Av, the electronic signature B. Sig of B authenticates if Ra transmitted by B is coincided with one produced by A. As a result, when coincided, an electronic signature within the public key certificate of B is authenticated by a public key of an authentication office to take out a public key of B. The electronic signature B. Sig is authenticated using a public key of B taken out. After the authentication of an electronic signature has been succeeded, A authenticates B to be valid.

Where both of them have succeeded for authentication, B computes Bk×Av (Since Bk is the random number, but Av is the point on the elliptic curve, scalar-times computation at the point on the oval curve is necessary.), and A computes Ak×Bv, and uses the lower 64 bits of the X coordinate of these points as a session key for use for thereafter communication (where a common key encryption is a common key encryption of 64 bit key length). Of course, a session key may be produced from the Y coordinate, and the coordinate need not be the lower 64 bits. In the secrete communication after mutual authentication, sometimes, the transmission data is not only encrypted by a session key but is also applied with an electronic signature.

Where in the authentication of an electronic signature or authentication of the received data, invalidity or uncoincidence is found, processing is interrupted due to a failure of mutual authentication.

Figure 16:
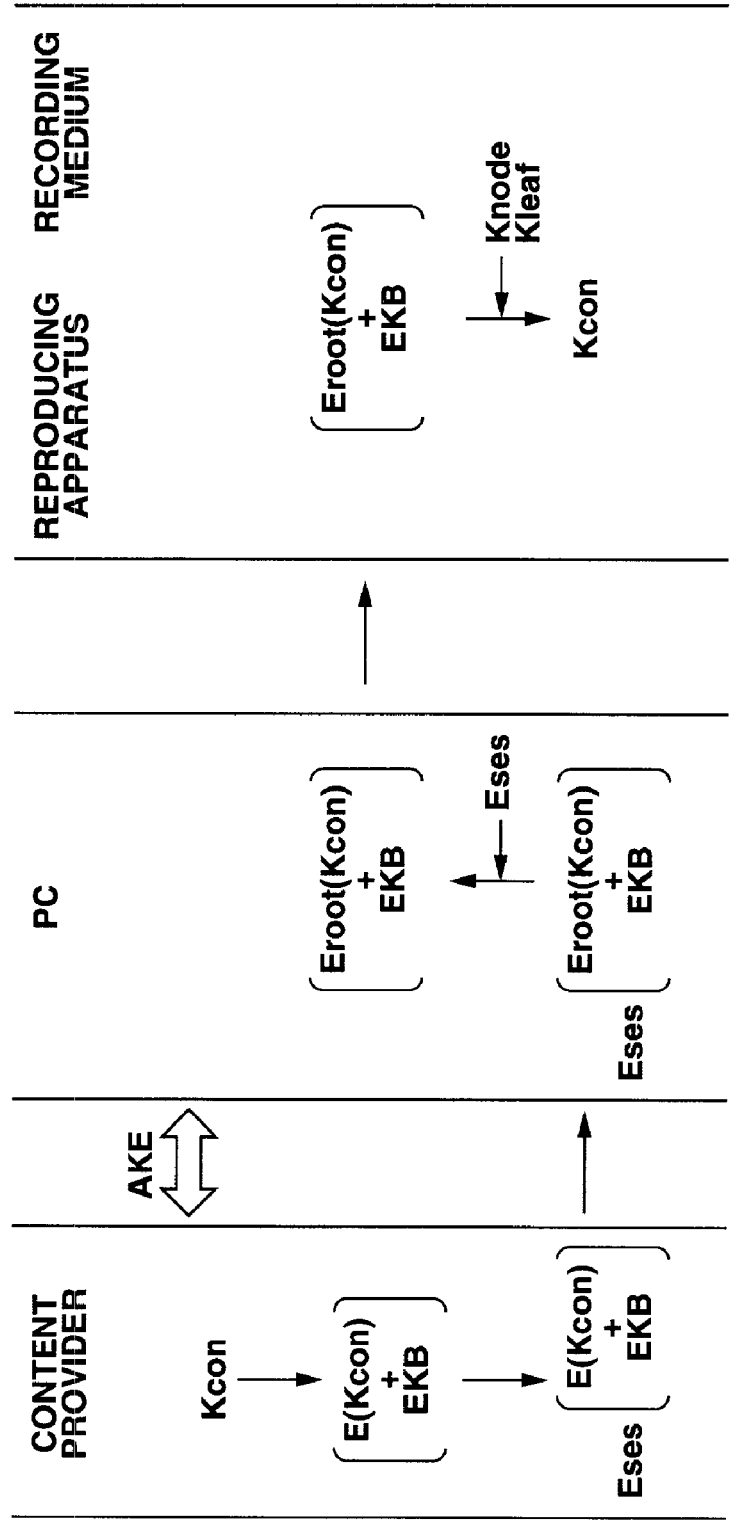
FIG. 16 is a view showing a processing for distributing an enabling key block (EKB) and content keys using the authentication principle by a public key encryption system in the present invention.

FIG. 16 shows an example of distribution process of content keys using a public key authentication and an enabling key block(EKB), First, the authentication process according to the public key system explained referring to FIG. 15 is executed between a content provider and PC. The content provider produces a decodable EKB by a reproducing apparatus which is a content key distribution destination, a node key and a leaf key owned by a recording medium to encrypt a content key E(Kcon) which executed encryption by a renewal node key and an enabling key block (EKB) by a session key Kses produced by the authentication process between PCs, which is transmitted to PC.

PC decrypts [a content key E (Kcon) which executed encryption by a renewal node key and an enabling key block (EKB)] encrypted by a session key, and thereafter transmits it to a reproducing apparatus and a recording medium.

The reproducing apparatus and the recording medium decrypt [a content key E (Kcon) which executed encryption by a renewal node key and an enabling key block (EKB)] to thereby obtain a content key Kcon.

According to the above constitution, since [a content key E (Kcon) which executed an encryption by a renewal node key and an enabling key block (EKB)] are transmitted under the condition of the authentication between a content provider and PC, for example, even in the case where a node key is leaked, positive data transmission to a mating party is enabled.

[Distribution of a Program Code by Using an Enabling Key Block (EKB)]

Figure 17:
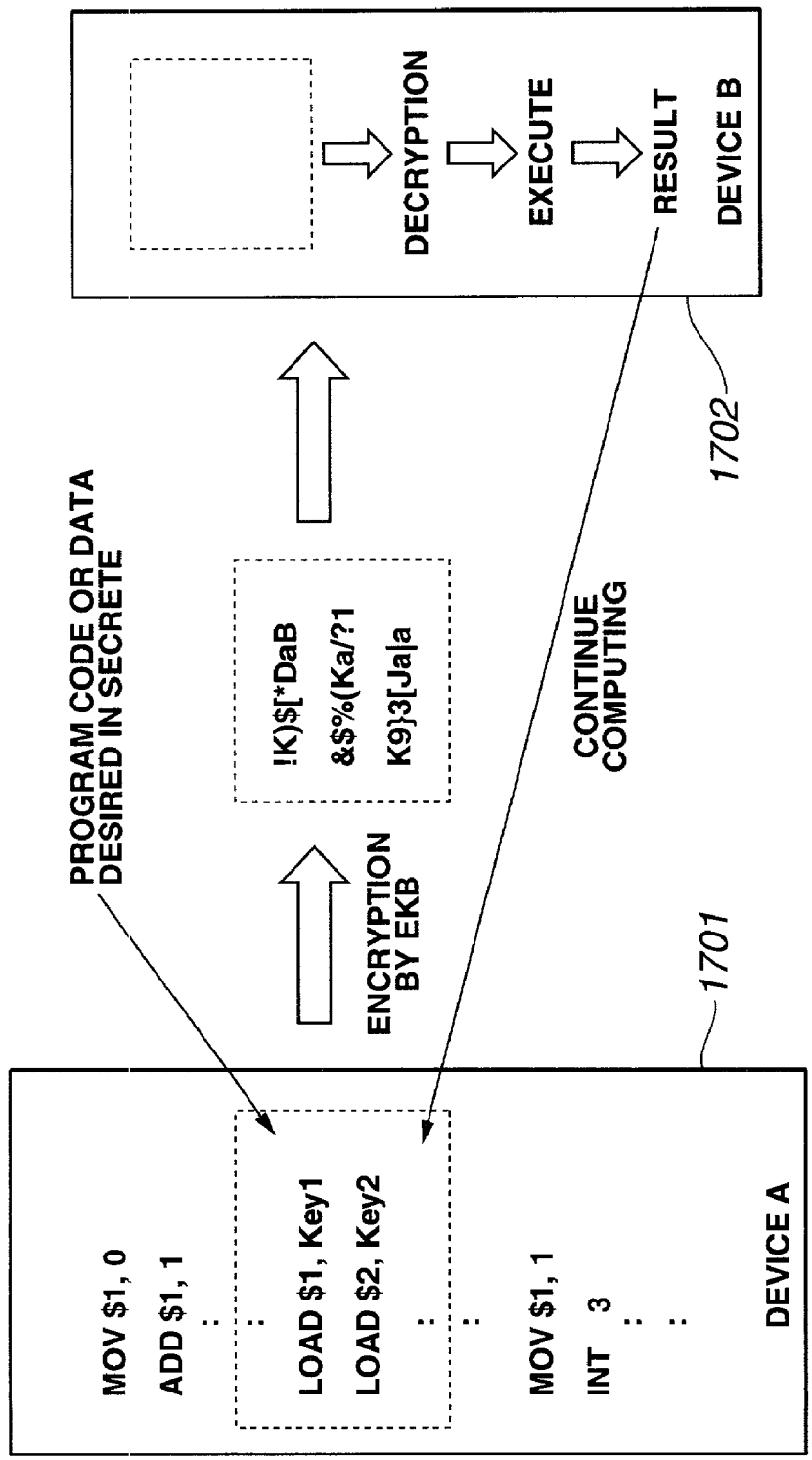
FIG. 17 is a view showing a processing for distributing an enabling key block (EKB) and encrypted program data in the information processing system according to the present invention.

While in the above-described example, a description has been made of a method for encrypting a content key, an authentication key or the like using an enabling key block (EKB) to distribute it, the constitution in which various program codes are distributed using an enabling key block (EKB) may be employed. That is, this is an example in which encrypted message data by EKB is used as a program code. This constitution will be described hereinafter, FIG. 17 shows an example in which a program code is encrypted, for example, by a renewal node key of an enabling key block (EKB) to transmit it between devices. A device 1701 transmits an enabling key block (EKB) that can be decrypted by a node key and a leaf key of a device 1702 and a program code subjected to decrypting by a renewal node key contained in the enabling key block (EKB) to a device 1702. The device 1702 processes the received EKB to obtain a renewal node key, and further executes decrypting of a program code by a renewal node key obtained to obtain a program code.

In the example shown in FIG. 17, further, processing by the program code obtained in the device 1702 is executed to return the result to the device 1701, and the device 1701 further continues processing on the basis of the result.

As described above, the enabling key block (EKB) and the program code subjected to decrypting processing by the renewal node key contained in the enabling key block (EKB) are distributed whereby a program code capable of being decrypted in a specific device can be distributed to the specific device or the group shown in FIG. 3.

[Constitution for Causing ICV: Integrity Check Value to Correspond to a Transmission Content]

Next, a description will be made of the processing constitution in which for preventing falsification of a content, the integrity check value (ICV) is produced to correspond to the content, and the presence or absence of the falsification of the content is judged by computing ICV.

The integrity check value (ICV) is, for example, computed using a hash function with respect to the content, and is computed by ICV=hash (Kicv, C1, C2, . . . ). Kicv is an ICV producing key. C1, C2 are information of a content, and a message authentication code (MAC) of important information of the content is used.

Figure 18:
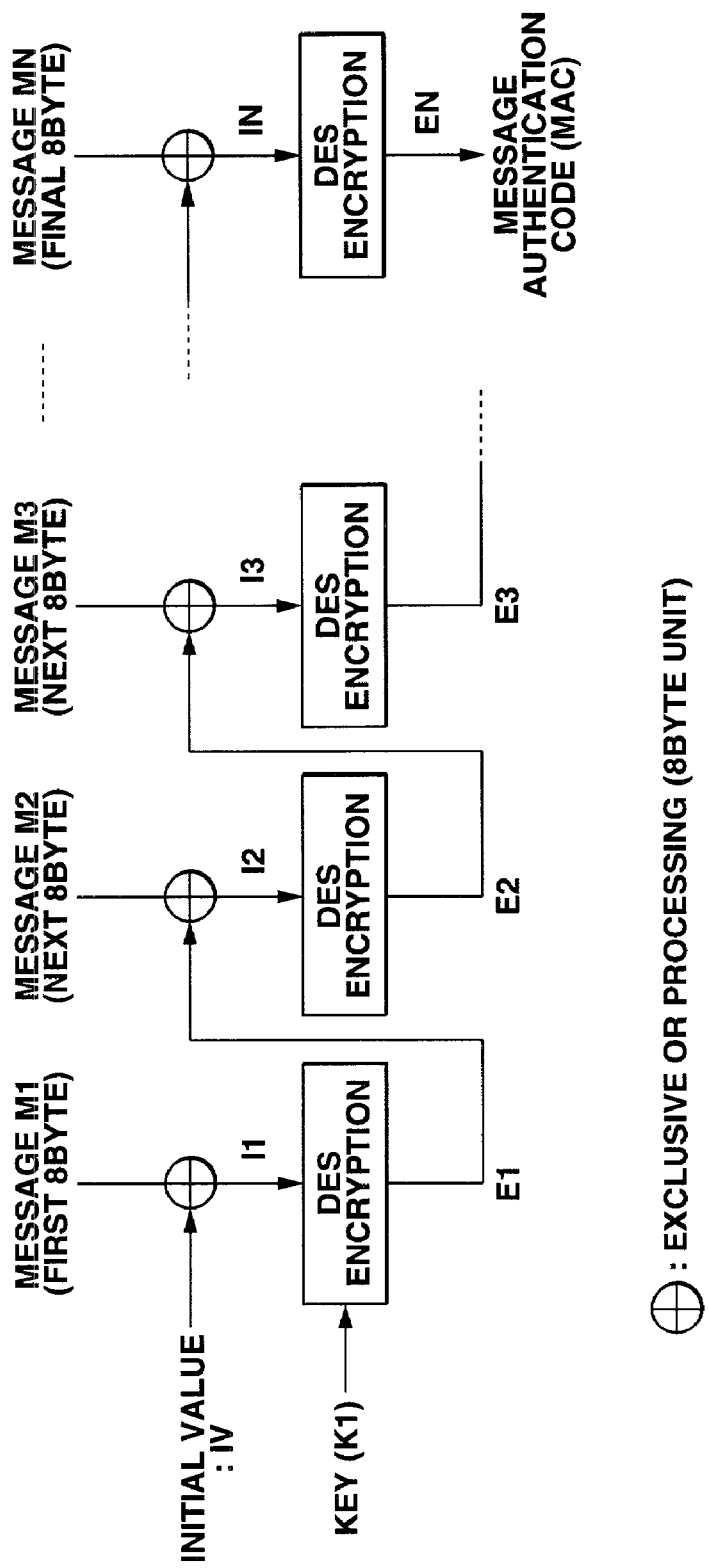
FIG. 18 is a view showing an example of MAC value production used in production of a content integrity check value (ICV) applicable in the present invention.

FIG. 18 shows a MAC value producing example using the DES encryption processing constitution. As shown in the constitution of FIG. 18, a message to be an object is divided into 8-bit units (hereinafter, the divided messages are M1, M2, . . . MN). First, the initial value (hereinafter, IV) and M1 are subjected to exclusive OR (result of which is I1). Next, I1 is put into a DES encryption part to carry out encrypting using a key (hereinafter, K1) (an output is E1). Continuously, E1 and M2 are subjected to exclusive OR, output 12 of which is put into the DES encryption part, and is encrypted using the key 1 (an output E2). Thereafter, this procedure is repeated, and the encrypting processing applied to all the messages. The last EN is a message authentication code (MAC).

The hash function is applied to the MAC value of the content and the ICV producing key to produce the integrity check value (ICV) of the content. ICV produced when a content is produced for which the fact that no falsification is present is assured is compared with ICV produced on the basis of a new content. If the same ICV is obtained, the fact that the content is not falsified is assured, and if ICV is different, judgment that falsification is present is made.

[Constitution for Distributing a Producing Key Kicv of the Check Value (ICV) by EKB]

Next, the constitution in which Kiec which is an integrity check value (ICV) producing key of a content is sent by the enabling key block will be described. That is, this is an example in which encrypted message data by EKB is an integrity check value (ICV) producing key of a content.

Figure 19:
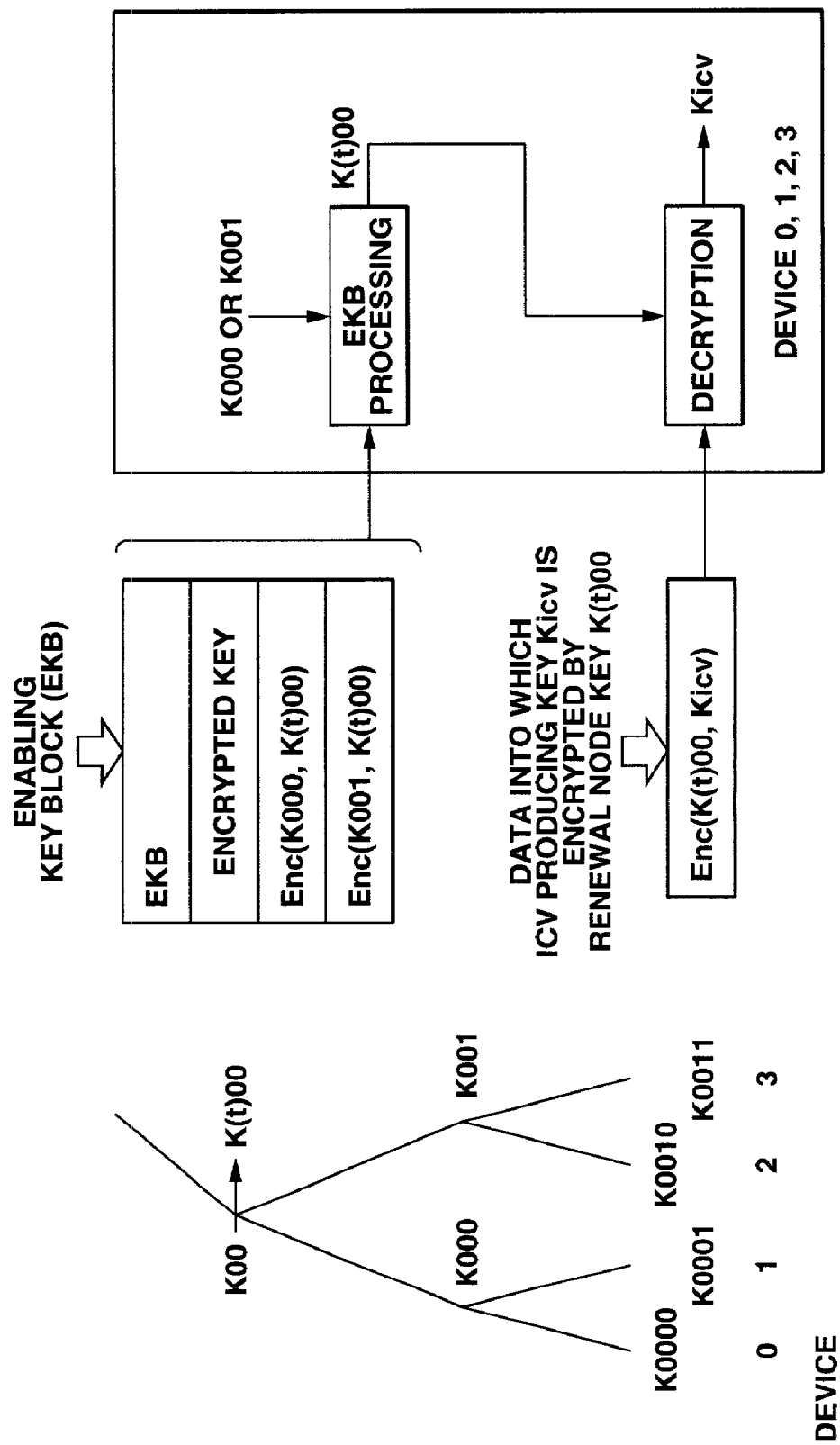
FIG. 19 is a view (1) showing a data constitution for distributing an enabling key block (EKB) and an ICV producing key, and an example of a processing in a device in the information processing system according to the present invention.
Figure 20:
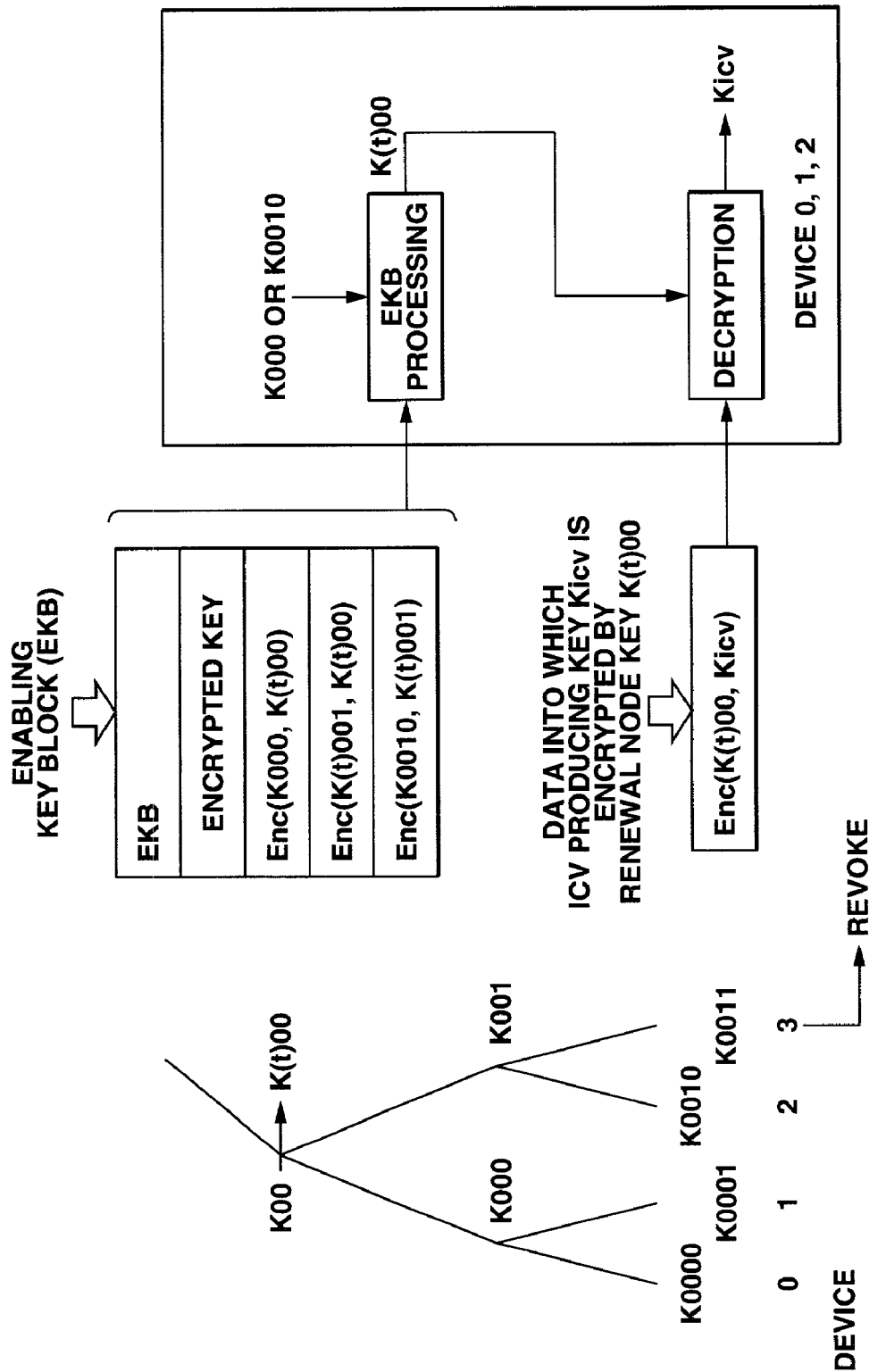
FIG. 20 is a view (2) showing a data constitution for distributing an enabling key block (EKB) and an ICV producing key, and an example of a processing in a device in the information processing system according to the present invention.

FIG. 19 and FIG. 20 show an example in which where contents common to a plurality of devices are sent, an integrity check value producing key Kicv for authenticating the presence or absence of falsification of these contents is distributed by the enabling key block (EKB). FIG. 19 shows an example in which a decodable integrity check value producing key Kiev is distributed to devices 0, 1, 2, 3, and FIG. 20 shows an example in which the device 3 out of the devices 0, 1, 2, 3 is revoked, and a decodable integrity check value producing key Kicv is distributed to only the devices 0, 1, 2.

In the example of FIG. 19, a node key K(t)00 renewed using a node key and a leaf key owned by the devices 0, 1, 2, 3 along with data (b) having a check value producing key Kicv encrypted by a renewal node key K(t)00 are distributed by producing a decodable enabling key block (EKB). As shown on the right side in FIG. 19, the respective devices first process (decrypts) EKB to thereby obtain a node key K(t)00 renewed, and subsequently decrypt a check value producing key: Enc(K(t)00, Kicv) encrypted using the obtained node key K(t)00 to obtain a check value producing key Kicv.

Since other devices 4, 5, 6, 7 . . . cannot obtain a node key K(t)00 renewed by processing EKB by a node key and a leafkey owned by itself even if the same enabling key block (EKB) is received, the check value producing key can be sent to only valid device safely.

On the other hand, the example of FIG. 20 is an example in which as the device is, for example, revoked by leak of a key, in a group surrounded by the dotted frame of FIG. 3. produces a decodable enabling key block (EKB) with respect to the only members of the other group, that is, the devices 0, 1, 2 for distribution. Data having (a) an enabling key block (EKB) and (b) a check value producing key (Kicv) shown in FIG. 20 encrypted by the node key (K(t)00) are distributed.

On the right side of FIG. 20, the decrypting procedure is shown. First, the devices 0, 1, 2 obtain a renewal node key (K(t)00) by decrypting process using a leaf key or a node key owned by itself from the received enabling key block. Next, the devices obtain a check value producing key Kicv by decrypting made by K(t)00.

The devices 4, 5, 6 . . . in the other group shown in FIG. 3 cannot obtain a renewal node key (K(t)00) using a leaf key and a node key owned by itself even if similar data (EKB) is received. Similarly, also in the device 3 revoked, the renewal node key (K(t)00) cannot be obtained by a leaf key and a node key owned by itself, and only the device having a valid right is able to decrypt an authentication key for use.

If distribution of a check value reproducing key making use of EKB is used, only the valid right holder is able to distribute a decodable check value producing key safely with less data quantity.

Figure 21A:
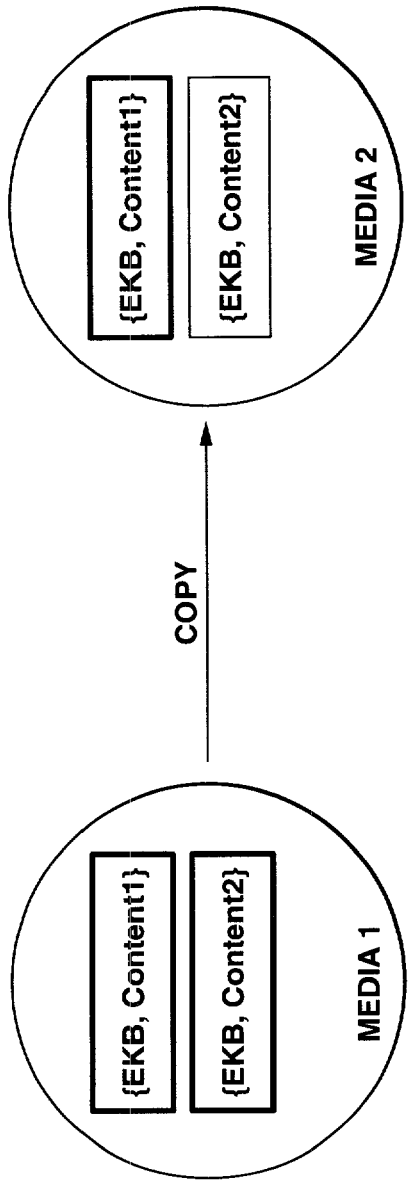
FIGS. 21A and 21B are views each for explaining a copy preventive function where an applicable content integrity check value (ICV) is stored in a medium in the present invention.
Figure 21B:
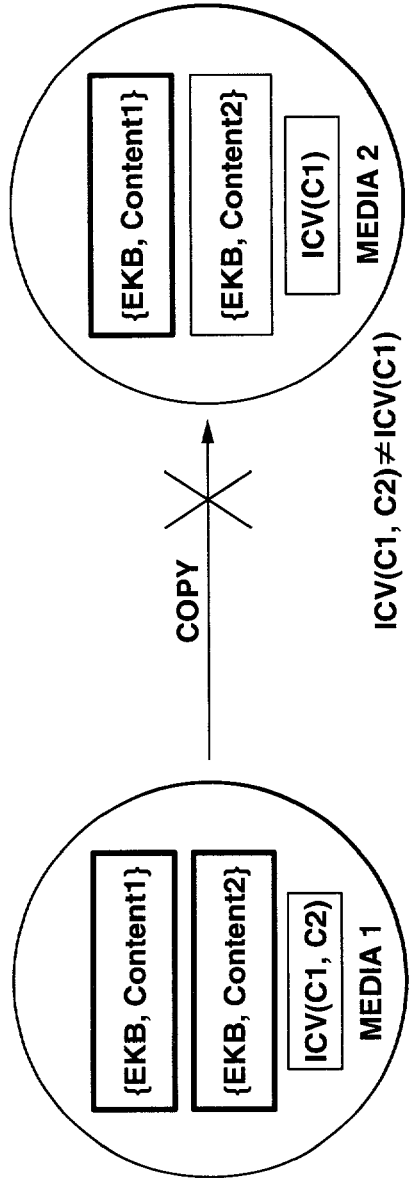

By using the integrity check value (ICV) of contents as described above, it is possible to eliminate invalid copies of EKB and encrypted contents. It is supposed that for example, as shown in FIGS. 21A and 21B, there is a medium 1 in which a content C1 and a content C2 are stored along with an enabling key block (EKB) capable of obtaining content keys, which is copied to a medium 2 without modification. It is possible to copy EKB and encrypted contents, which can be used in a device capable of decrypting EKB.

There is provided a constitution in which as shown in FIG. 21B, integrity check values (ICV (C1, C2)) are stored corresponding to contents properly stored in the respective media. The (ICV (C1, C2)) shows ICV=hash (Kicv, C1, C2) which is an integrity check value of contents computed using the hash function in the content C1 and the content C2. In the constitution of FIG. 21B, a content 1 and a content 2 are properly stored in the medium 1, and integrity check values (ICV (C1, C2)) produced on the basis of the content C1 and the content C2 are stored. Further, a content 1 is properly stored in the medium 2, and an integrity check values (ICV (C1)) produced on the basis of the content C1 is stored therein. In this constitution, Assume that (EKB, content 2) stored in the medium 1 is copied to the median 2, when in the medium 2, a content check value is newly produced, ICV (C1, C2) are to be produced, so that it becomes obvious that different from Kicv (C1) stored in the medium, falsifying of contents and storing of new contents due to the invalid copy are executed. In the device for reproducing media, ICV checking is executed in the step previous to the reproducing step, and judgment is made of coincidence between the produced ICV and the stored ICV, if not coincident, the constitution in which reproducing is not executed is provided to enable prevention of reproducing contents copied invalidly.

Furthermore, there can be provided the constitution in which for enhancing safety, the integrity check value (ICV) of contents is rewritten to produce them on the basis of data including a counter. That is, this constitution is to make computation by ICV=hash (Kiev, counter+1, C1, C2, . . . ). Here, a counter (counter+1) is set as a value in which one increment is made every rewriting. It is necessary to have a constitution in which a counter value is stored in a secure memory.

Further, in the constitution in which the integrity check value (ICV) of contents is cannot be stored in the same medium as contents, the integrity check value (ICV) of contents is stored in a separate medium.

For example, where contents are stored in media which take no measures to prevent copies such as a read only memory or normal MO, there is the possibility that when the integrity check value (ICV) is stored in the same medium, rewriting of the ICV is done by an invalid user, failing to maintain the safety of ICV. In such a case, there can be provided the constitution in which ICV is stored in a safety medium on a host machine, and ICV is used for copy control (for example, check-in/check-out, move), to thereby enable safe management of ICV and checking of falsification of contents.

Figure 22:
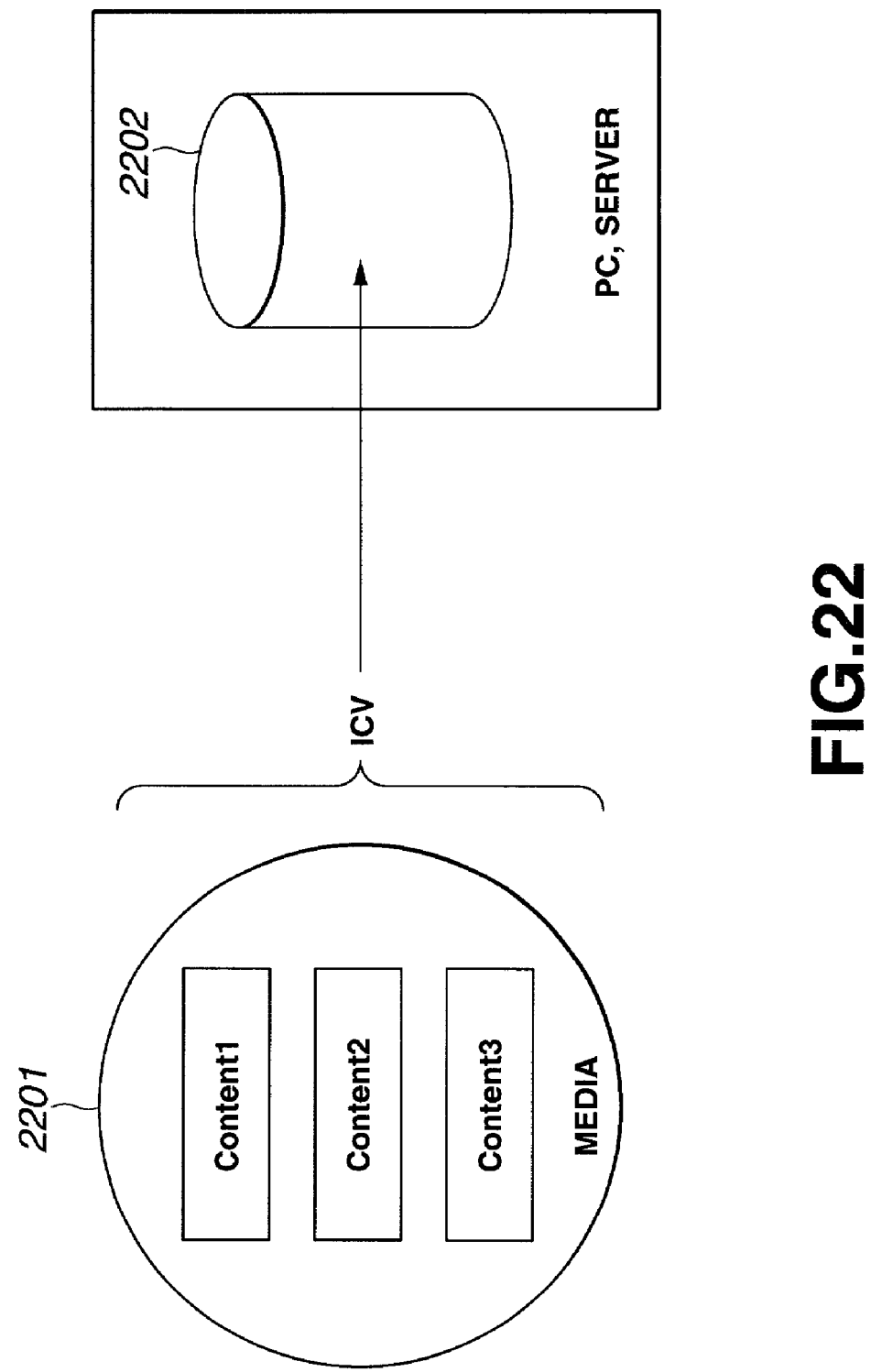
FIG. 22 is a view for explaining a constitution for controlling an applicable content integrity check value (ICV) separately from a content storage medium in the present invention.

The above constitution is shown in FIG. 22. In FIG. 22, contents are stored in a medium 2201 which takes no measures for preventing copying such as read only media or normal MO, and the integrity check values (ICV) in connection with these contents are stored in a safe media 2202 on a host machine to which a user is not allowed to get access to prevent invalid rewriting of the integrity check value (ICV) by a user. If, as such a constitution as described above, for example, employment is made of a constitution in which when a device on which a media 2201 is mounted executes reproducing of the media 2201, a PC or a server which is a host machine executes checking of ICV to judge the propriety of reproducing, reproducing of invalid copy contents or falsified contents can be prevented.

[Category Classification of a Hierarchical Tree Structure]

A description has been made of the constitution in which an encrypted key is constituted as a hierarchical tree structure shown in FIG. 3 such as a root key, a node key, a leaf key, etc., and a content key, an authentication key, an ICV producing key or a program code, data or the like are encrypted along with an enabling key block and distributed, but a description will be made hereinafter of the constitution in which a hierarchical tree structure which defines a node key or the like is classified every category of devices to execute efficient key renewing process, encrypted key distribution, and data distribution.

Figure 23:
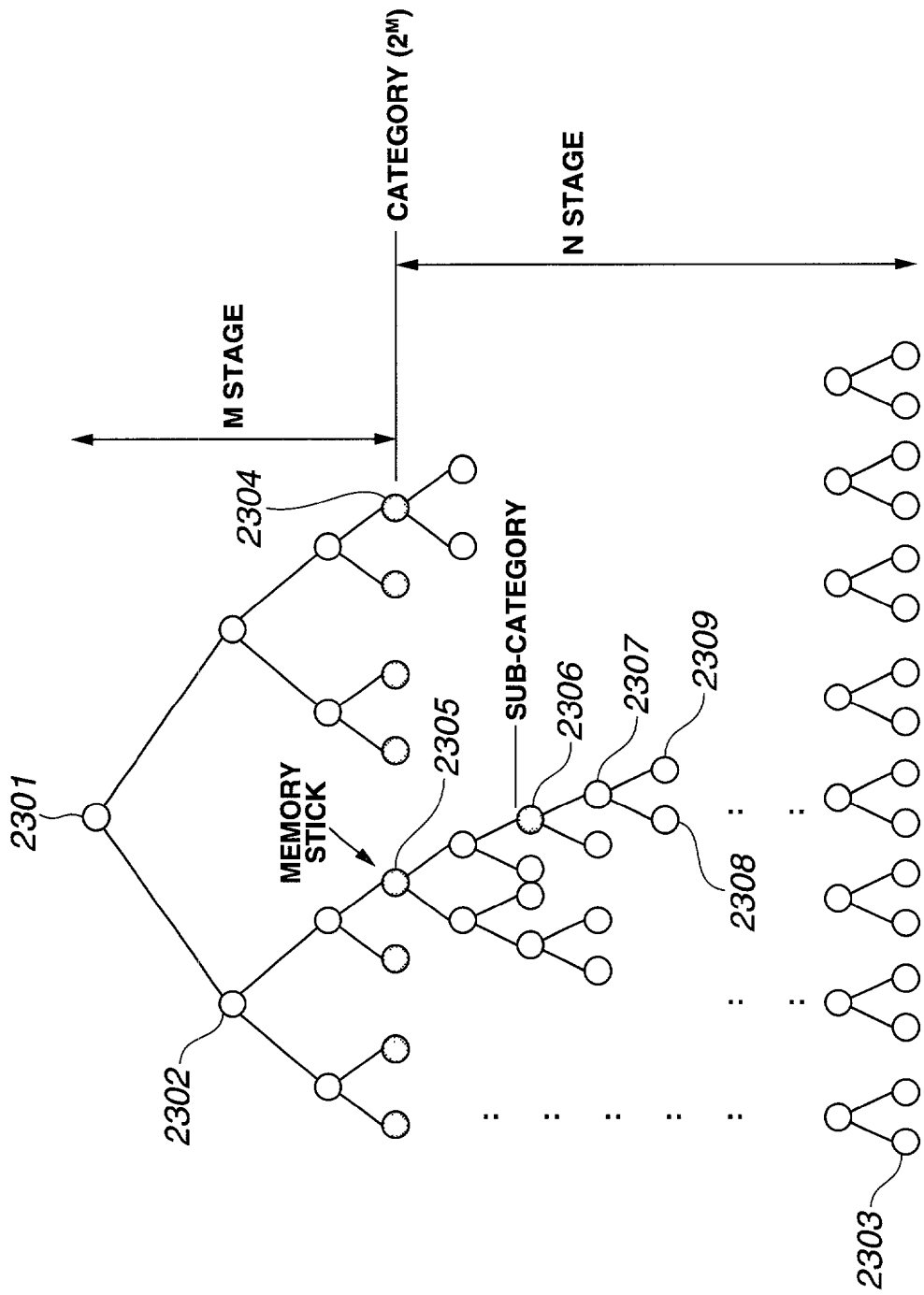
FIG. 23 is a view for explaining an example of category classification of a hierarchical tree structure in the information processing system of the present invention.

FIG. 23 shows one example of classification of category of a hierarchical tree structure. In FIG. 23, a root key Kroot 2301 is set on the uppermost stage of the hierarchical tree structure, a node key 2302 is set in the intermediate stage, and a leaf key 2303 is set in the lowest stage. Each device holds individual leafkeys, and a series of node keys from a leaf key to a root key, and a root key.

Here, as one example, nodes from the uppermost stage to the M stage is set as a category node 2304. That is, each of nodes on the M stage is set as a device setting node of a specific category. Nodes and leaves lower than the M+1 stage are taken as nodes and leaves in connection with devices contained in the category thereof with one node in the M stage as a top.

For example, a category [Memory stick (trademark)] is set to one node 2305 in the M stage of FIG. 23, and nodes and leaves provided lower than the node 2305 are set as category-exclusive use nodes or leaves containing various devices using the memory stick. That is, those below the node 2305 are defined as the gathering of nodes and leaves associated with device defined in the category of the memory stick.

Further, a stage at a level below several stages from the M stage can be set as a sub-category node 2306. For example, a node of [Reproducing exclusive-use unit] is set as a sub-category node contained in the category of the device using the memory stick in a node two stages below a category [memory stick] node 2305 as shown in the figure. Further, a node 2307 of a telephone with a music reproducing function contained in the category of the reproducing exclusive-use unit below the node 2306 of the reproducing exclusive-use unit as a sub-category node, and a [PHS] node 2308 and a [Portable telephone] node 2309 contained in the category of the telephone with a music reproducing function can be set therebelow.

Further, the category and sub-categories can be set not only at the kind of devices, but also at nodes managed independently, for example, makers, a content provider, a settlement organization or the like, that is, at suitable units such as processing unit, jurisdiction unit, or service providing unit (these will be generally called entity). For example, if one category node is set as a game machine XYZ exclusive-use top node sold by game machine makers, a node key and a leaf key in the lower stage below the top node can be stored in the game machine XYZ sold by makers for sales, after which distribution of encrypted contents, or distribution of various keys, and renewal processing are distributed producing an enabling key block (EKB) constituted by node keys and leaf keys below the top node key, and data that can be utilized merely for the devices below the top node can be distributed.

The constitution can be provided in which the node below one node as a top is set as an associated node of the category or sub-categories defined, whereby makers, a content provider or the controlling one top node in the category stage or sub-category stage independently produces an enabling key block with the node as a top to distribute it to the devices belonging to those below the top node, and key renewing can be executed without affecting at all on the devices belonging to the nodes of other categories not belonging to the top node.

[Key Distributing Constitution by Simplified EKB]

Figure 24A:
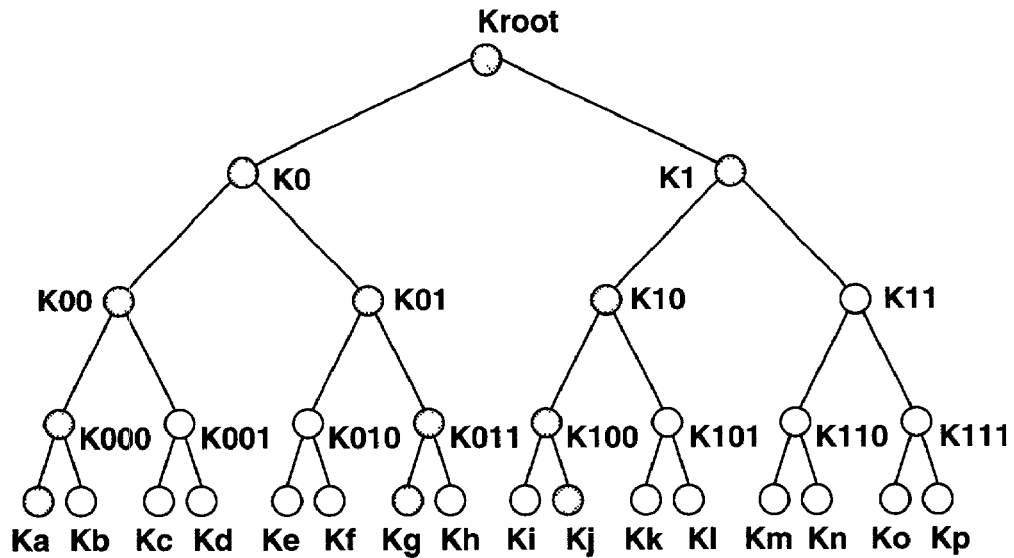
FIGS. 24A and 24B are views each for explaining a producing process of a simplified enabling key block (EKB) in the information processing system of the present invention.

For example, in the tree structure of FIG. 3 described previously, where for example, a content key is addressed to a predetermined device (leaf), a decodable enabling key block (EKB) is produced and provided using a leaf key and a node key owned by a key distributing device. For example, in a tree structure shown in FIG. 24A, where a key, for example, a content key is transmitted to devices a, g, j constituting a leaf, a decodable enabling key block (EKB) is produced in the nodes a, g, j and distributed.

Figure 24B:
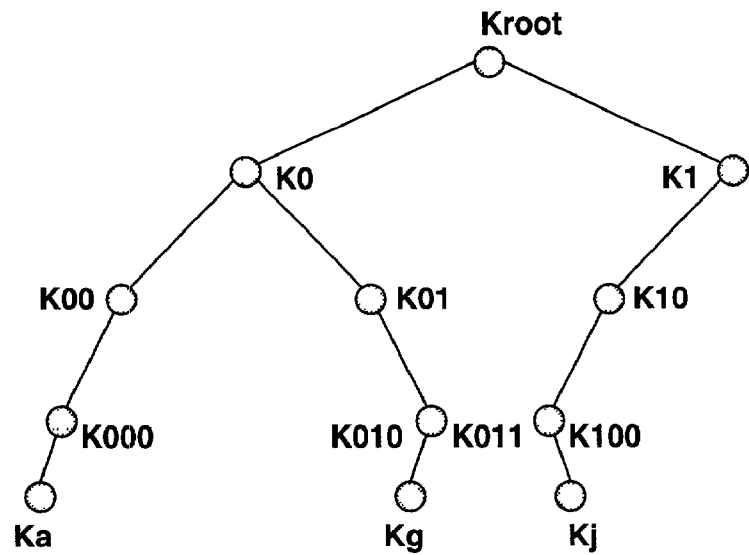

It is contemplated that for example, a content key K(t)con is subjected to encrypting processing by a renewal root key K(t)root to distribute it along with EKB. In this case, the devices a, g, j execute processing of EKB using a leaf key and a node key shown in FIG. 24B to obtain K(t)root, and execute decrypting process of a content key K(t)con by the obtained renewal root key K(t)root to obtain a content key.

Figures 25A, 25B:
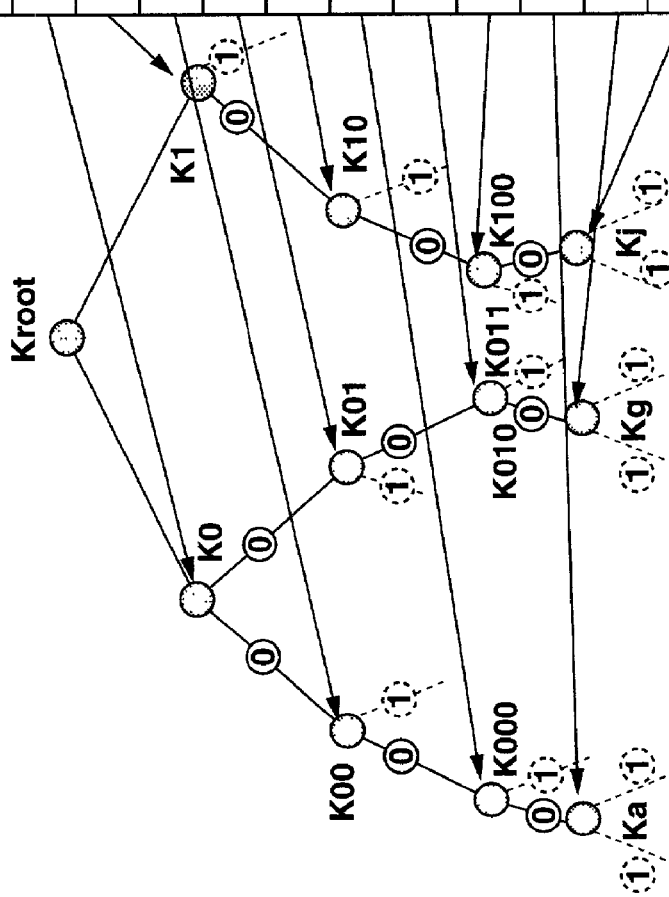
FIGS. 25A and 25B are views each for explaining a producing process of an enabling key block (EKB) in the information processing system of the present invention.

The constitution of the enabling key block (ERK) provided in this case is as shown in FIGS. 25A and 25B. The enabling key block (ERK) shown in FIGS. 25 and 25B is constituted in accordance with the format of the enabling key. block (EKB) explained previously with reference to FIG. 6, has a tag corresponding to data (encrypted key). The tag is 0, if data is present in the directions of left (L) and right (R), and is 1 if not, as previously explained with reference to FIGS. 7A to 7C.

The device which received the enabling key block (EKB) sequentially executes decrypting process of encrypted keys on the basis of an encrypted key of the enabling key block (EKB) and the tag to obtain a renewal key of an upper node. As shown in FIGS. 25A and 25B, in the enabling key block (EKB), the more the number of stages (depth) from a root to a leaf, the quantity of depths increases. The number of stages (depth) increases according to the number of devices (leaf), and where there are many numbers of devices to be a distributing destination of keys, the data quantity of EKB further increases.

The constitution in which the reduction of data quantity of the enabling key block (EKB) as described is enabled will be described below. FIGS. 26A and 26B show an example in which the enabling key block (EKB) is simplified according to the key distribution device.

It is assumed that similarly to FIGS. 25A and 25B, a key, for example, a content key is transmitted to devices a, g, j constituting a leaf As shown in FIG. 26A, a tree constituted merely by a key distributing device is constructed. In this case, a tree constitution of FIG. 26B is constructed as a new tree constitution based on the constitution shown in FIG. 24B. No branch is present from Kroot to Kj, but only one branch will suffice, and, from K root to Ka and Kg, a tree of FIG. 26A having a 2-branch constitution is constructed merely by constituting a branch point at K0.

As shown in FIG. 26A, a simplified tree having only K0 as a node is produced. The enabling key block (EKB) for the renewal key distribution is produced on the basis of these simplified trees. The tree shown in FIG. 26 A is a re-constructed hierarchical tree re-constructed by selecting a pass constituting a 2-branch type tree with a decodable terminal node or leaf as the lowest stage to omit unnecessary nodes. The enabling key block (EKB) for distributing a renewal key is constituted on the basis of only the key corresponding to a node or a leaf of the re-constructed hierarchical tree.

The enabling key block (EKR) described previously with reference to FIGS. 25A and 25B stores data having all keys from leaf a, g, j to Kroot, but the simplified EKB stores encrypted data with respect to only the nodes constituting the simplified tree. As shown in FIG. 26B, the tag has a 3-bit constitution. A first bit and a second bit have meaning similar to that of the example of FIGS. 25A and 25B, in which if data are present in the directions of left (L) and right (R), it indicates 0, and if not, 1. A third bit is a bit for indicating that whether or not an encrypted key is contained in EKB, and if data is stored, 1 appears, and if not, 0 appears.

An enabling key block (EKB) provided for a device (leaf) stored in a data communication network or a memory medium is considerably reduced in data quantity as shown in FIG. 26B, as compared with the constitution shown in FIGS. 25A and 25B. Each deice which received the enabling key block (EKB) shown in FIGS. 26A and 26B sequentially decrypts only data in a portion where 1 is stored in the third bit of the tag to enable realization of decrypting of a predetermined encrypted key. For example, the device a decrypt Enc(Ka, K(t)0) by a leaf key Ka to obtain a node key K(t)0, and decrypts encrypted data Enc(K(t)0, K(t)root) by a node key K(t)0 to obtain K(t)root. The device j decrypts encrypted data Enc(Kj, K(t)root) by a leaf key Kj to obtain K(t)root.

The enabling key block (EKB) is produced using only the keys of leaf and node which constructs a simplified new tree constitution constituted merely by the device of the distributing destination to constitute a constructed tree to thereby enable producing an enabling key block (EKR) with less data quantity, and the data distribution of the enabling key block (EKB) can be executed efficiently.

The simplified hierarchical tree constitution can be utilized effectively particularly in the EKB control constitution in entity unit described later. The entity is a gathering block of a plurality of nodes or leaf selected from a node or a leaf constituting a tree constitution as a key distribution constitution. The entity is set as the gathering set according to the kind of devices, or set as the gathering of a variety of forms such as a processing unit, a control unit, or a service providing unit having a common point such as control units of a device providing maker, a content provider, a settlement organization or the like. Devices classified into categories are gathered in a single entity. For example, a simplified tree similar to that described above is reconstructed by top node (sub-roots) of a plurality of entities to produce EKB to thereby make it possible to produce and distribute the decodable simplified enabling key block (EKB) in the device belonging to the selected entity. The control constitution of the entity unit will be described in detail later.

Such an enabling key block (EKB) as described above can be constituted to be stored in information recording medium such as an optical disk, DVD or the like. For example, there can be provided the constitution in which an information recording medium, in which message data such as contents encrypted by a renewal node key is stored in the enabling key bock (EKB) containing data part constituted by the aforementioned encrypted key data and a tag part as position discrimination date in the hierarchical tree structure of encrypted key data, is provided for each device. The device sequentially extracts and decrypts encrypted key data contained in the enabling key block (EKB) in accordance with the discrimination data of the tag part. Of course, there can be employed the constitution in which the enabling key block (EKB) is distributed through a network such as an internet.

[EKB Control Constitution of Entity Unit]

Next, a description will be made of the constitution in which a node or a leaf constituting a tree constitution as a key distribution constitution is controlled by a block as the gathering of a plurality of nodes or leaves. The block as the gathering of a plurality of nodes or leaves will be hereinafter called an entity. The entity is set as the gathering set according to the kind of devices or as the gathering of various forms such as a processing unit, a jurisdiction unit or a service providing unit having a common point such as device providing makers, a content provider or a settlement organization. That is, the entities are defined as managing subjects of devices or entities belonging to a common category such as the device kind, service kind, managing means kind, etc.

Figures 27A, 27B, 27C:
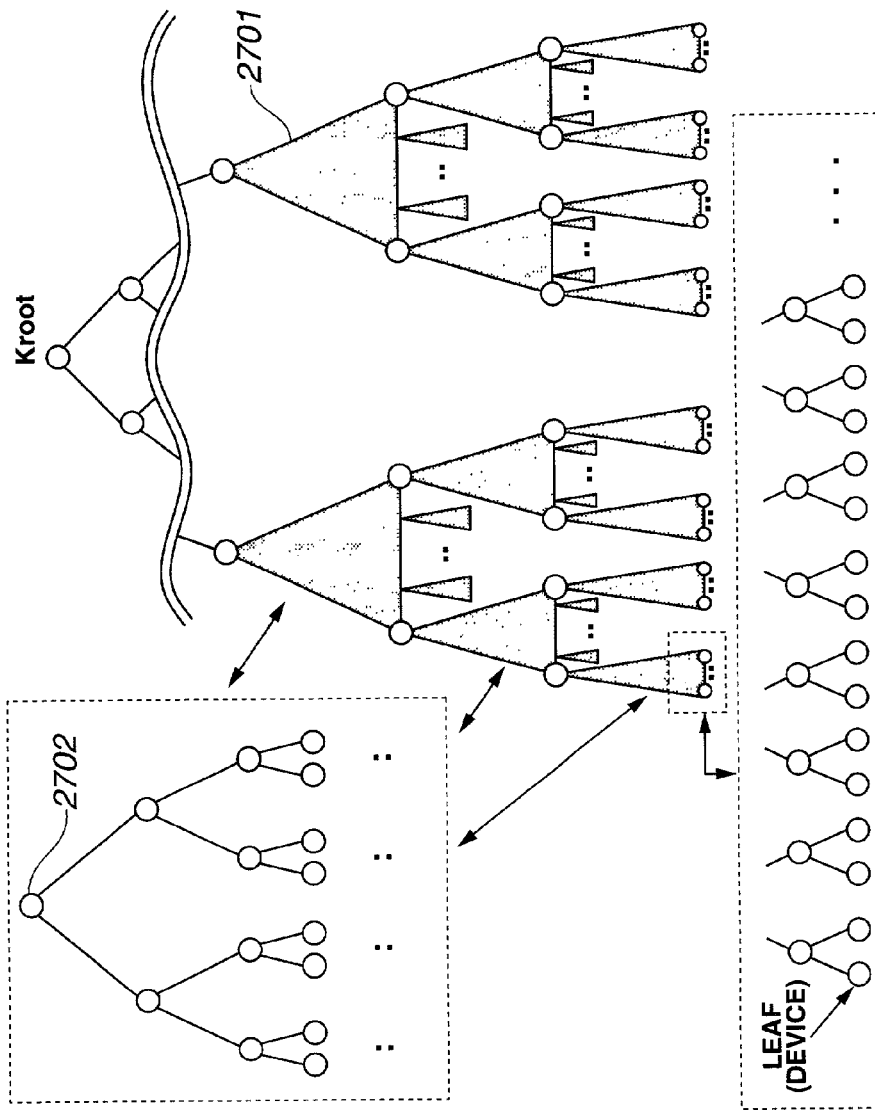
FIGS. 27A to 27C are views each for explaining an entity control constitution of a hierarchical tree structure in the information processing system of the present invention.

The entity will be described with reference to FIGS. 27A to 27C. FIG. 27A is a view for explaining the control constitution in entity unit of a tree. One entity is shown as a triangle in the figure, for example, a plurality of nodes are contained in 1 entity 2701. FIG. 27B shows the node constitution within the 1 entity. The 1 entity is constituted by a plurality of 2-branch type trees as one node as a top. The top node 2702 of the entity will be hereinafter called a sub-root.

The terminal of the tree is constituted by a leaf as shown in FIG. 27C, that is, a device. The device belongs to any entity constituted by a tree with a plurality of device as a leaf and having a top node 2702 which is a sub-root.

As will be understood from FIG. 27A, the entity has a hierarchical structure. This hierarchical structure will be described with reference to FIGS. 28A to 28C.

FIG. 28A is a view for explaining the hierarchical structure in a simplified form. Entities A01 to Ann are constituted in the stage several stages below Kroot, entities B01 to Bnk are set below the entities A1 to An, and entities C1 to Cnq are set thereunder. Each entity has a tree shape constituted by plural stages of nodes and leaves, as shown in FIGS. 28B and 28C.

For example, the constitution of the entity Bnk has a plurality of nodes to a terminal node 2812 with a sub-root 2811 as a top node. This entity has a discriminator Bnk, and the entity Bnk independently executes node key control corresponding to the node within the entity Bnk to thereby execute control of a lower (child) entity set with the terminal node 2812 as a top. On the other hand, the entity Bnk is under the (host) entity Ann having the sub-node as a terminal node 2811.

The constitution of an entity Cn3 has a terminal node 2852 which is each device with a sub-root 2851 as a top node, and a plurality of nodes and leaves to a leaf in this case, as shown in FIG. 28C. This entity has a discriminator Cn3, the entity Cn3 independently executes control of a node key and a leaf key corresponding to the node and leaf within the entity Cn3 to thereby execute control of a leaf (device) corresponding to the terminal node 2852. On the other hand, the entity Cn3 is under the (host) entity Bn2 having the sub-root 2851 as a terminal node. The key control in each entity is, for example, key renewing process, revoke process and the like, which will be described in detail later.

In a device which is a leaf of the lowest entity are stored a node key of each node and a leaf key positioned in a pass from a leaf key of entity to which the device belongs to a sub-root node which is a top node of entity to which itself belongs. For example, the device of the terminal node 2852 stores keys from the terminal node (leaf) 2852 to the sub-root node 2851.

The constitution of the entity will be further described with reference to FIGS. 29A and 29B. The entity is able to have a tree structure constituted by a variety of stage numbers. The stage number, that is, the depth can be set according to the number of child entities corresponding to the terminal node controlled by the entity, or the device number as a leaf.

Figure 29B:
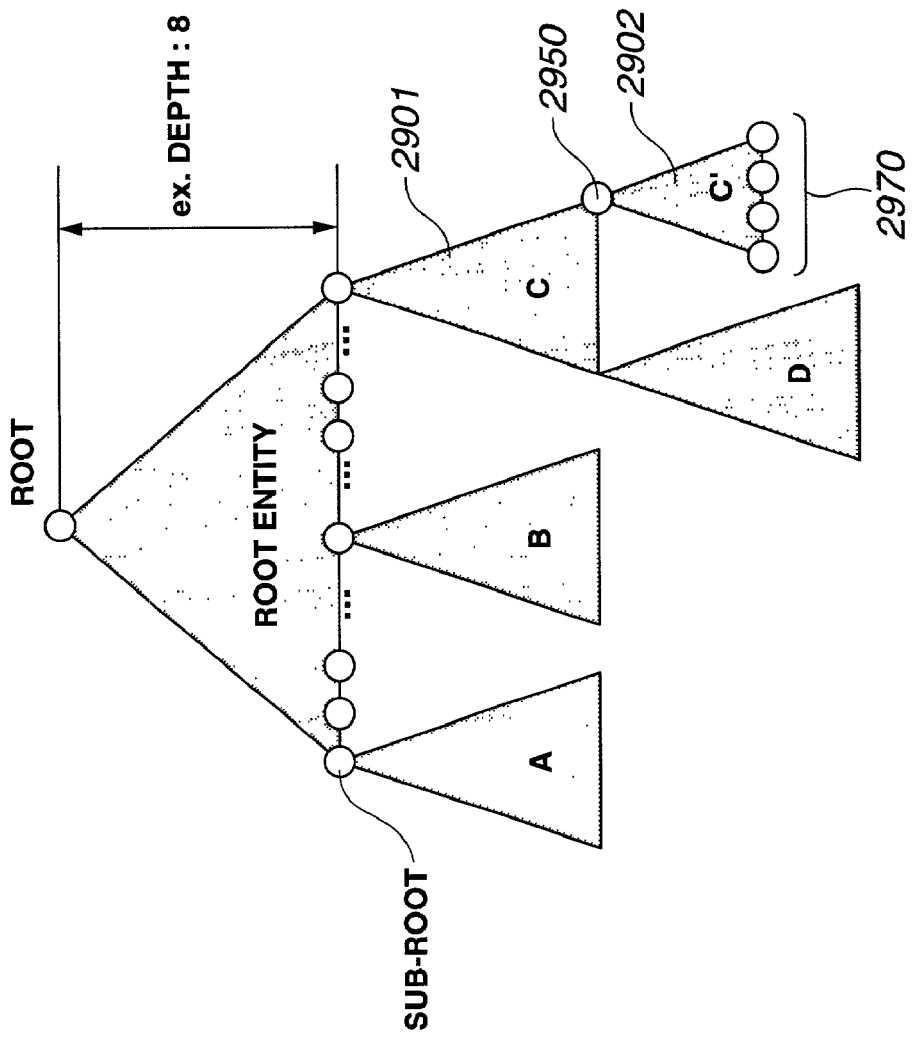
FIGS. 29A and 29B are views each for explaining an entity control constitution of a hierarchical tree structure in the information processing system of the present invention.
Figure 29A:
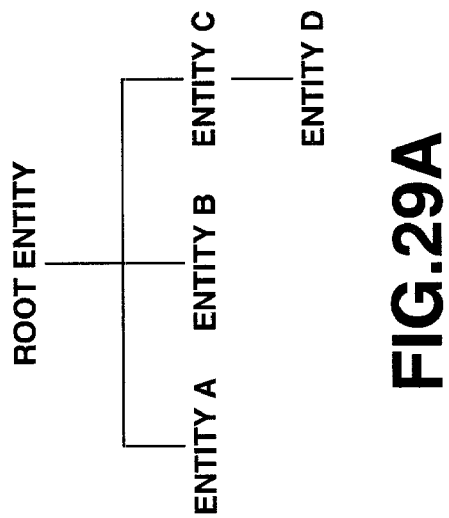

The detail of the constitution of host and child entities as shown in FIG. 29A is as shown in FIG. 29B, The root entity is an entity in the uppermost stage having a root key. Entities A, B, C are set as a plurality of child entities in the terminal node of the root entity, and an entity D is set as a child entity of entity C. An entity C2901 has not less than one node of the terminal node as a sub-node 2950, and where entities controlled by itself are increased, an entity C'2902 having plural stages of trees is newly installed with a reserve node 2950 as a top node to thereby increase control terminal nodes 2970, and a child entity increased can be added to the control terminal node.

Figure 30:
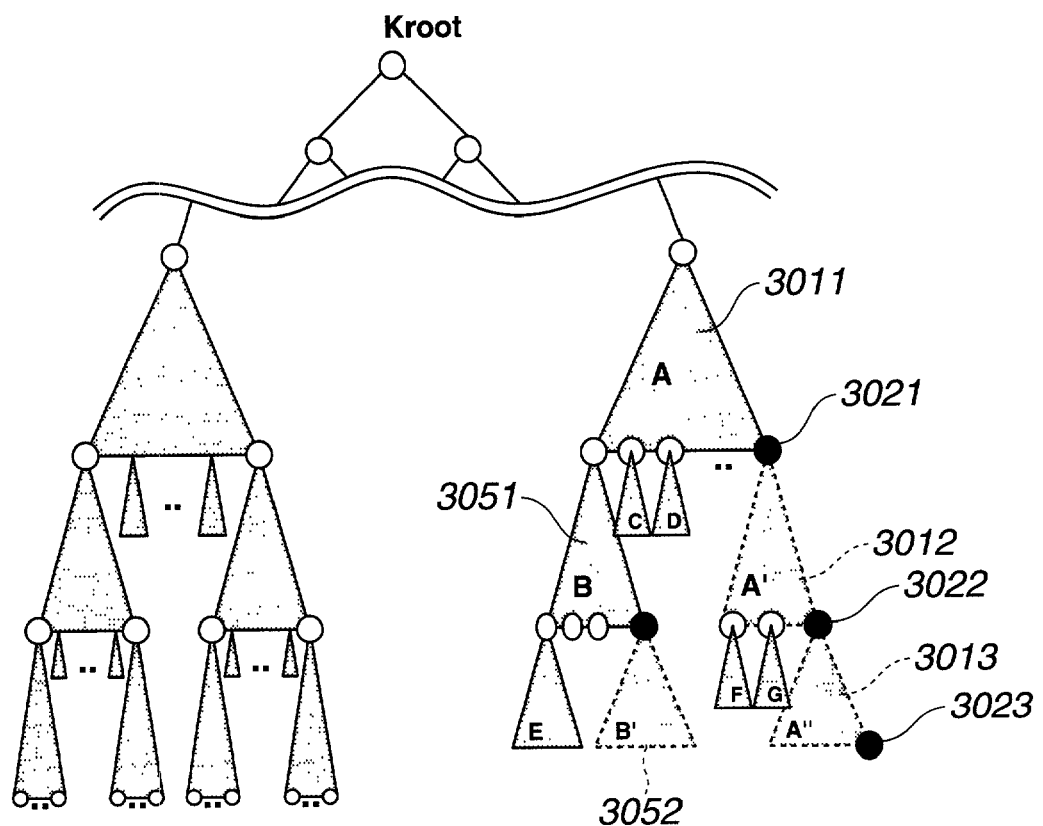
FIG. 30 is a view for explaining a reserve node in an entity control constitution of a hierarchical tree structure in the information processing system of the present invention.

The reserve node will be further described with reference to FIG. 30. Entity A, 3011 has child entities B, C, D . . . to be controlled, and has one reserve node 3021. Where child entities to be controlled are further increased, a child entity A', 3012 under the own control is set to the reserve node 3021, and child entities F, G to be controlled can be further set to the terminal node of the child entity A', 3012. Also in the child entity A', 3012 under the own control, at least one of the terminal nodes is set as a reserve node 3022 whereby a child entity A"3013 is further set to further increase the control entities. One or more reserve nodes are secured also in the terminal node of the child entity A"3013. Such a reserve node holding constitution as described is employed whereby the child entities under a certain entity can be increased endlessly. With respect to the reserve entity, not only one terminal node but a plurality of nodes may be set.

In the respective entities, the enabling key block (EKB) is constituted in entity unit, and key renewing and revoke processing are to be executed in entity unit. As shown in FIG. 30, the enabling key block (EKB) of individual entity is set to a plurality of entities A, A', A", but these can be collectively controlled, for example, by device makers who controls the entities A, A', A" in common.

[Registration Process of New Entities]

Figure 31:
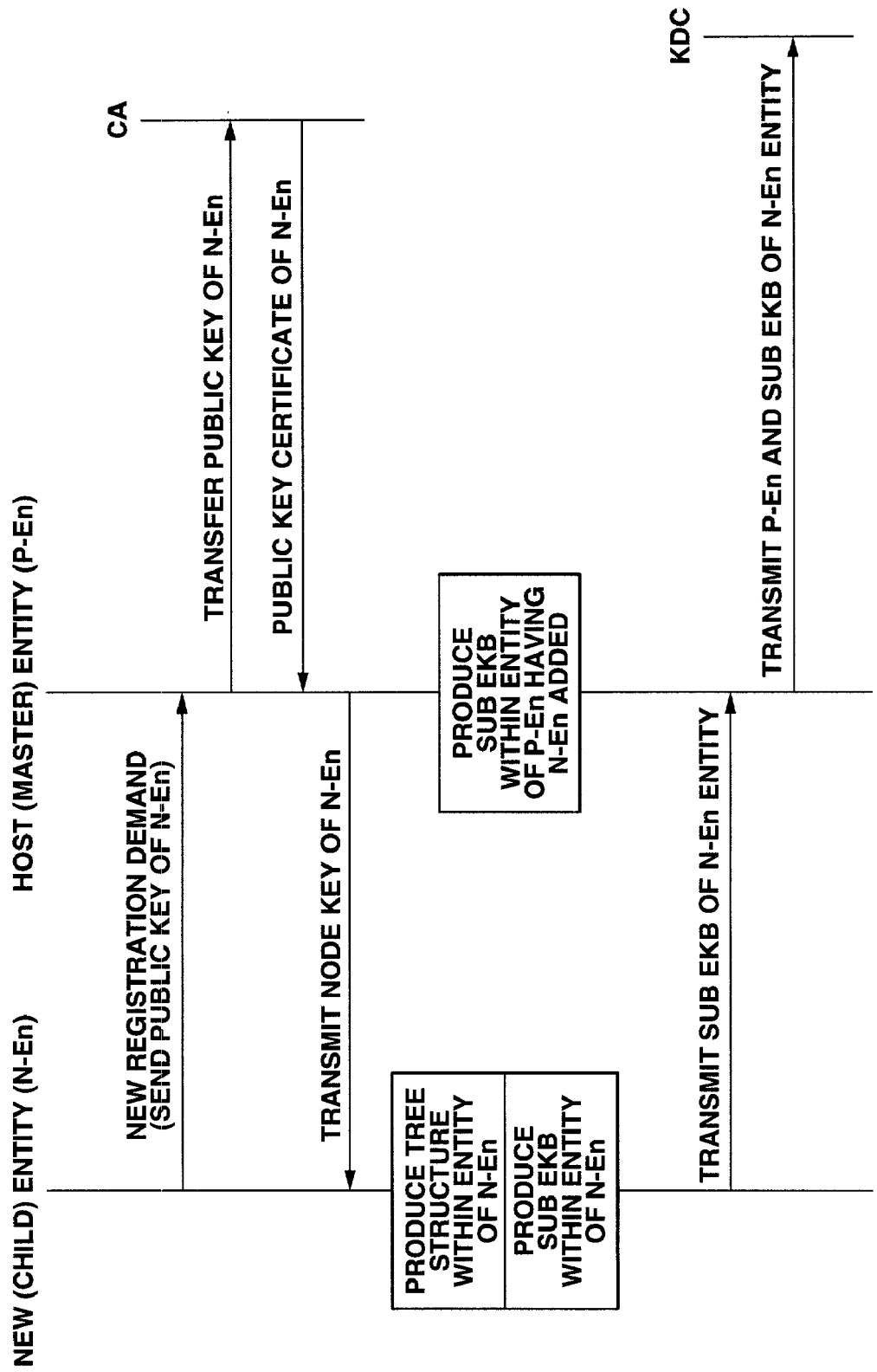
FIG. 31 is a view for explaining a new entity registration sequence in an entity control constitution of a hierarchical tree structure in the information processing system of the present invention.

Next, the registration process of new entities will be described. FIG. 31 shows a registration processing sequence. A description will be made in accordance with the sequence in FIG. 31. A new (child) entity(N-En) newly added during the constitution of a tree executes requesting of new registration to a host entity (P-En). Each entity holds a public key in accordance with a public key encryption system, and a new entity sends own public key to the host entity (P-En) when registration request is made.

The host entity (P-En) which received the registration request transfers a public key of the new a (child) entity received to a certificate authority (CA) and receives a public key of the new (child) entity (N-En) to which a signature of CA is added. These procedures are carried out as a procedure for mutual authentication between the host entity (P-En) and the new (child) entity (N-En).

When the authentication of the new registration requesting entity is terminated, the host entity (P-En) grants the registration of the new (child) entity (N-En) to transmit a node key of the new (child) entity (N-En) to the new (child) entity (N-En). This node key is one node key of the terminal node of the host entity (P-En) which corresponds to a top node of the new (child) entity (N-En), that is, a sub-root key.

When the transmission of node key is finished, the new (child) entity (N-En) constructs the tree constitution of the new (child) entity (N-En), sets a sub-root key of a top node received to a top of the constructed tree, and sets node and leaf keys to produce an enabling key block (EKB) within the entity. The enabling key block (EKB) within one entity is called a sub-EKB.

On the other hand, the host entity (P-En) produces the sub-EKB within the host entity(P-En) to which is added a terminal node to be enabled by the addition of the new (child) entity (N-En).

When the sub-EKB constituted by a node key and a leaf key within the new (child) entity (N-En) is produced, the new (child) entity (N-En) transmits it to the host entity (P-En).

The host entity (P-En) which receives the sub-EKB from the new (child) entity (N-En) transmits the received sub-EKB and a renewal sub-EKB of the host entity (P-En) to a key distribute center (KDC).

The key distribute center (KDC) is able to produce various EKBs, that is, EKB that can be decrypted merely by a specific entity or device on the basis of sub-EKBs of all entities. EKB to which such a decodable entity or device is set is distributed, for example, to a content provider, who encrypts a content key on the basis of EKB to distribute it through a network or store it in a recording medium, thus enabling distribution of a content that can be used merely by a specific device.

The registration processing with respect to the key distribute center (KDC) of the sub-EKB of the new entity is not limited to a method for sequentially transferring the sub-EKB through the host entity, but there can be also employed the constitution which executes the processing for registering the sub-EKB in the key distribute center (KDC) directly from the new registration entity without the intervention of the host entity.

The correspondence of the host entity to the child entity to be newly added to the host entity will be described with reference to FIG. 32. One terminal node 3201 of the host entity is distributed as a top node of the newly added entity to the child entity whereby the child entity is added as an entity under the control of the host entity. The entity under the control of the host entity termed herein, which will be described later, also includes meaning of the constitution in which the revoke processing of the child entity can be executed by the host entity.

Figure 32:
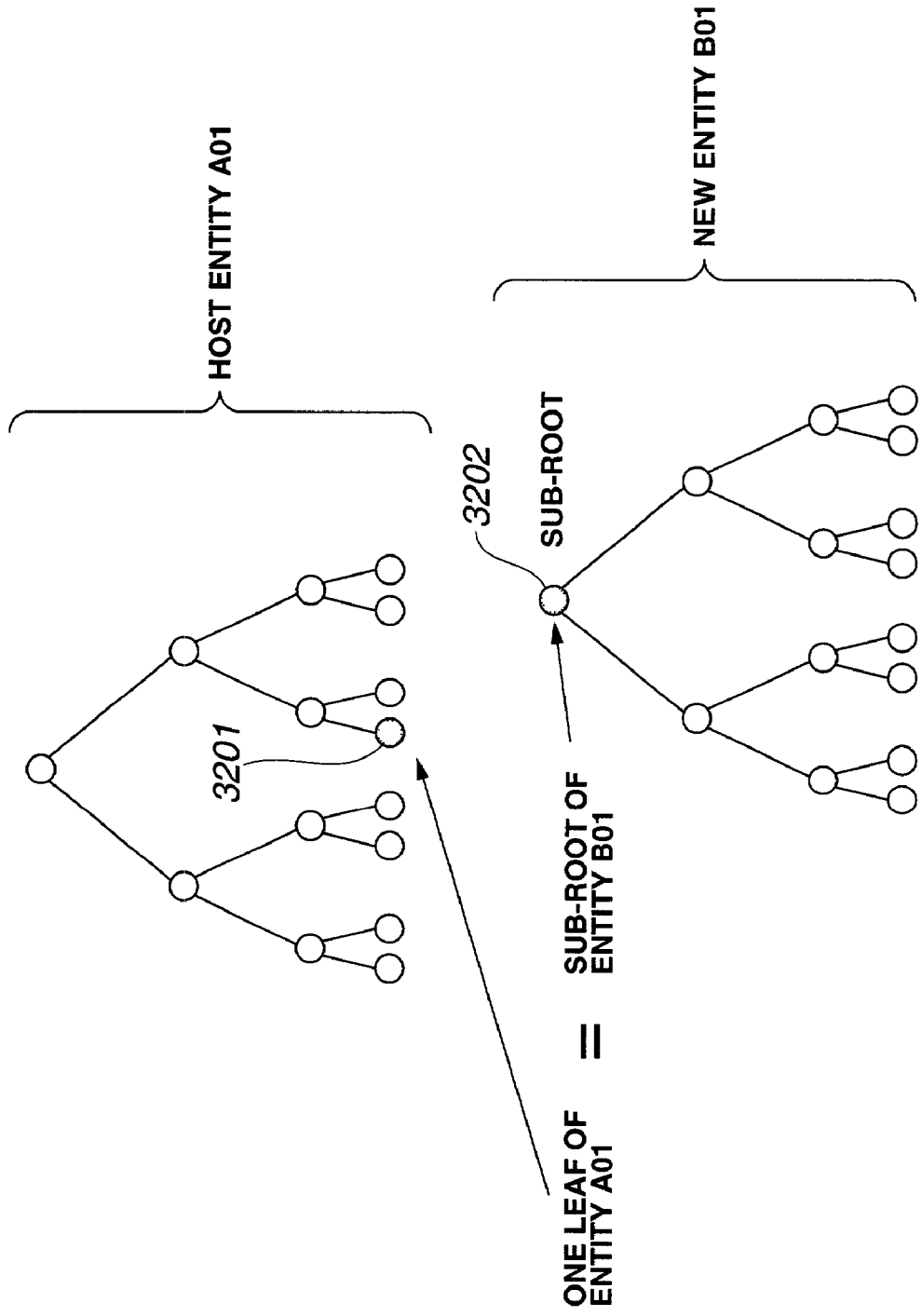
FIG. 32 is a view for explaining a relationship between a new entity and a host entity in an entity control constitution of a hierarchical tree structure in the information processing system of the present invention.

As shown in FIG. 32, when a new entity is set to the host entity, one node 3201 of a terminal node which is a leaf of the host entity and a top node 3202 of the newly added entity are set as equal nodes. That is, one terminal node which is one leaf of the host node is set as a sub-root of the newly added entity. By being so set, the newly added entity is enabled under the whole tree constitution.

FIGS. 33A and 33B show an example of a renewal EKB produced by the host entity when the newly added entity is set. FIG. 33A shows an example of a sub-EKB produced by the host entity when a new entity added terminal node (node 100) 3303 is applied to the newly added entity, in the constitution shown in FIG. 33A which has a terminal node (node 000) 3301 which has been effectively present and a terminal node (node 001) node 3302.

The sub-EKB has the constitution as shown in FIG. 33B. There are a host node key encrypted by a terminal node which has been effectively present, a further host node key encrypted by the host node key, . . . and a sub-root key. Similarly to FIG. 33B, each entity has and controls EKB constituted to have a host node encrypted by an effective terminal node or leaf key, encrypts a further host node key by the host node key, and an encrypted data to a sub-root sequentially being increased in depth.

[Revoke Processing Under the Control of Entity]

Next, a description will be made of the revoke processing of a device or an entity in the constitution in which the key distribution tree constitution is controlled as an entity unit. In previous FIGS. 3 and 4, a description has been made of the processing for distributing an enabling key block (EKB) in which only the specific device out of the whole tree constitution is decodable, and the revoked device is undecodable. The revoke processing described in FIGS. 3, 4A and 4B is the processing for revoking a device which is a specific leaf out of the whole tree, but the constitution by entity control of the tree is possible to execute the revoke processing every entity.

A description will be made hereinafter of the revoke processing in the constitution under the entity control with reference to FIGS. 34A to 34D and drawings continuous thereto. FIGS. 34A to 34D is a view for explaining the revoke processing of a device by an entity which controls an entity in the lowest stage, out of entities constituting a tree, that is, an entity controlling individual devices.

Figures 34A, 34B, 34C, 34D:
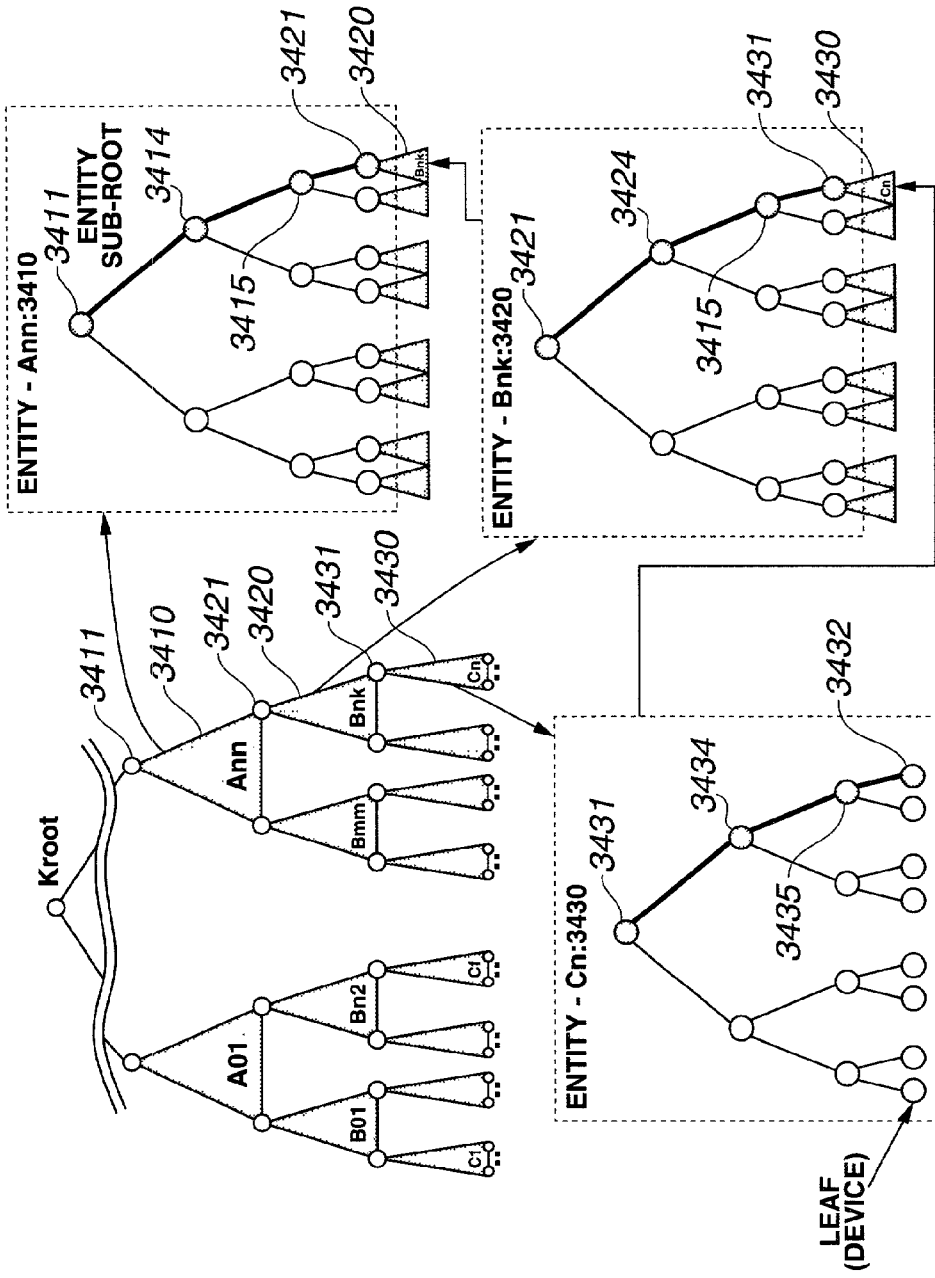
FIGS. 34A to 34D are views each for explaining a device revoke processing in an entity control constitution of a hierarchical tree structure in the information processing system of the present invention.

FIG. 34A shows the key distribution tree structure under the control of entity. A root node is set to the uppermost part of the tree, and entities A01 to Ann, entities B01 to Bnk below the previous entities, and entities C1 to cn in the lowest stage are constituted. In the lowest entity, the terminal node (leaf) is individual devices, for example, a recording and reproducing unit, a reproducing exclusive-use unit or the like.

The revoke processing is independently in each entity. For example, in the entities Cl to Cn in the lowest stage, the revoke processing of a device of a leaf is executed. FIG. 34B shows the tree constitution of an entity Cn, 3430 which is one of the entities in the lowest stage. The entity Cn, 3430 has a top node 3431, and a leaf which is a terminal node has a plurality of devices.

Assume that a device to be revoked, for example, a device 3432 is present in a leaf, the entity Cn, 3430 produces an enabling key block (sub-EKB) constituted by a node key and a leaf key in the independently renewed entity Cn. This enabling key block is a key block constituted by an encrypted key that cannot be decrypted in the revoke key in the revoke device 3432 but that can be decrypted by only the device constituting other leaf. A controller of the entity Cn produce it as a renewed sub-EKB. Concretely, the block, which comprises an encrypted key which renews node keys of nodes 3431, 3434, and 3435 constituting a pass associated with a sub-root to a revoke device 3432, and can decrypt the renewal key only in a leaf device other than the revoke device 3432. This processing corresponds to the processing in which a root key is replaced by a sub-root which is a top key of entity, in the revoke processing constitution described in FIGS. 3, 4A and 4B.

The enabling key block (sub-EKB) renewed by the entity Cn, 3430 through the revoke processing is transmitted to the host entity. In this case, the host entity is an entity Bnk, 3420, and an entity having a top node 3431 of the entity Cn, 3430 as a terminal node.

The entity Bnk, 3420, when receives the enabling key block (sub-EKB) from the child entity Cn, 3430, sets the terminal node 3431 of the entity Bnk, 3420 corresponding to the top node 3431 of the entity Cnk, 3430 contained in the key block to a key renewed in the child entity Cn, 3430, and executes the renewal processing of sub-EKB of own entity Bnk, 3420. FIG. 34C shows the tree of entity Bnk, 3420. In the entity Bnk, 3420, a node key to be renewed is a node key on a pass from the sub-root 3421 in FIG. 34C to the terminal node 3431 constituting an entity containing a revoke device. That is, node keys of the nodes 3421, 3424, 3425 constituting a pass associated with the node 3431 of the entity transmitted from the renewal sub-EKB are to be renewed. These node keys of nodes are renewed to produce a new renewal sub-EKB of the entity Bnk, 3420.

Further, the enabling key block (sub-EKB) renewed by the entity Bnk, 3420 is transmitted to the host entity. In this case, the host entity is the entity Ann, 3410, and an entity having a top node 3421 of the entity Bnk, 3420 as a terminal node.

The entity Ann, 3410, when receives the enabling key block (sub-EKB) from the child entity Bnk, 3420, sets the terminal node 3421 of the entity Ann, 3410 corresponding to the top node 3421 of the entity Bnk, 3420 contained in the key block to a key renewed in the child entity Bnk, 3420, and executes the renewal processing of sub-EKB of own entity Ann, 3410. FIG. 34D shows the tree of entity Ann, 3410. In the entity Ann, 3410, node keys to be renewed are node keys 3411, 3414, 3415 on a pass from the sub-root 3411 in FIG. 34D to the terminal node 3421 constituting an entity containing a revoke device. These node keys of nodes are renewed to produce a new renewal sub-EKB of the entity Ann, 3410.

These processes sequentially execute in the host entity to the root entity described in FIG. 29B. The revoke processing of devices is completed by a series of processes as described. The sub-EKB renewed in the entity is finally transmitted to the key distribute center (KDC) and stored therein. The key distribute center (KDC) produces various EKBs on the basis of the renewal sub-EKB of all entities. The renewal EKB is an encrypted key block that cannot be decrypted by the device revoked.

Figure 35:
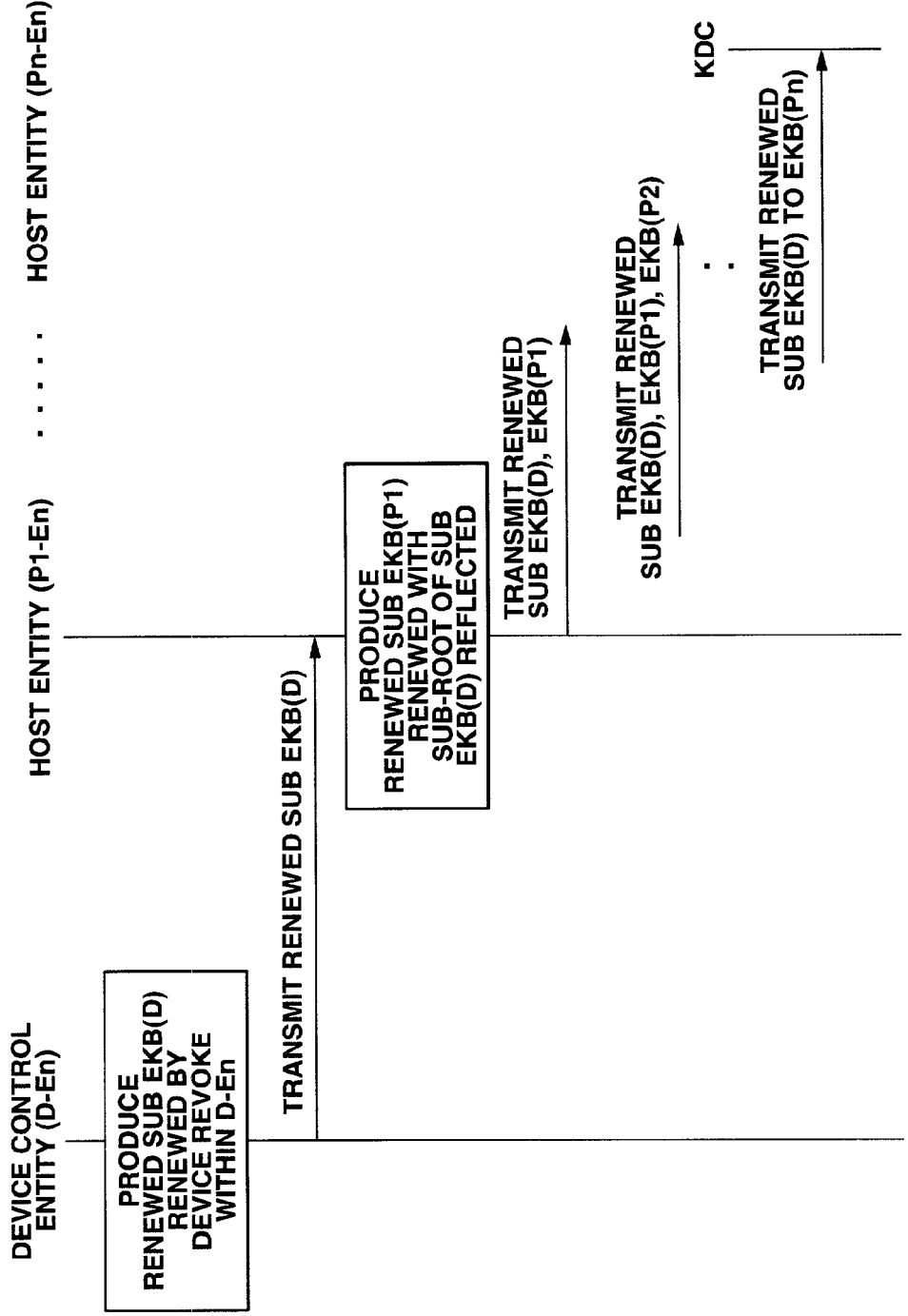
FIG. 35 is a view for explaining a device revoke processing sequence in an entity control constitution of a hierarchical tree structure in the information processing system of the present invention.

FIG. 35 shows a sequence of revoke process of the device. The processing procedure will be described with reference to the sequence figure of FIG. 35. First, the device control entity (D-En) in the lowest stage of the tree constitution carries out key renewing necessary for revoking a leaf to be revoked in the device control entity (D-En) to produce a new sub-EKB of the device control entity (D-En). The sub-EKB is sent to the host entity. The host entity (P1-En) which received the renewal sub-EKB (D) produces a renewal sub-EKB (P1) in which a terminal node key corresponding to a renewal top node of the renewal sub-EKB (D) is renewed and node keys on a pass from the terminal node to the sub-root. These processes are sequentially executed in the host entity, and all sub-EKBs finally renewed are stored and controlled by the key distribute center (KDC).

Figure 36:
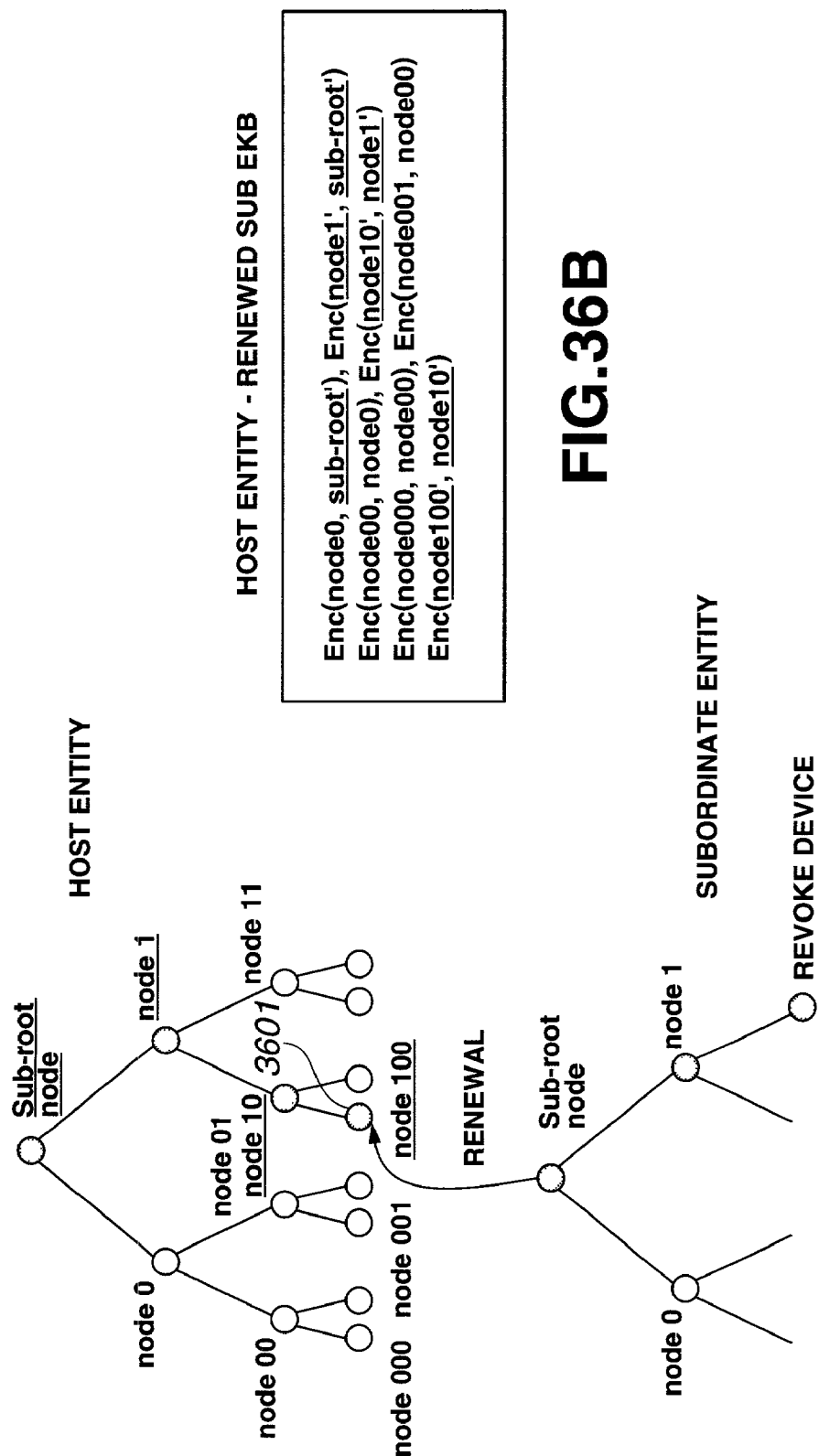
FIGS. 36A and 36B are views each for explaining a renewal sub-EKB at the time of device revoke in an entity control constitution of a hierarchical tree structure in the information processing system of the present invention.

FIGS. 36A and 36B show an example of an enabling key block (EKB) to be produced as a result that the host entity carries out renewal processing by the revoke processing of a device.

FIGS. 36A and 36B are views each for explaining an example of EKB produced in the host entity which received renewal sub-EKB from the child entity containing a revoke device, in the constitution shown in FIG. 36A. A top node of the child entity containing the revoke device corresponds to a terminal node (node 100) 3601 of the host entity.

The host entity renews node keys which are present in a pass from the sub-root of the host entity to the terminal node (node 100) 3601 to produce a new renewed sub-EKB. The renewal sub-EKB is as shown in FIG. 36B. The renewed key is shown with the underline and ['] attached thereto. The node keys on a pass from the renewed terminal node to the sub-rot are renewed to obtain a renewal sub-EKB in its entity.

Next, processing where an object subjected to revoking is an entity, that is, revoke processing of entity, will be described.

Figure 37:
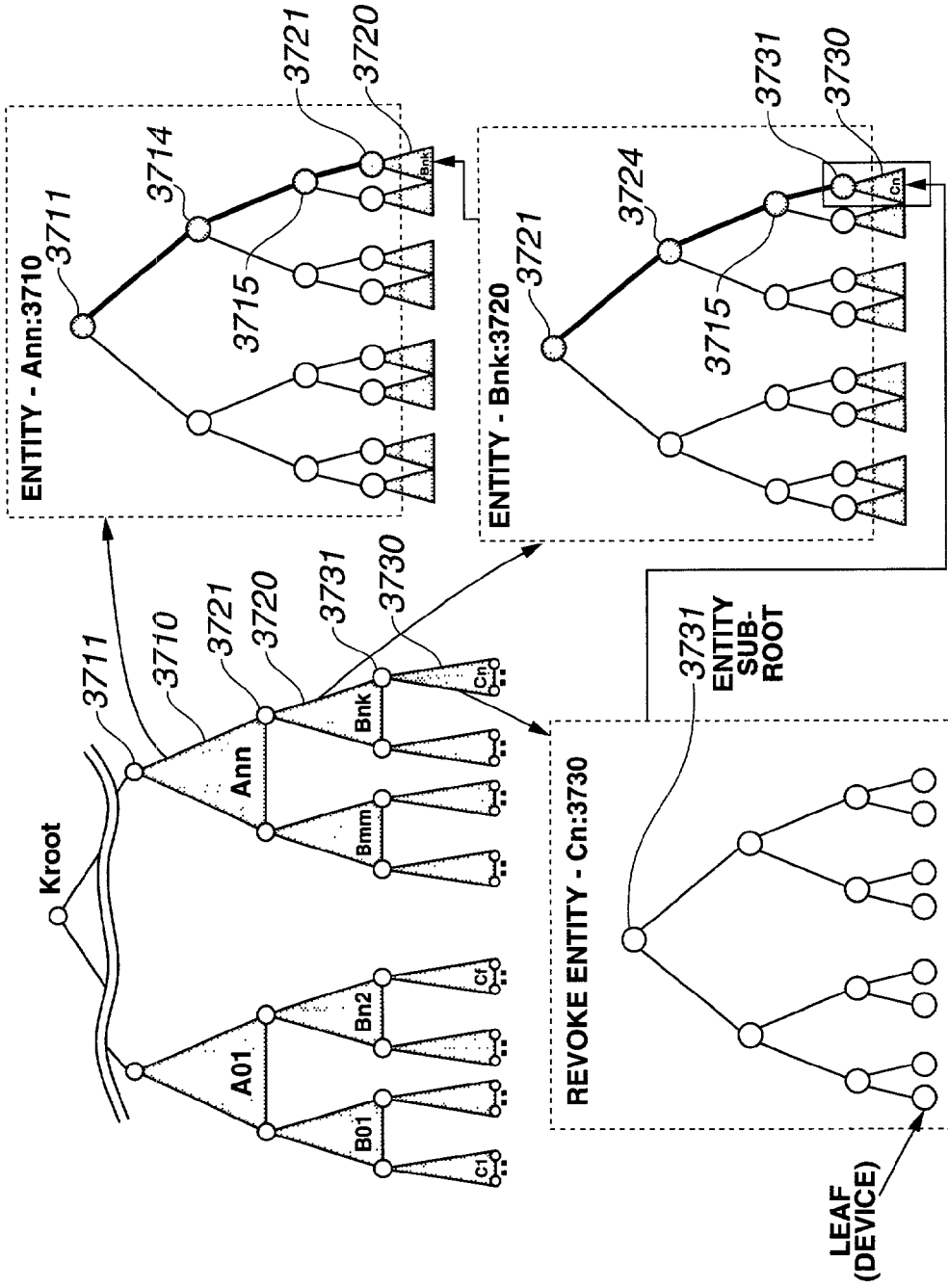
FIGS. 37A to 37D are views each for explaining an entity revoke processing in an entity control constitution of a hierarchical tree structure in the information processing system of the present invention.

FIG. 37A shows the key distribution tree structure by entity control. A root node is set to the uppermost part of the tree, and entities A01 to Ann are constituted several stages thereunder, entities B01 to Bnk are constituted in the stage lower than the former, and entities C1 to Cn are constituted in the stage lower than the further stage are constituted. In the lowest entity, the terminal node (leaf) is individual devices, for example, such as recording and reproducing unit, a reproducing exclusive-use unit or the like.

Now, a description is made of the case where the revoke processing is carried out with respect to the entity Cn, 3730. The entity Cn, 3730 in the lowest stage has the constitution in which a top node 3431 is provided, and a plurality of devices are provided on a leaf which is a terminal node, as shown in FIG. 37B.

The revoking of the entity Cn, 3730 enables collective revoke of all devices belonging to the entity Cn, 3730 from the tree structure. The revoke processing of the entity cn, 3730 is executed in the entity Bnk, 3720 which is the host entity of the entity Cn, 3730. The entity Bnk, 3720 is an entity having the top node 3731 of the entity Cn, 3730 as a terminal node.

Where revoking of the child entity Cn, 3730 is executed, the entity Bnk, 3720 renews a terminal node 3731 of the entity Bnk, 3720 corresponding to the top node 3731 of the entity Cnk, 3730, and further carries out renewing of node keys on a pass from the revoke entity 3730 to the sub-root of the entity Bnk, 3720 to produce an enabling key block to produce a renewal sub-EKB. The node key to be renewed is a node key on a pass from the sub-root 3721 shown in FIG. 37C to a top node of a revoke entity. That is, nodes 3721, 3724, 3725 and 3731 are objects to be renewed. These node keys of nodes are renewed to produce new renewal sub-EKB of the entity Bnk, 3720.

Alternatively, where revoking of the child entity Cn, 3730 is executed, the entity Bnk, 3720 does not renew the terminal node 3731 of the entity Bnk, 3720 corresponding to the top node 3731 of the entity Cnk, 3730 but renews a node key except the terminal node 3731 on the pass from the revoke entity 3730 to the sub-root of the entity Bnk, 3720 to produce an enabling key block to produce a renewal sub-EKB.

Further, the enabling key block (sub-EKB) renewed by the entity Bnk, 3720 is transmitted to the host entity. In this case, the host entity is an entity Ann, 3710, which is an entity having a top node 3721 of the entity Bnk, 3720 as a terminal node.

When an enabling key bock (sub-EKB) is received from the child entity Bnk, 3720, the entity Ann, 3710 sets the terminal node 3721 of the entity Ann, 3710 corresponding to the top node 3721 of the entity Bnk, 3720 contained in the key block to a key renewed in the child entity Bnk, 3720 to execute renewal processing of the sub-EKB of the own entity Ann, 3710. FIG. 37D shows the tree constitution of the entity Ann, 3710. In the entity Ann, 3710, the node key to be renewed is a node key of each node 3711, 3714, 3715 constituting a pass from the sub-root 3711 of FIG. 37D to the node 3721 of the entity having transmitted the renewal sub-EKB. These node keys of the nodes are renewed to produce a new renewal sub-EKB of the entity Ann, 3710.

These processes are sequentially executed in the host entity to execute it to the root entity described with reference to FIG. 29D. The revoke processing is completed by a series of processes. The sub-EKB renewed in the respective entity is finally transmitted to the key distribute center (KDC) and stored. The key distribute center KDC produces various EKBs on the basis of the renewal sub-EKB of all entities. The renewal EKB is an encrypted key block that cannot be decrypted by the device belonging to the entity revoked.

Figure 38:
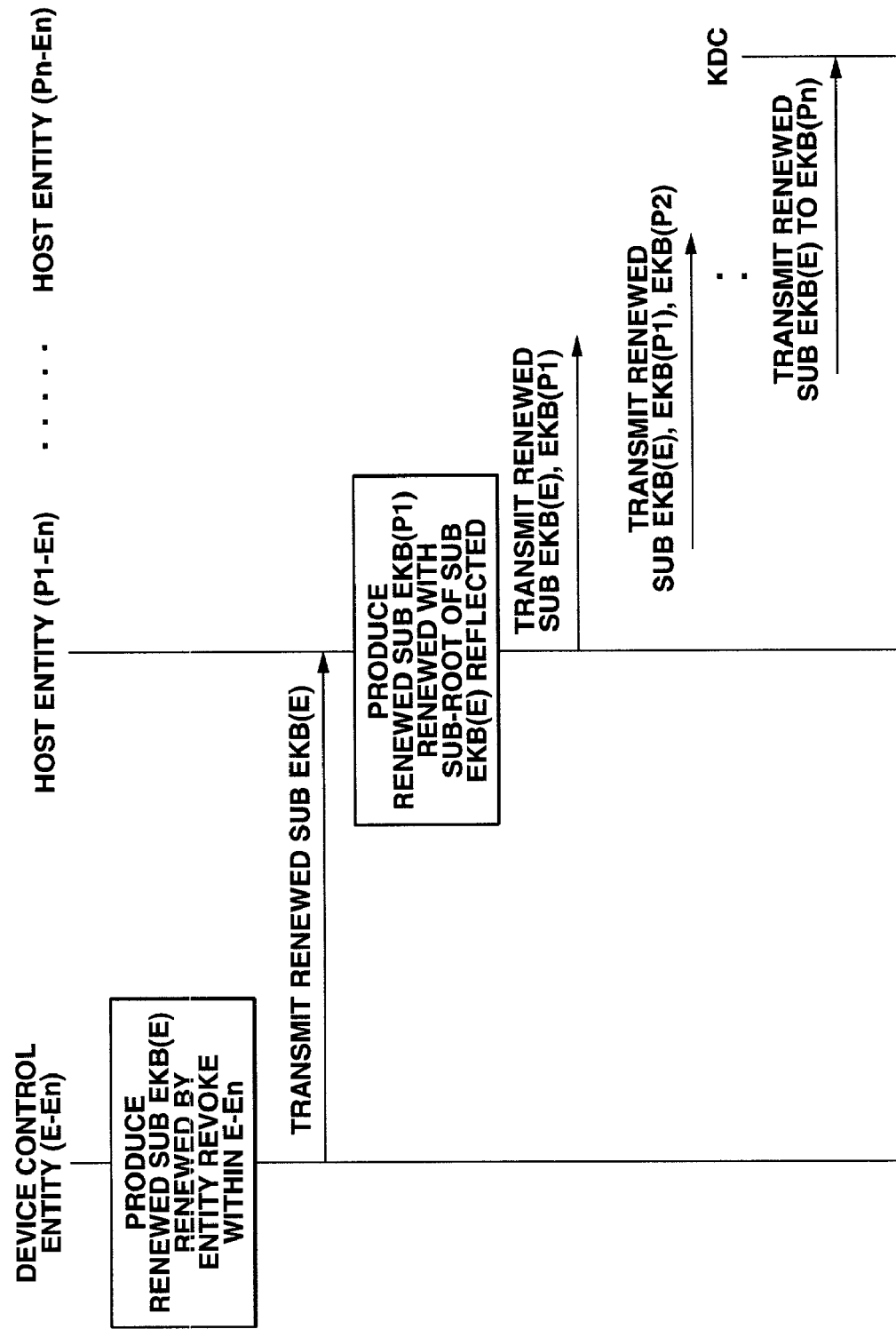
FIG. 38 is a view for explaining an entity revoke processing sequence in an entity control constitution of a hierarchical tree structure in the information processing system of the present invention.

FIG. 38 shows a sequence of revoke process of the entity. The processing procedure will be described with reference to the sequence figure of FIG. 38. First, the entity control entity (E-En) for revoking the entity carries out key renewing necessary for revoking a terminal node to be revoked in the entity control entity (E-En) to produce a new sub-EKB of the entity control entity (E-En). The sub-EKB is sent to the host entity. The host entity (P1-En) which received the renewal sub-EKB (E) produces a renewal sub-EKB (P1) in which a terminal node key corresponding to a renewal top node of the renewal sub-EKB (P1) is renewed and node keys on a pass from the terminal node to the sub-root are renewed. These processes are sequentially executed in the host entity, and all sub-EKB finally renewed are stored and controlled by the key distribute center (KDC). The key distribute center (KDC) produces various EKB on the basis of the renewal EKB of all entities. The renewal EKB is an encrypted key block that cannot be decrypted by a device belonging to the entity revoked.

Figure 39:
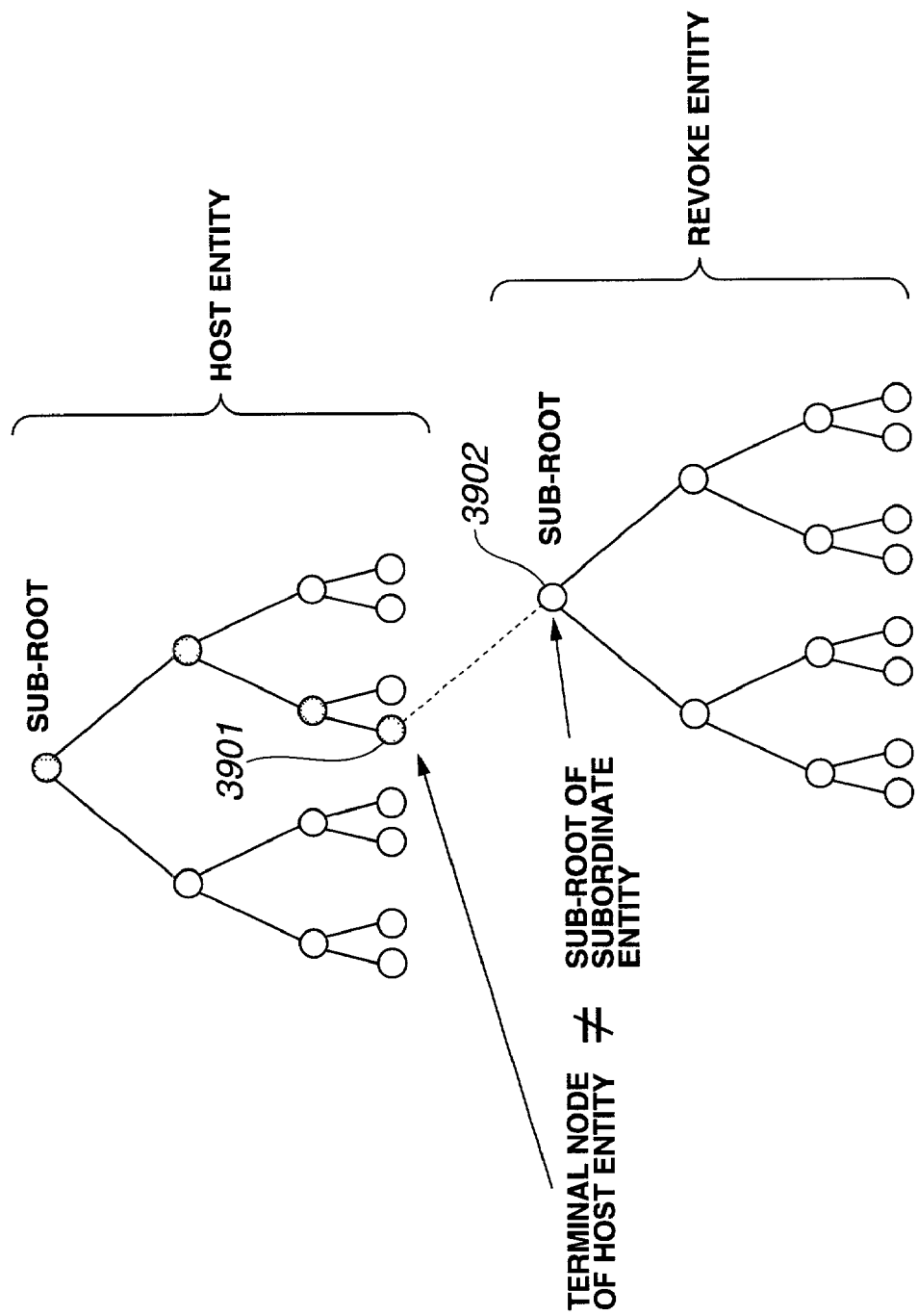
FIG. 39 is a view for explaining a relationship between a revoke entity and a host entity in an entity control constitution of a hierarchical tree structure in the information processing system of the present invention.

FIG. 39 is a view for explaining the correspondence of the child entity revoked to the host entity which carried out revoking. A terminal node 3901 of the host entity is renewed by revoking the entity, and a new sub-EKB is produced by renewing of node keys which are present in a pass from the terminal node 3901 to the sub-root in the tree of the host entity. As a result, the node key of the top node 3902 of the child entity revoked is not coincided with the node key of the terminal node 3901 of the host entity. EKB produced by the key distribute center (KDC) after revoking of the entity is to be produced on the basis of the key of the terminal node renewed, and therefore, the device corresponding to the leaf of the child entity not holding the renewal key disables decrypting of EKB produced by the key distribute censer (KDC).

While in the foregoing, the revoking process of the entity in the lowest stage for controlling the device has been described, processing for revoking the entity control entity in the middle sage of the tree by the host entity is also enabled by the process similar to that described above. By revoking the entity control entity in the middle stage, a plurality of entities and devices belonging to the lower level of the entity control entity revoked can be revoked collectively.

As described, by the execution of revoking in an entity unit, revoking process which is simple as compared with the revoking process for executing it in a device unit one by one becomes enabled.

[Capability Control of Entity]

Next, a description will be made of the processing constitution in which in the key distribution tree constitution in an entity unit, capability granted by each entity is controlled to carry out content distribution according to the capability. The capability termed herein is, for example, defined information of the data processing ability of a device whether decrypting of specific compressed voice data is enabled, whether specific voice reproducing system is granted, or specific image processing program can be processed, whether a device is a device capable of processing what content or program.

Figure 40:
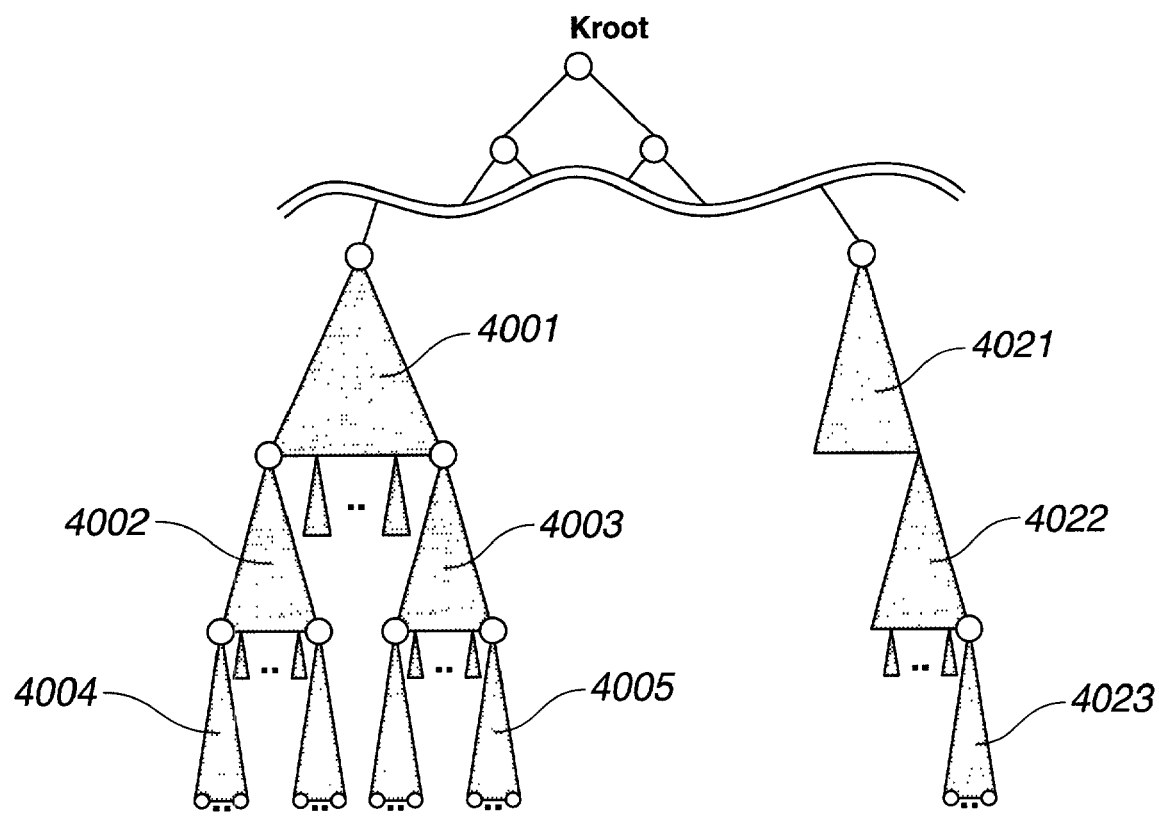
FIG. 40 is a view for explaining a capability setting in an entity control constitution of a hierarchical tree structure in the information processing system of the present invention.

FIG. 40 shows an example of the entity constitution which defines the capability. This is the constitution in which a root node is positioned at the uppermost top of the key distribution tree, a plurality of entities are connected to the lower layer, and each node has a 2-branch. Here, for example, an entity 4001 is defined as an entity having capability to grant either voice reproducing systems A, B or C. Concretely, for example, where music data compressed by voice compressed program A, B or C system are distributed, processing for extending the device belonging to the entity constituted below the entity 4001 is enabled.

Similarly, entity 4002, entity 4003, entity 4004, and entity 4005 are respectively defined as entities having capability capable of processing voice reproducing system B or C, voice reproducing system A or B, voice reproducing system B, and voice reproducing system C, respectively.

On the other hand, an entity 4021 is defined as an entity to grant image reproducing systems p, q, r, and an entity 4022 and an entity 4023 are respectively defined as entities having capability to enable image reproducing of a system p.

The capability information of the entities as described is controlled in the key distribute center (KDC). For example, where a content provider desires to distribute music data compressed by a specific compression program to various devices, an enabling key block (EKB) decodable with respect to only the device which can reproduce the specific compression program can be produced on the basis of capability information of each entity. The content provider for distributing contents distributes a content key encrypted by the enabling key block (EKB) produced on the basis of the capability information and distributes compressed voice data encrypted by the content key to the devices. By the provision of this constitution, it is possible to provide accurately a specific processing program to only the device capable of processing data.

Figure 41:
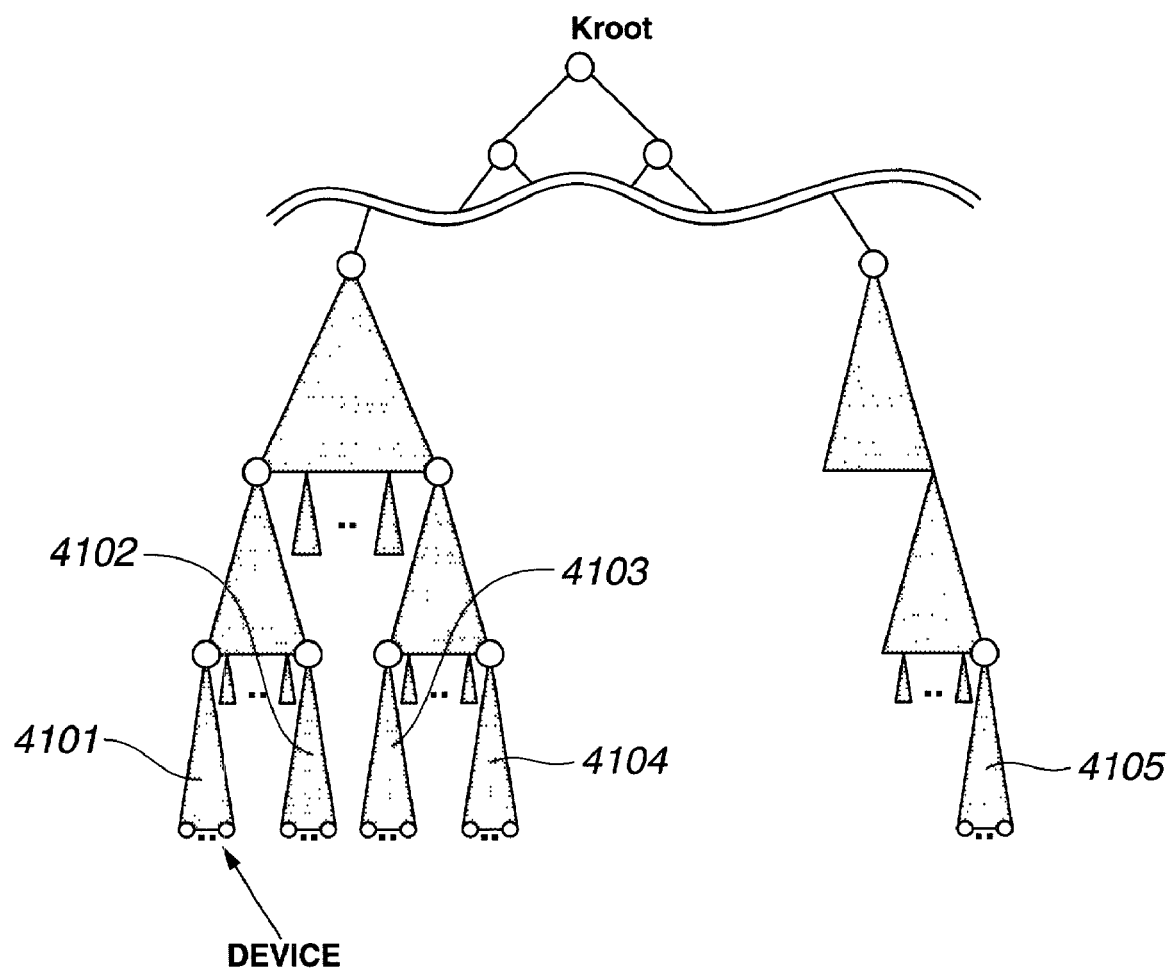
FIG. 41 is a view for explaining a capability setting in an entity control constitution of a hierarchical tree structure in the information processing system of the present invention.

While in FIG. 40, the constitution in which capability information is defined in connection with all the entities is shown, it is noted that it is not always necessary to define the capability information with respect to all the entities as in the constitution of FIG. 40, but the constitution may be employed in which for example, as shown in FIG. 41, capability is defined with respect to only the entity in the lowest stage to which the device belongs, capability of the device belonging to the entity in the lowest stage is controlled in the key distribute center (KDC), and the enabling key block (EKB) that can be decrypted merely for the device capable of providing a process desired by a content provider is produced on the basis of capability information defined in the entity in the lowest stage. FIG. 41 shows the constitution in which capability in entity 4101=4105 for which the device is defined, is defined in the terminal node, and capability with respect to these entities is controlled in the key distribute center (KDC). For example, to the entity 4101 belong devices capable of processing a system B with respect to voice reproducing and a system r with respect to image reproducing, respectively. To the entity 4102 belong devices capable of processing a system A with respect to voice reproducing and a system q with respect to image reproducing, respectively.

Figures 42A, 42B:
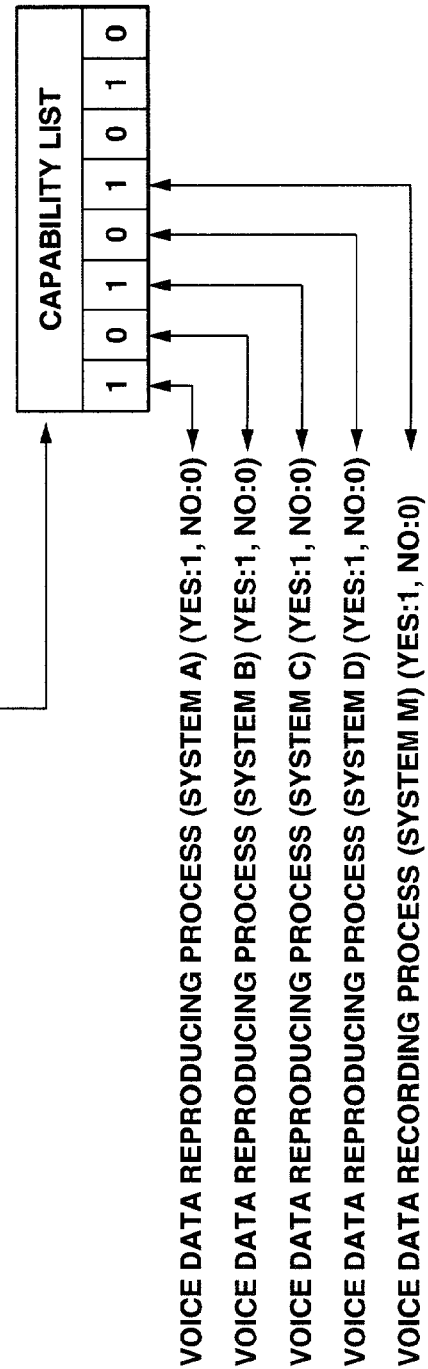
FIGS. 42A and 42B are views each for explaining a capability control table for controlling a key distribution center (KDC) in the information processing system of the present invention.

FIGS. 42A and 42B show an example of the constitution of a capability control table controlled in the key distribute center (KDC). The capability control table has the data constitution as shown in FIG. 42A. That is, propriety with respect to various data processes is set to [1] or [0] such that there are an entity ID as a discriminator for discriminating entities and a capability list indicative of capability defined in the entities, and in the capability list, as shown in FIG. 42B, for example, if a voice data reproducing processing system (A) is can be processed, [1] appears, if not, [0] appears, and if a voice data reproducing processing system (B) can be processed, [1] appears, if not, [0] appears. The method of setting capability is not limited to such a form as described, but other constitutions may be employed if capability with respect to the control device of entities can be discriminated.

In the capability control table, where sub-EKB if each entity of sub-EKB is stored in a separate data base, discrimination information of sub-EKB is stored, and sub-root node discrimination data of each entity is stored.

Figure 43:
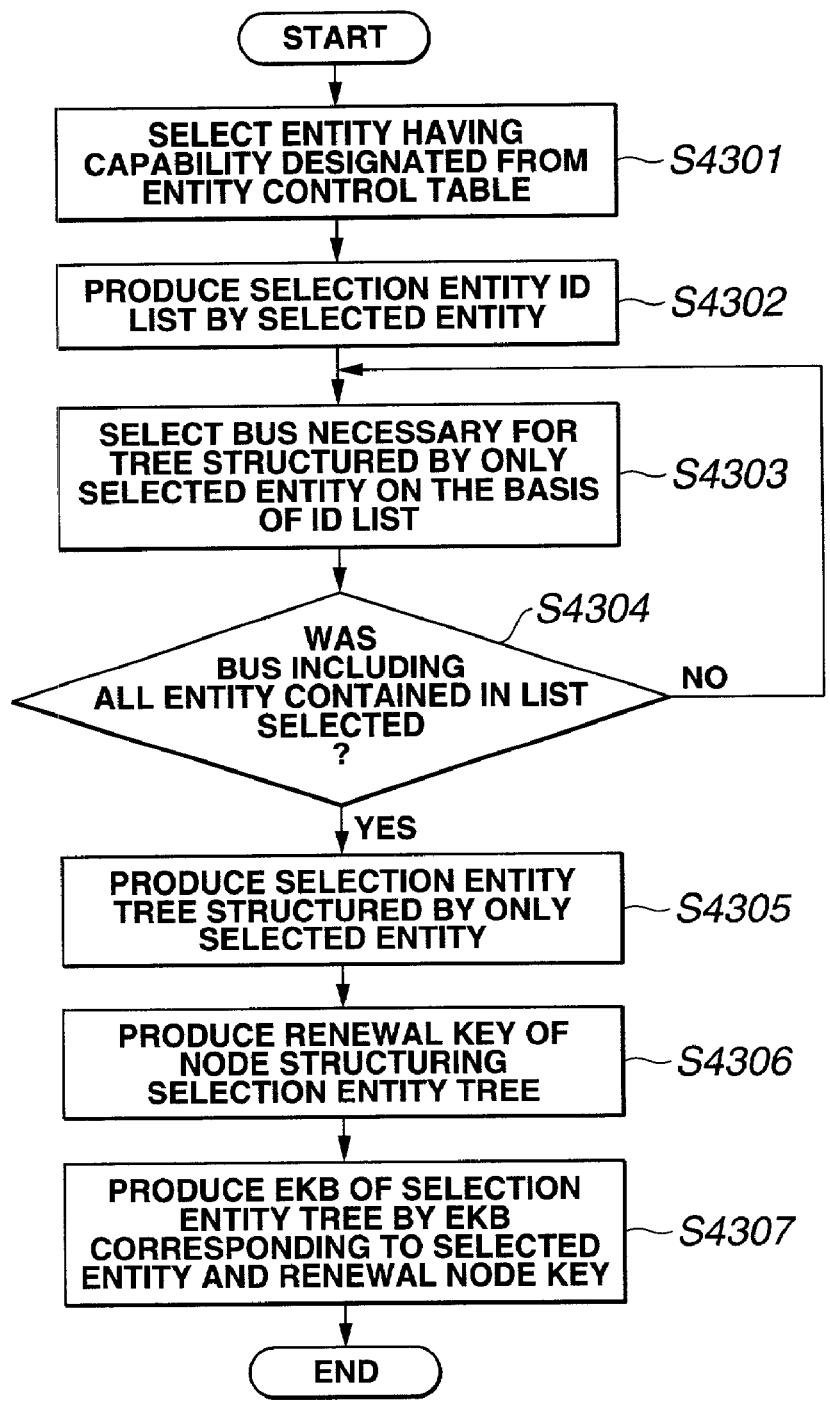
FIG. 43 is an EKB producing processing flowchart on the basis of a capability control table for controlling a key distribution center (KDC) in the information processing system of the present invention.

In the key distribute center (KDC), for example, only the device capable of reproducing a specific content produces a decodable enabling key block (EKB) on the basis of the capability control table. The processing for producing the enabling key block on the basis of capability information will be described with reference to FIG. 43.

First, in Step S4301, the key distribute center (KDC) selects an entity having the designated capability from the capability control table. Concretely, for example, where a content provider desires to distribute reproducible data on the basis of the voice data reproducing processing system A is set to [1] is selected from the capability list of FIG. 42A. an entity, for example, in which item of the voice data reproducing (system A) is set to [1], is selected from the capability list of FIG. 42A.

Next, in Step S4302, a list of selected entity ID constituted by the selected entities is produced. Next, in Step S4303, a pass (a pass of key distribution constitution) necessary for a tree constituted by selected entity ID is selected. In Step 4304, whether or not all pass selections contained in the list of selected entity ID are completed is judged to produce a pass in Step S4303 till completion. This means the process for sequentially selecting the respective passes where a plurality of entities are selected.

When all pass selections contained in the selected entity ID are completed, the procedure proceeds to Step S4305 to constitute a key distribution tree structure constituted merely by the selected entities.

Next, in Step S4306, renewing of node keys of the tree structure produced in Step S4305 is carried out to produce renewal nod keys. Further, sub-EKB of the selected entities constituting the tree is taken out of the capability control table, and the enabling key block (EKB) that can be decrypted merely in the device of the selected entities is produced on the basis of the sub-EKB and the renewal node key produced in Step S4306. The enabling key block (EKB) thus produced is utilized merely in the device having specific capability, that is, being a decodable enabling key block (EKB. For example, a content key is encrypted by the enabling key block (EKB), and a content compressed on the basis of a specific program in the content key is distributed to the device whereby the content is utilized only in the specific decodable device selected by the key distribute center (KDC).

As described above, in the key distribute center (KDC), for example, only the device capable of reproducing the specific content produces the decodable enabling key block (EKB) on the basis of the capability control table. Accordingly, where a new entity is registered, it is necessary to previously obtain capability of a newly registered entity. The processing of notifying capability with the entity new registration will be described with reference to FIG. 44.

Figure 44:
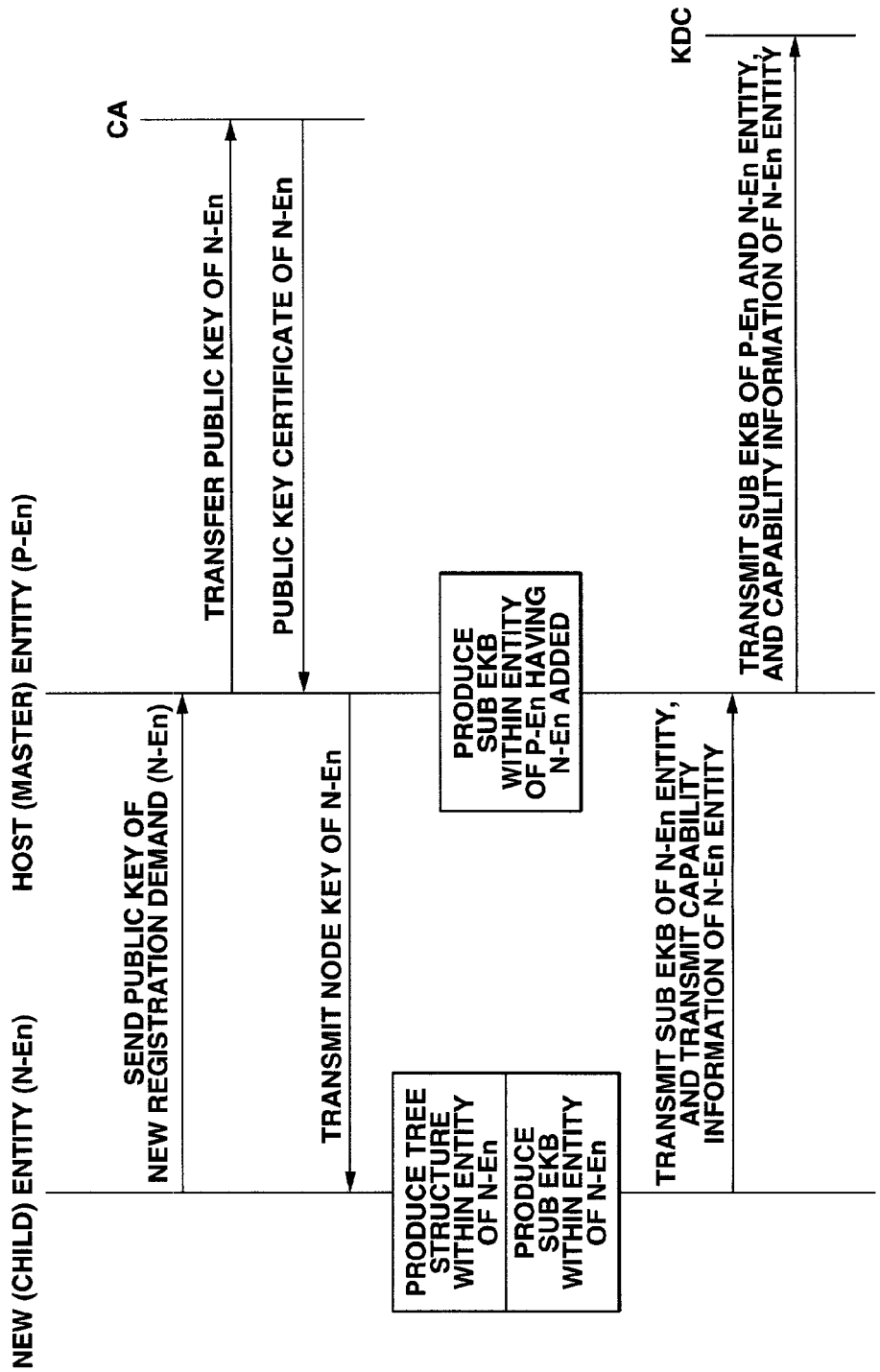
FIG. 44 is a view for explaining a capability notice processing at the time of new entity registration in the information processing system of the present invention.

FIG. 44 is a view showing a capability notice processing sequence where the new entity is participated in the key distribution tree constitution. The new (child) entity (N-En) added newly to the tree constitution executes a new registration request with respect to the hose entity (P-En). Each entity holds a public key in accordance with the public key encryption system, and the new entity sends own public key to the host entity (P-En) when the registration request takes place.

The host entity (P-En) which received the registration request transfers the public key of the new (child) entity (N-En) received to the certificate authority (CA), and receives a public key of the new (child) entity (N-En) to which a signature of CA is added. These procedures are carried out as the procedure of mutual authentication between the host entity (P-En) and the new (child) entity (N-En).

When the authentication of the new registration request entity is finished by these processes, the host entity (P-Ne) grants the registration of the new (child) entity (N-En) to transmit a node key of the new (child) entity (N-En) to the new (child) entity (N-En). This node key is one node key of the terminal node of the host entity (P-En) and corresponds to a top node of the new (child) entity (N-En), that is, a sub-root key.

When transmission of this node key is finished, the new (child) entity (N-En) constructs the tree constitution of the new (child) entity (N-En), sets the sub-root key of the top node received to the top of the constructed tree, sets keys of each node and leaf, and produces the enabling key block (sub-EKB) in the entity. On the other hand, the host entity (P-En) also produces the sub-EKB in the host entity (P-En) to which is added a terminal node to be effective by the addition of the new (child) entity (N-En).

When the new (child) entity (N-En) produces sub-EKB constituted by a node key and a leaf key in the new (child) entity (N-En), the new (child) entity (N-En) transmits it to the host entity (P-En), and further notifies capability information with in connection with the device controlled by own entity to the host entity.

The host entity (P-En) which received sub-EKB and capability information from the new (child) entity (N-En) transmits sub-EKB and capability information received, and renewed sub-EKB of the host entity (P-En) to the key distribute center (KDC).

The key distribute center (KDC) registers the sub-EKB and capability information of entity received in the capability control table described with reference to FIGS. 42A and 42B, and renews the capability control table. The key distribute center (KDC) is possible to produce various forms of EKB, that is, EKB that can be decrypted merely by the entity having specific capability or devices.

The present invention has been described in detail with reference to the specific embodiments. However, it is obvious that those skilled in art may amend or replace the embodiments within the scope not departing from the subject matter of the present invention. That is, the present invention has been disclosed in the form of illustration and should not be interpreted imitatively. For judging the subject matter of the present invention, reference should be made to the claims described herein after.

INDUSTRIAL APPLICABILITY

As described above, the information processing system and method using an encryption key block sets sub-trees classified based on capability as data processing ability of the devices in a key tree in which respective keys are corresponded to a root, nodes and leaves on a path from the root to the leaves of a tree in which a plurality of devices are constituted as the leaves, generates an enabling key block (EKB) which is effective for an entity in the entity as a managing subject of each sub-tree, and manages capability information of the plurality of entities and generates the enabling key block (EKB) decodable only by the entities having common capability by using the sub-enabling key block (sub-EKB) generated by the entities having the common capability in a key distribution center (KDC). Thus, it is possible to provide data which can be processed only in specific devices as datadecodable only by the devices.

With the information processing system and method using an encryption key block according to the present invention, the key distribution center (KDC) includes a capability management table in which respective identifiers for the plurality of entities, the capability information for the entities, and the sub-enabling key block (sub-EKB) are corresponded to one another, and selects an entity capable of processing distributed data to a device based on the capability management table to generate the enabling key block (EKB) decodable only by the devices under the selected entity. Thus, it is possible to generate a variety of EKBs corresponding to a variety of capabilities.

Also, the information processing system and method using an encryption key block according to the present invention manages a sub-tree as a partial tree constituting a key tree in which respective keys are corresponded to a root, nodes and leaves on a path from the root to the leaves of a tree in which a plurality of devices are constituted as the leaves, sets a plurality of entities which generate a sub-enabling key block (sub-EKB) based only on a key set corresponding to nodes or leaves included in the sub-tree, and generates the enabling key block (EKB) decodable only by selected entities by using the sub-enabling key block (sub-EKB) generated by the plurality of entities for distribution. Thus, it is possible to manage the devices by dividing the hierarchical key tree structure, and to perform precise processing corresponding to the devices.

With the information processing system and method using an encryption key block according to the present invention, revoke processing of a device in an entity or an entity can be executed. Thus, it is possible to prevent the quantity of processing caused by increasing devices in a case of an integrated device management from being increased.

Further, with the information processing system and method using an encryption key block according to the present invention, a terminal node of each entity is set as a reserve node. Thus, it is possible to cope with the increase of management devices or management entities.

The invention claimed is:

1. An information processing system using an encryption key block which constitutes a key tree in which respective keys are corresponded to a root, nodes and leaves on a path from the root to the leaves of a tree in which a plurality of devices are constituted as the leaves, executes renewal of keys on a selected path by selecting the path constituting the key tree and encryption processing of a superordinate key by a subordinate key and generates an enabling key block (EKB) to provide it to a device, the system comprising:

a plurality of entities which constitute a part of the key tree, manage sub-trees classified based on capability as data processing ability of the devices, and generate a sub-enabling key block (sub-EKB) based only on a key set corresponding to nodes or leaves included in the sub-tree; and a key distribution center (KDC) which manages capability information of the plurality of entities and generates the enabling key block (EKB) decodable only by the entities having common capability by using the sub-enabling key block (sub-EKB) generated by the entities having the common capability.

2. The information processing system using an encryption key block according to claim 1 wherein the key distribution center (KDC) includes a capability management table in which respective identifiers for the plurality of entities, the capability information for the entities, and the sub-enabling key block (sub-EKB) are corresponded to one another, and selects an entity capable of processing distributed data to a device based on the capability management table to generate the enabling key block (EKB) decodable only by the devices under the selected entity.

3. The information processing system using an encryption key block according to claim 1 wherein a newly added entity to the key tree generates a subenabling key block (sub-EKB) based only on a key set corresponding to nodes or leaves in the sub-tree of the new entity, executes registration processing of the sub-EKB to the key distribution center (KDC), and executes notification processing of capability information of the own entity.

4. The information processing system using an encryption key block according to claim 1 wherein the plurality of entities have a hierarchical structure of superordinate entities and subordinate entities in which a terminal node at the lowermost stage of an entity is made to be a top node (sub-root) of another entity.

5. The information processing system using an encryption key block according to claim 1 wherein each of the plurality of entities has authority of setting and renewing the key corresponding to the nodes or leaves constituting the sub-tree which belongs to the own entity.

6. The information processing system using an encryption key block according to claim 1 wherein each device which belongs to an entity at the lowermost class with leaves at the lowermost stage in the entity being leaves corresponding to respective devices among the plurality of entities has stored therein a node key and a leaf key set in nodes and leaves on a path from a top node (sub-root) of the entity that the device itself belongs to through the leaf that corresponds to the device itself.

7. The information processing system using an encryption key block according to claim 1 wherein each of the plurality of entities adds a self management entity in the lower stage of the own entity, such that one or more nodes or leaves in the nodes or leaves at the lowermost stage of the own entity are reserved as reserve nodes.

8. The information processing system using an encryption key block according to claim 1 wherein the superordinate entity which adds the new entity to its terminal node sets a key corresponding to the terminal node of the superordinate entity as a node that sets the sub-tree of the new entity as a top node (sub-root) key of the new entity.

9. The information processing system using an encryption key block according to claim 1 wherein an entity which executes revoke processing of a device renews a node key set in nodes on a path from a top node (sub-root) in the entity through a leaf corresponding to the revoked device and generates a renewal sub-EKB into which the renewed node key is constituted as an encryption key decodable only by leaf devices other than the revoked device to send it to a superordinate entity, and the superordinate entity renews a node key on a path from a terminal node to which the renewal sub-EKB has been sent through its own sub-root and generates a renewal sub-EKB to send it to a further superordinate entity, such that the revoke processing of the device is executed by sequentially executing renewal sub-EKB generation and sending processing on the entity basis up to a highest entity to carry out renewal of each node key on the path from the revoked device through a root and executing registration processing of the renewal sub-EKB generated in the renewal of the node key to the key distribution center (KDC).

10. The information processing system using an encryption key block according to claim 1 wherein an entity which executes revoke processing of a subordinate entity renews a node key set in nodes on a path from a top node (sub-root) in the entity through a terminal node corresponding to the revoked entity and generates a renewal sub-EKB into which the node key has been renewed to send it to a superordinate entity, and the superordinate entity renews a node key on a path from a terminal node to which the renewal sub-EKB has been sent through its own sub-root and generates a renewal sub-EKB to send it to a further superordinate entity, such that the revoke processing on the entity basis is executed by sequentially executing renewal sub-EKB generation and sending processing on the entity basis up to a highest entity to carry out renewal of each node key on the path from the revoked entity through a root and executing registration processing of the renewal sub-EKB generated in the renewal of the node key to the key distribution center (KDC).

11. The information processing system using an encryption key block according to claim 1 wherein an entity which executes revoke processing of a subordinate entity renews a node key set in nodes except for a terminal node on a path from a top node (sub-root) in the entity through the terminal node corresponding to the revoked entity and generates a renewal sub-EKB into which the node key has been renewed to send it to a superordinate entity, and the superordinate entity renews a node key on a path from a terminal node to which the renewal sub-EKB has been sent through its own sub-root and generates a renewal sub-EKB to send it to a further superordinate entity, such that the revoke processing on the entity basis is executed by sequentially executing renewal sub-EKB generation and sending processing on the entity basis up to a highest entity to carry out renewal of each node key except for the terminal node corresponding to the revoked entity on the path from the revoked entity through a root and executing registration processing of the renewal sub-EKB generated in the renewal of the node key to the key distribution center (KDC).

12. An information processing method using an encryption key block in an information processing system which constitutes a key tree in which respective keys are corresponded to a root, nodes and leaves on a path from the root to the leaves of a tree in which a plurality of devices are constituted as the leaves, executes renewal of keys on a selected path by selecting the path constituting the key tree and encryption processing of a superordinate key by a subordinate key and generates an enabling key block (EKB) to provide it to a device, the method comprising the steps of:

generating a sub-enabling key block (sub-EKB) based only on a key set corresponding to nodes or leaves included in a sub-tree of each entity in entities which constitute a part of the key tree and manage sub-trees classified based on capability as data processing ability of the devices; and extracting a sub-enabling key block (sub-EKB) generated by entities having common capability based on capability information of the plurality of entities and using the sub-EKB to generate the enabling key block (EKB) decodable only by the entities having the common capability in a key distribution center (KDC) which has the capability information of the plurality of entities.

13. The information processing method using an encryption key block according to claim 12 wherein the step of generating the enabling key block (EKB) in the key distribution center (KDC) includes the steps of:

selecting the entities having the common capability;

generating an entity tree constituted by the entities selected in the entity selection step;

renewing a node key constituting the entity tree; and generating an enabling key block (EKB) decodable only by the selected entities based on the node key renewed in the node key renewal step and a sub-EKB of the selected entities.

14. The information processing method using an encryption key block according to claim 12 wherein the key distribution center (KDC) includes a capability management table in which respective identifiers for the plurality of entities, the capability information for the entities, and the sub-enabling key block (sub-EKB) are corresponded to one another, and selects an entity capable of processing distributed data to a device based on the capability management table to generate the enabling key block (EKB) decodable only by the devices under the selected entity.

15. The information processing method using an encryption key block according to claim 12 wherein a newly added entity to the key tree generates a sub-enabling key block (sub-EKB) based only on a key set corresponding to nodes or leaves in the sub-tree of the new entity, executes registration processing of the sub-EKB to the key distribution center (KDC), and executes notification processing of capability information of the own entity.

16. The information processing method using an encryption key block according to claim 12 wherein each of the plurality of entities executes setting and renewing the key corresponding to the nodes or leaves constituting the sub-tree which belongs to the own entity.

17. The information processing method using an encryption key block according to claim 12 wherein the superordinate entity which adds the new entity to its terminal node sets a key corresponding to the terminal node of the superordinate entity as a node that sets the sub-tree of the new entity as a top node (sub-root) key of the new entity.

18. The information processing method using an encryption key block according to claim 12 wherein an entity which executes revoke processing of a device renews a node key set in nodes on a path from a top node (sub-root) in the entity through a leaf corresponding to the revoked device and generates a renewal sub-EKB into which the renewed node key is constituted as an encryption key decodable only by leaf devices other than the revoked device to send it to a superordinate entity, and the superordinate entity renews a node key on a path from a terminal node to which the renewal sub-EKB has been sent through its own sub-root and generates a renewal sub-EKB to send it to a further superordinate entity, such that the revoke processing of the device is executed by sequentially executing renewal sub-EKB generation and sending processing on the entity basis up to a highest entity to carry out renewal of each node key on the path from the revoked device through a root and executing registration processing of the renewal sub-EKB generated in the renewal of the node key to the key distribution center (KDC).

19. The information processing method using an encryption key block according to claim 12 wherein an entity which executes revoke processing of a subordinate entity renews a node key set in nodes on a path from a top node (sub-root) in the entity through a terminal node corresponding to the revoked entity and generates a renewal sub-EKB into which the node key has been renewed to send it to a superordinate entity, and the superordinate entity renews a node key on a path from a terminal node to which the renewal sub-EKB has been sent through its own sub-root and generates a renewal sub-EKB to send it to a further superordinate entity, such that the revoke processing on the entity basis is executed by sequentially executing renewal sub-EKB generation and sending processing on the entity basis up to a highest entity to carry out renewal of each node key on the path from the revoked entity through a root and executing registration processing of the renewal sub-EKB generated in the renewal of the node key to the key distribution center (KDC).

20. The information processing method using an encryption key block according to claim 12 wherein an entity which executes revoke processing of a subordinate entity renews a node key set in nodes except for a terminal node on a path from a top node (sub-root) in the entity through the terminal node corresponding to the revoked entity and generates a renewal sub-EKB into which the node key has been renewed to send it to a superordinate entity, and the superordinate entity renews a node key on a path from a terminal node to which the renewal sub-EKB has been sent through its own sub-root and generates a renewal sub-EKB to send it to a further superordinate entity, such that the revoke processing on the entity basis is executed by sequentially executing renewal sub-EKB generation and sending processing on the entity basis up to a highest entity to carry out renewal of each node key except for the terminal node corresponding to the revoked entity on the path from the revoked entity through a root and executing registration processing of the renewal sub-EKB generated in the renewal of the node key to the key distribution center (KDC).

21. A program distributing medium for distributing a computer program which makes enabling key block (EKB) generating processing executed on a computer system in an information processing system which constitutes a key tree in which respective keys are corresponded to a root, nodes and leaves on a path from the root to the leaves of a tree in which a plurality of devices are constituted as the leaves, executes renewal of keys on a selected path by selecting the path constituting the key tree and encryption processing of a superordinate key by a subordinate key and generates an enabling key block (EKB) to provide it to a device, the computer program comprising the steps of:

generating a sub-enabling key block (sub-EKB) based only on a key set corresponding to nodes or leaves included in a sub-tree of each entity in entities which constitute a part of the key tree and manage sub-trees classified based on capability as data processing ability of the devices; and extracting a sub-enabling key block (sub-EKB) generated by entities having common capability based on capability information of the plurality of entities and using the sub-EKB to generate the enabling key block (EKB) decodable only by the entities having the common capability in a key distribution center (KDC) which has the capability information of the plurality of entities.

22. An information processing system using an encryption key block which constitutes a key tree in which respective keys are corresponded to a root, nodes and leaves on a path from the root to the leaves of a tree in which a plurality of devices are constituted as the leaves, executes renewal of keys on a selected path by selecting the path constituting the key tree and encryption processing of a superordinate key by a subordinate key and generates an enabling key block (EKB) to provide it to a device, the system comprising:

a plurality of entities which manage a sub-tree as a partial tree constituting the key tree and generate a sub-enabling key block (sub-EKB) based only on a key set corresponding to nodes or leaves included in the sub-tree, wherein the sub-tree is classified according to the capability of at least one device corresponding to the sub-tree; and a key distribution center (KDC) which generates the enabling key block (EKB) decodable only by selected entities by using the sub-enabling key block (sub-EKB) generated by the plurality of entities.

23. The information processing system using an encryption key block according to claim 22 wherein the plurality of entities have a hierarchical structure of superordinate entities and subordinate entities in which a terminal node at the lowermost stage of an entity is made to be a top node (sub-root) of another entity.

24. The information processing system using an encryption key block according to claim 22 wherein each of the plurality of entities has authority of setting and renewing the key corresponding to the nodes or leaves constituting the sub-tree which belongs to the own entity.

25. The information processing system using an encryption key block according to claim 22 wherein each device which belongs to an entity at the lowermost class with leaves at the lowermost stage in the entity being leaves corresponding to respective devices among the plurality of entities has stored therein a node key and a leaf key set in nodes and leaves on a path from a top node (sub-root) of the entity that the device itself belongs to through the leaf that corresponds to the device itself.

26. The information processing system using an encryption key block according to claim 22 wherein each of the plurality of entities adds a self management entity in the lower stage of the own entity, such that one or more nodes or leaves in the nodes or leaves at the lowermost stage of the own entity are reserved as reserve nodes.

27. The information processing system using an encryption key block according to claim 22 wherein the superordinate entity which adds the new entity to its terminal node sets a key corresponding to the terminal node of the superordinate entity as a node that sets the sub-tree of the new entity as a top node (sub-root) key of the new entity.

28. The information processing system using an encryption key block according to claim 22 wherein a newly added entity generates a sub-enabling key block (sub-EKB) based only on a key set corresponding to nodes or leaves in the sub-tree of the new entity and executes registration processing of the sub-EKB to the key distribution center (KDC).

29. The information processing system using an encryption key block according to claim 22 wherein an entity which executes revoke processing of a device renews a node key set in nodes on a path from a top node (sub-root) in the entity through a leaf corresponding to the revoked device and generates a renewal sub-EKB into which the renewed node key is constituted as an encryption key decodable only by leaf devices other than the revoked device to send it to a superordinate entity, and the superordinate entity renews a node key on a path from a terminal node to which the renewal sub-EKB has been sent through its own sub-root and generates a renewal sub-EKB to send it to a further superordinate entity, such that the revoke processing of the device is executed by sequentially executing renewal sub-EKB generation and sending processing on the entity basis up to a highest entity to carry out renewal of each node key on the path from the revoked device through a root and executing. registration processing of the renewal sub-EKB generated in the renewal of the node key to the key distribution center (KDC).

30. The information processing system using an encryption key block according to claim 22 wherein an entity which executes revoke processing of a subordinate entity renews a node key set in nodes on a path from a top node (sub-root) in the entity through a terminal node corresponding to the revoked entity and generates a renewal sub-EKB into which the node key has been renewed to send it to a superordinate entity, and the superordinate entity renews a node key on a path from a terminal node to which the renewal sub-EKB has been sent through its own sub-root and generates a renewal sub-EKB to send it to a further superordinate entity, such that the revoke processing on the entity basis is executed by sequentially executing renewal sub-EKB generation and sending processing on the entity basis up to a highest entity to carry out renewal of each node key on the path from the revoked entity through a root and executing registration processing of the renewal sub-EKB generated in the renewal of the node key to the key distribution center (KDC).

31. The information processing system using an encryption key block according to claim 22 wherein an entity which executes revoke processing of a subordinate entity renews a node key set in nodes except for a terminal node on a path from a top node (sub-root) in the entity through the terminal node corresponding to the revoked entity and generates a renewal sub-EKB into which the node key has been renewed to send it to a superordinate entity, and the superordinate entity renews a node key on a path from a terminal node to which the renewal sub-EKB has been sent through its own sub-root and generates a renewal sub-EKB to send it to a further superordinate entity, such that the revoke processing on the entity basis is executed by sequentially executing renewal sub-EKB generation and sending processing on the entity basis up to a highest entity to carry out renewal of each node key except for the terminal node corresponding to the revoked entity on the path from the revoked entity through a root and executing registration processing of the renewal sub-EKB generated in the renewal of the node key to the key distribution center (KDC).

32. The information processing system using an encryption key block according to claim 22 wherein the entities are constituted as managing subjects of devices or entities belonging to a common category.

33. An information processing method using an encryption key block in an information processing system which constitutes a key tree in which respective keys are corresponded to a root, nodes and leaves on a path from the root to the leaves of a tree in which a plurality of devices are constituted as the leaves, executes renewal of keys on a selected path by selecting the path constituting the key tree and encryption processing of a superordinate key by a subordinate key and generates an enabling key block (EKB) to provide it to a device, the method comprising the steps of:

generating a sub-enabling key block (sub-EKB) based only on a key set corresponding to nodes or leaves included in a sub-tree of each entity in a plurality of entities which manage sub-trees as a partial tree constituting the key tree; and generating the enabling key block (EKB) decodable only by selected entities by using the sub-enabling key block (sub-EKB) generated by the plurality of entities in a key distribution center (KDC), wherein the sub-trees are classified according to the capability of devices corresponding to the sub-trees.

34. The information processing method using an encryption key block according to claim 33 wherein each of the plurality of entities executes setting and renewing the key corresponding to the nodes or leaves constituting the sub-tree which belongs to the own entity.

35. The information processing method using an encryption key block according to claim 33 wherein the superordinate entity which adds the new entity to its terminal node sets a key corresponding to the terminal node of the superordinate entity as a node that sets the sub-tree of the new entity as a top node (sub-root) key of the new entity.

36. The information processing method using an encryption key block according to claim 33 wherein a newly added entity generates a sub-enabling key block (sub-EKB) based only on a key set corresponding to nodes or leaves in the sub-tree of the new entity and executes registration processing of the sub-EKB to the key distribution center (KDC).

37. The information processing method using an encryption key block according to claim 33 wherein an entity which executes revoke processing of a device renews a node key set in nodes on a path from a top node (sub-root) in the entity through a leaf corresponding to the revoked device and generates a renewal sub-EKB into which the renewed node key is constituted as an encryption key decodable only by leaf devices other than the revoked device to send it to a superordinate entity, and the superordinate entity renews a node key on a path from a terminal node to which the renewal sub-EKB has been sent through its own sub-root and generates a renewal sub-EKB to send it to a further superordinate entity, such that the revoke processing of the device is executed by sequentially executing renewal sub-EKB generation and sending processing on the entity basis up to a highest entity to carry out renewal of each node key on the path from the revoked device through a root and executing registration processing of the renewal sub-EKB generated in the renewal of the node key to the key distribution center (KDC).

38. The information processing method using an encryption key block according to claim 33 wherein an entity which executes revoke processing of a subordinate entity renews a node key set in nodes on a path from a top node (sub-root) in the entity through a terminal node corresponding to the revoked entity and generates a renewal sub-EKB into which the node key has been renewed to send it to a superordinate entity, and the superordinate entity renews a node key on a path from a terminal node to which the renewal sub-EKB has been sent through its own sub-root and generates a renewal sub-EKB to send it to a further superordinate entity, such that the revoke processing on the entity basis is executed by sequentially executing renewal sub-EKB generation and sending processing on the entity basis up to a highest entity to carry out renewal of each node key on the path from the revoked entity through a root and executing registration processing of the renewal sub-EKB generated in the renewal of the node key to the key distribution center (KDC).

39. The information processing method using an encryption key block according to claim 33 wherein an entity which executes revoke processing of a subordinate entity renews a node key set in nodes except for a terminal node on a path from a top node (sub-root) in the entity through the terminal node corresponding to the revoked entity and generates a renewal sub-EKB into which the node key has been renewed to send it to a superordinate entity, and the superordinate entity renews a node key on a path from a terminal node to which the renewal sub-EKB has been sent through its own sub-root and generates a renewal sub-EKB to send it to a further superordinate entity, such that the revoke processing on the entity basis is executed by sequentially executing renewal sub-EKB generation and sending processing on the entity basis up to a highest entity to carry out renewal of each node key except for the terminal node corresponding to the revoked entity on the path from the revoked entity through a root and executing registration processing of the renewal sub-EKB generated in the renewal of the node key to the key distribution center (KDC).

40. A program distributing medium for distributing a computer program which makes enabling key block (EKB) generating processing executed on a computer system in an information processing system which constitutes a key tree in which respective keys are corresponded to a root, nodes and leaves on a path from the root to the leaves of a tree in which a plurality of devices are constituted as the leaves, executes renewal of keys on a selected path by selecting the path constituting the key tree and encryption processing of a superordinate key by a subordinate key and generates an enabling key block (EKB) to provide it to a device, the computer program comprising the steps of:

generating a sub-enabling key block (sub-EKB) based only on a key set corresponding to nodes or leaves included in a sub-tree of each entity in a plurality of entities which manage sub-trees as a partial tree constituting the key tree; and generating the enabling key block (EKB) decodable only by selected entities by using the sub-enabling key block (sub-EKB) generated by the plurality of entities in a key distribution center (KDC), wherein the sub-trees are classified according to the capability of devices corresponding to the sub-trees.

* * * * *

UNITED STATES PATENT AND TRADEMARK OFFICE
CERTIFICATE OF CORRECTION

PATENT NO. : 7,269,257 B2  Page 1 of 1
APPLICATION NO. : 10/048658
DATED : September 11, 2007
INVENTOR(S) : Yoshimichi Kitaya et al.

It is certified that error appears in the above-identified patent and that said Letters Patent is hereby corrected as shown below:

On the Face of the Patent (54) Title should read --INFORMATION PROCESSING SYSTEM AND METHOD USING ENCRYPTION KEY BLOCK--;

On the Face of the Patent (30) insert additional priority data --Jun. 15, 2000 (JP).......... 2000-179694--;

Column 1 Title should read --INFORMATION PROCESSING SYSTEM AND METHOD USING ENCRYPTION KEY BLOCK--;

Column 2, line 53, "Atypical" should read --A typical--;

Column 7, line 23, delete the comma "," after the word "the";

Column 18, line 31, "leafkey" should read --leaf key--;

Column 20, line 7, "leafkey" should read --leaf key--;

Column 28, line 31, "leafkeys" should read --leaf keys--;

Column 42, line 38, "subenabling" should read --sub-enabling--;

Column 47, line 24, delete the "." after the word "executing"

Signed and Sealed this

Third Day of February, 2009

JOHN DOLL
*Acting Director of the United States Patent and Trademark Office*